US008151185B2

(12) United States Patent
Audet

(10) Patent No.: US 8,151,185 B2
(45) Date of Patent: Apr. 3, 2012

(54) MULTIMEDIA INTERFACE

(75) Inventor: Mathieu Audet, Montreal (CA)

(73) Assignee: Maya-Systems Inc., Montreal, Quebec (CA)

( * ) Notice: Subject to any disclaimer, the term of this patent is extended or adjusted under 35 U.S.C. 154(b) by 1122 days.

(21) Appl. No.: 11/970,860

(22) Filed: Jan. 8, 2008

(65) Prior Publication Data

US 2008/0134013 A1    Jun. 5, 2008

Related U.S. Application Data

(62) Division of application No. 10/265,443, filed on Oct. 7, 2002, now Pat. No. 7,606,819.

(60) Provisional application No. 60/957,444, filed on Aug. 22, 2007, provisional application No. 60/971,214, filed on Sep. 10, 2007.

(51) Int. Cl.
*G06F 17/30* (2006.01)

(52) U.S. Cl. ....................................................... 715/237
(58) Field of Classification Search .................... 715/273
See application file for complete search history.

(56) References Cited

U.S. PATENT DOCUMENTS

| | | | |
|---|---|---|---|
| 4,616,336 A | 10/1986 | Robertson | |
| 4,653,021 A | 3/1987 | Takagi | |
| 5,115,504 A | 5/1992 | Belove | |
| 5,148,154 A | 9/1992 | MacKay | |
| 5,241,624 A | 8/1993 | Torres | |
| 5,261,087 A * | 11/1993 | Mukaino | .............................. 1/1 |
| 5,535,063 A | 7/1996 | Lamming | |
| 5,546,528 A | 8/1996 | Johnston | |
| 5,581,752 A | 12/1996 | Inoue | |
| 5,598,519 A | 1/1997 | Narayanan | |
| 5,621,874 A | 4/1997 | Lucas | |
| 5,634,064 A | 5/1997 | Warnock | |
| 5,649,182 A | 7/1997 | Reitz | |
| 5,659,742 A | 8/1997 | Beattie | |
| 5,671,381 A | 9/1997 | Strasnick | |
| 5,680,605 A | 10/1997 | Torres | |
| 5,701,500 A | 12/1997 | Ikeo | |
| 5,713,031 A | 1/1998 | Saito | |
| 5,740,815 A | 4/1998 | Alpins | |
| 5,781,188 A | 7/1998 | Amiot | |
| 5,781,785 A | 7/1998 | Rowe | |
| 5,794,178 A | 8/1998 | Caid | |
| 5,822,751 A | 10/1998 | Gray | |

(Continued)

FOREIGN PATENT DOCUMENTS

WO    WO0122194    3/2001

(Continued)

*Primary Examiner* — Laurie Ries
*Assistant Examiner* — Tionna Smith
(74) *Attorney, Agent, or Firm* — Mathieu Audet

(57) ABSTRACT

A method of displaying an on-screen graphical user interface comprising reading data for a plurality of user-selectable icons associated with attributes and data for a plurality of content icons representing respective items of contents and generating image data for the on-screen graphical user-interface with a two-dimensional array which includes a first array comprising the plurality of user-selectable icons adapted to be arranged in a specific direction on a screen and which is also adapted to include a second array comprising the plurality of content icons in a direction intersecting the first array on the screen, and outputting the image data for the on-screen graphical user interface related to displaying the contents to a display device.

20 Claims, 45 Drawing Sheets

U.S. PATENT DOCUMENTS

| | | | |
|---|---|---|---|
| 5,832,504 A | 11/1998 | Tripathi | |
| 5,838,317 A | 11/1998 | Bolnick | |
| 5,847,707 A | 12/1998 | Hayashida | |
| 5,878,410 A | 3/1999 | Zbikowski | |
| 5,900,879 A | 5/1999 | Berry | |
| 5,903,271 A | 5/1999 | Bardon | |
| 5,905,992 A * | 5/1999 | Lucas et al. | 715/205 |
| 5,926,824 A * | 7/1999 | Hashimoto | 715/210 |
| 5,933,843 A | 8/1999 | Takai | |
| 6,003,034 A | 12/1999 | Tuli | |
| 6,006,227 A | 12/1999 | Freeman | |
| 6,009,442 A | 12/1999 | Chen | |
| 6,012,072 A | 1/2000 | Lucas | |
| 6,029,164 A | 2/2000 | Birrell | |
| 6,064,384 A | 5/2000 | Ho | |
| 6,067,554 A | 5/2000 | Hohensee | |
| 6,081,817 A | 6/2000 | Taguchi | |
| 6,088,032 A | 7/2000 | Mackinlay | |
| 6,108,657 A | 8/2000 | Shoup | |
| 6,111,578 A | 8/2000 | Tesler | |
| 6,119,120 A | 9/2000 | Miller | |
| 6,149,519 A | 11/2000 | Osaki | |
| 6,151,604 A | 11/2000 | Wlaschin | |
| 6,151,702 A | 11/2000 | Overturf | |
| 6,175,845 B1 | 1/2001 | Smith | |
| 6,185,551 B1 | 2/2001 | Birrell | |
| 6,189,012 B1 | 2/2001 | Mital | |
| 6,202,068 B1 | 3/2001 | Kraay | |
| 6,211,873 B1 | 4/2001 | Moyer | |
| 6,236,994 B1 | 5/2001 | Swartz | |
| 6,237,004 B1 | 5/2001 | Dodson | |
| 6,240,421 B1 | 5/2001 | Stolarz | |
| 6,243,093 B1 | 6/2001 | Czerwinski | |
| 6,243,724 B1 | 6/2001 | Mander | |
| 6,253,218 B1 | 6/2001 | Aoki | |
| 6,281,898 B1 | 8/2001 | Nikolovska | |
| 6,289,362 B1 | 9/2001 | Van Der Meer | |
| 6,295,639 B1 | 9/2001 | Van Der Meer | |
| 6,308,187 B1 | 10/2001 | DeStefano | |
| 6,335,742 B1 * | 1/2002 | Takemoto | 715/781 |
| 6,337,698 B1 | 1/2002 | Keely, Jr. et al. | |
| 6,366,299 B1 | 4/2002 | Lanning | |
| 6,388,665 B1 | 5/2002 | Linnett | |
| 6,392,651 B1 | 5/2002 | Stradley | |
| 6,456,938 B1 | 9/2002 | Barnard | |
| 6,457,017 B2 | 9/2002 | Watkins | |
| 6,463,431 B1 | 10/2002 | Schmitt | |
| 6,491,585 B1 | 12/2002 | Miyamoto | |
| 6,501,469 B1 | 12/2002 | MacPhail | |
| 6,507,858 B1 | 1/2003 | Kanerva | |
| 6,538,672 B1 | 3/2003 | Dobbelaar | |
| 6,553,310 B1 | 4/2003 | Lopke | |
| 6,556,225 B1 | 4/2003 | MacPhail | |
| 6,594,673 B1 | 7/2003 | Smith | |
| 6,598,043 B1 | 7/2003 | Baclawski | |
| 6,600,501 B1 | 7/2003 | Israel | |
| 6,604,144 B1 | 8/2003 | Anders | |
| 6,636,246 B1 | 10/2003 | Gallo | |
| 6,638,313 B1 | 10/2003 | Freeman | |
| 6,650,343 B1 | 11/2003 | Fujita | |
| 6,662,357 B1 | 12/2003 | Bowman-Amuah | |
| 6,668,102 B2 | 12/2003 | Chiba | |
| 6,671,692 B1 | 12/2003 | Marpe et al. | |
| 6,671,693 B1 | 12/2003 | Marpe | |
| 6,675,158 B1 | 1/2004 | Rising | |
| 6,678,671 B1 | 1/2004 | Petrovic | |
| 6,678,694 B1 | 1/2004 | Zimmermann | |
| 6,691,127 B1 | 2/2004 | Bauer | |
| 6,694,326 B2 | 2/2004 | Mayhew | |
| 6,694,335 B1 | 2/2004 | Hopmann | |
| 6,694,486 B2 | 2/2004 | Frank | |
| 6,701,318 B2 | 3/2004 | Fox | |
| 6,704,727 B1 | 3/2004 | Kravets | |
| 6,704,744 B1 | 3/2004 | Williamson | |
| 6,725,232 B2 | 4/2004 | Bradley | |
| 6,725,427 B2 | 4/2004 | Freeman | |
| 6,735,591 B2 | 5/2004 | Khan | |
| 6,738,787 B2 | 5/2004 | Stead | |
| 6,754,660 B1 | 6/2004 | MacPhail | |
| 6,768,999 B2 | 7/2004 | Prager | |
| 6,772,148 B2 | 8/2004 | Baclawski | |
| 6,859,803 B2 | 2/2005 | Dagtas | |
| 6,862,027 B2 | 3/2005 | Andrews | |
| 6,879,946 B2 | 4/2005 | Rong | |
| 6,889,220 B2 | 5/2005 | Wolff | |
| 6,915,254 B1 | 7/2005 | Heinze | |
| 6,915,489 B2 | 7/2005 | Gargi | |
| 6,922,699 B2 | 7/2005 | Schuetze | |
| 6,925,611 B2 | 8/2005 | SanGiovanni | |
| 6,948,124 B2 | 9/2005 | Combs | |
| 6,987,220 B2 | 1/2006 | Holcombe | |
| 7,007,034 B1 | 2/2006 | Hartman, Jr. | |
| 7,020,848 B2 | 3/2006 | Rosenzweig | |
| 7,055,104 B1 | 5/2006 | Billmaier | |
| 7,113,975 B2 | 9/2006 | Nakayama | |
| 7,137,067 B2 | 11/2006 | Yanase | |
| 7,139,006 B2 | 11/2006 | Wittenburg | |
| 7,149,983 B1 | 12/2006 | Robertson | |
| 7,199,809 B1 | 4/2007 | Lacy | |
| 7,234,114 B2 | 6/2007 | Kurtz | |
| 7,289,981 B2 | 10/2007 | Chang | |
| 7,334,191 B1 | 2/2008 | Sivan | |
| 7,346,600 B2 | 3/2008 | Nakao | |
| 7,346,850 B2 | 3/2008 | Swartz | |
| 7,353,461 B2 | 4/2008 | Davidsson | |
| 7,418,674 B2 | 8/2008 | Robbins | |
| 7,444,598 B2 | 10/2008 | Horvitz | |
| 7,448,950 B2 | 11/2008 | Matsumoto | |
| 7,502,819 B2 | 3/2009 | Alonso | |
| 7,606,819 B2 | 10/2009 | Audet | |
| 7,629,527 B2 | 12/2009 | Hiner | |
| 7,661,075 B2 | 2/2010 | Lahdesmaki | |
| 7,680,817 B2 | 3/2010 | Audet | |
| 7,681,128 B2 | 3/2010 | Yamamoto | |
| 7,681,149 B2 | 3/2010 | Lahdesmaki | |
| 7,703,040 B2 | 4/2010 | Cutrell | |
| 7,765,184 B2 | 7/2010 | Makela | |
| 7,765,195 B2 | 7/2010 | Miller | |
| 7,788,247 B2 | 8/2010 | Wang | |
| 7,822,735 B2 | 10/2010 | Suda | |
| 7,870,489 B2 | 1/2011 | Serita | |
| 7,902,741 B2 | 3/2011 | Iwanaga | |
| 7,991,720 B2 | 8/2011 | Mander | |
| 8,010,508 B2 | 8/2011 | Audet | |
| 8,010,892 B2 | 8/2011 | Audet | |
| 2001/0025288 A1 | 9/2001 | Yanase | |
| 2001/0034766 A1 | 10/2001 | Morimoto | |
| 2002/0035563 A1 | 3/2002 | Suda | |
| 2002/0087530 A1 | 7/2002 | Smith | |
| 2002/0096831 A1 | 7/2002 | Nakayama | |
| 2002/0101458 A1 | 8/2002 | SanGiovanni | |
| 2003/0093260 A1 | 5/2003 | Dagtas | |
| 2003/0120681 A1 | 6/2003 | Baclawski | |
| 2003/0120737 A1 | 6/2003 | Lytle | |
| 2003/0149939 A1 | 8/2003 | Hubel | |
| 2003/0163468 A1 | 8/2003 | Freeman | |
| 2003/0167902 A1 | 9/2003 | Hiner | |
| 2003/0190950 A1 | 10/2003 | Matsumoto | |
| 2003/0237047 A1 | 12/2003 | Borson | |
| 2004/0024738 A1 | 2/2004 | Yamane | |
| 2004/0054968 A1 | 3/2004 | Savage | |
| 2004/0064473 A1 | 4/2004 | Thomas | |
| 2004/0090439 A1 | 5/2004 | Dillner | |
| 2004/0111401 A1 | 6/2004 | Chang | |
| 2004/0125143 A1 | 7/2004 | Deaton | |
| 2004/0128277 A1 | 7/2004 | Mander | |
| 2004/0139143 A1 | 7/2004 | Canakapalli | |
| 2004/0150657 A1 | 8/2004 | Wittenburg | |
| 2004/0233238 A1 | 11/2004 | Lahdesmaki | |
| 2004/0233239 A1 | 11/2004 | Lahdesmaki | |
| 2004/0263519 A1 | 12/2004 | Andrews | |
| 2006/0242178 A1 | 10/2006 | Butterfield | |
| 2006/0248129 A1 | 11/2006 | Carnes | |
| 2006/0259511 A1 | 11/2006 | Boerries | |
| 2007/0005576 A1 | 1/2007 | Cutrell | |
| 2007/0007884 A1 | 1/2007 | Iwanaga | |
| 2007/0061855 A1 | 3/2007 | Serita | |

| | | |
|---|---|---|
| 2007/0067290 A1 | 3/2007 | Makela |
| 2007/0214169 A1 | 9/2007 | Audet |
| 2007/0216694 A1 | 9/2007 | Audet |
| 2007/0271508 A1 | 11/2007 | Audet |
| 2008/0000126 A1 | 1/2008 | Teza |
| 2008/0019371 A1 | 1/2008 | Anschutz |
| 2008/0022199 A1 | 1/2008 | Sako |
| 2008/0058106 A1 | 3/2008 | Audet |
| 2008/0071822 A1 | 3/2008 | Audet |
| 2008/0072169 A1 | 3/2008 | Audet |
| 2008/0092038 A1 | 4/2008 | Audet |
| 2008/0134013 A1 | 6/2008 | Audet |
| 2008/0134022 A1 | 6/2008 | Audet |
| 2008/0141115 A1 | 6/2008 | Audet |
| 2008/0243778 A1 | 10/2008 | Behnen |
| 2008/0295016 A1 | 11/2008 | Audet |
| 2008/0299989 A1 | 12/2008 | King |
| 2009/0019371 A1 | 1/2009 | Audet |
| 2009/0048981 A1 | 2/2009 | McBain Millan |
| 2009/0055413 A1 | 2/2009 | Audet |
| 2009/0055726 A1 | 2/2009 | Audet |
| 2009/0055729 A1 | 2/2009 | Audet |
| 2009/0055763 A1 | 2/2009 | Audet |
| 2009/0055776 A1 | 2/2009 | Audet |
| 2009/0063552 A1 | 3/2009 | Jones |
| 2009/0070662 A1 | 3/2009 | Audet |
| 2009/0083260 A1 | 3/2009 | Artom |
| 2009/0228788 A1 | 9/2009 | Audet |
| 2009/0287693 A1 | 11/2009 | Audet |
| 2009/0288006 A1 | 11/2009 | Audet |
| 2010/0082427 A1 | 4/2010 | Burgener |
| 2010/0082653 A1 | 4/2010 | Nair |
| 2010/0094890 A1 | 4/2010 | Bokor |
| 2010/0145976 A1 | 6/2010 | Higgins |
| 2010/0169823 A1 | 7/2010 | Audet |
| 2010/0185509 A1 | 7/2010 | Higgins |
| 2010/0325132 A1 | 12/2010 | Liu |
| 2010/0325134 A1 | 12/2010 | Galfond |
| 2010/0332512 A1 | 12/2010 | Shpits |
| 2010/0333031 A1 | 12/2010 | Castelli |
| 2011/0078166 A1 | 3/2011 | Oliver |

FOREIGN PATENT DOCUMENTS

| | | |
|---|---|---|
| WO | WO0163378 | 8/2001 |
| WO | WO0198881 | 12/2001 |
| WO | WO03032199 | 4/2003 |
| WO | WO2005/045756 | 5/2005 |
| WO | WO2005083595 | 9/2005 |

* cited by examiner

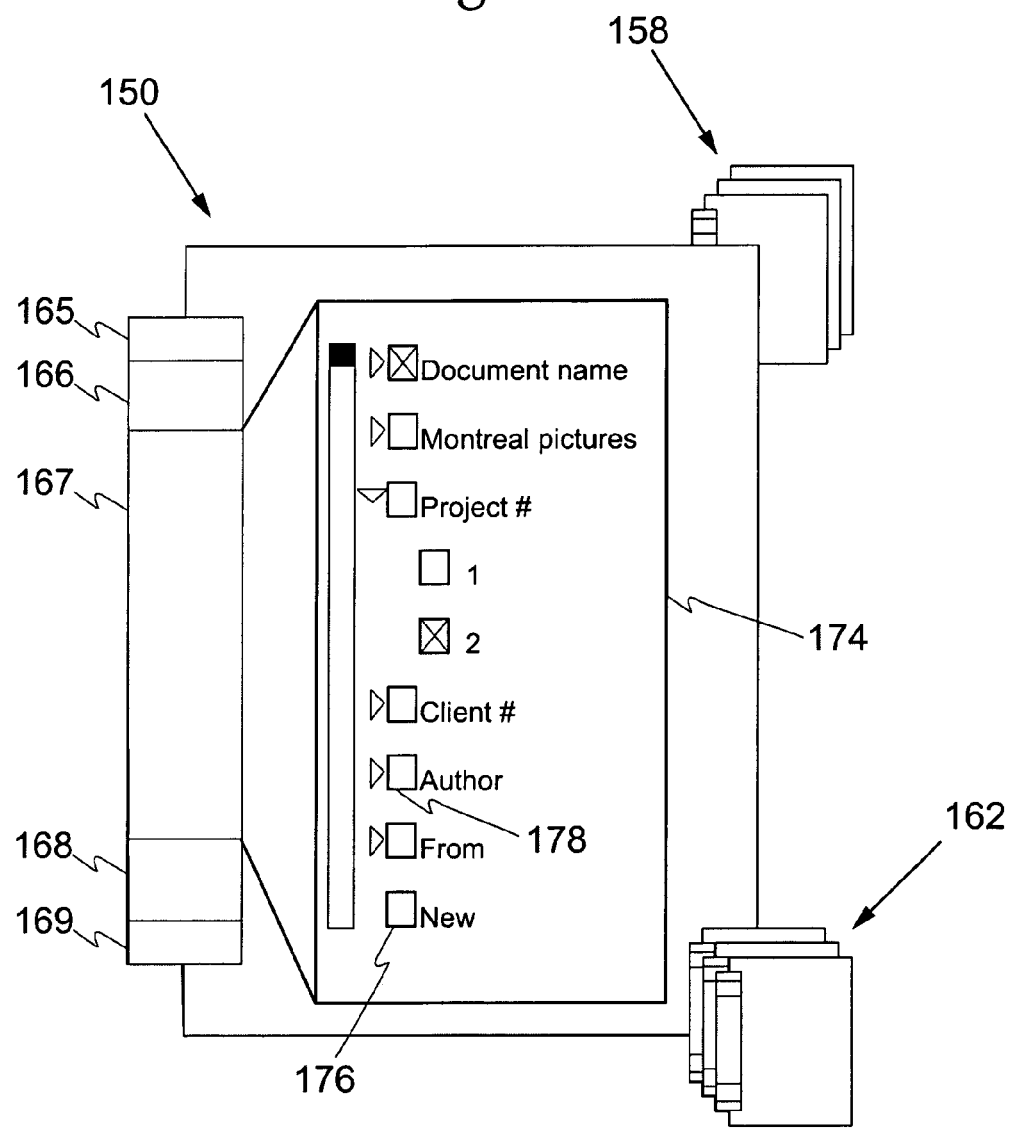

MULTIMEDIA INTERFACE

CROSS-REFERENCE

This application relates to, claims priority from and is a divisional application of U.S. patent application Ser. No. 10/265,443, filed Oct. 7, 2002 entitled MULTI-DIMENSIONAL LOCATING SYSTEM AND METHOD, which claims priority on U.S. provisional patent application Ser. 60/329,146, filed on Oct. 15, 2001, entitled SYSTEM, METHOD AND SOFTWARE FOR INSERTING (INTRODUCING), LOCATING, VIEWING, MANIPULATING AND EXTRACTING FILES FROM A COMPUTER DATABASE VIA A PENTA-DIMENSIONAL GRAPHIC INTERFACE. This application also relates to and claims priority from U.S. provisional patent application Ser. 60/971,214, filed Sep. 10, 2007 entitled GEOGRAPHICAL LOCATING SYSTEM AND METHOD, and relates to and claims priority from U.S. provisional patent application Ser. 60/957,444, filed Aug. 22, 2007, entitled INFORMATION ELEMENTS LOCATING SYSTEM AND METHOD. All the previous documents are incorporated herein by reference.

BACKGROUND OF THE INVENTION

1. Field of the Invention

This invention relates generally to computer systems and more specifically to user interface that manages user-selectable icons and content icons.

2. Description of the Related Art

Computer systems are changing the way we live. They give access to a tremendous computing power. Now everybody can own and operate a computer system. The evolution of computer systems and software happens quite rapidly. Thirty years ago computers were huge mainframe units with less computer power than today's small calculators; now we have small and powerful computer systems that are relatively inexpensive.

Because they have become sufficiently powerful, computer systems are now part of our everyday communication tools, allowing their users to store larger and larger quantities of data (i.e. information). Given the ever-increasing scale and diversity of information and applications on the Internet, improving the technology of information retrieval is important. Information on every form (i.e. data, audio, picture, video . . . ) is now easily accessible like never before with the Internet. Therefore, the data quantity the computer system user has to deal with is growing at an accelerated rate. The volume of information is already so high that the time necessary to deal properly with it is often unacceptable especially for professionals, scientists and business people. However, in order for that information to become actually usable knowledge, it needs to be easily accessible and understandable.

Evolution of computer science over recent years has allowed nearly all types of information to be digitized and transformed into a computer file. The sources of information are numerous, therefore it is difficult for prior art computer systems to store information in a manner that: A) allows retrieval through a common process/presentation, B) allows the storage structure to be adjusted to his/her thinking process, C) allows the user to create links between the elements of information and D) provides visualization that clearly shows the continuity between different elements of information that are using a different time frame. In consequence, the task of efficiently gathering and extracting information from documents may be both difficult and tedious.

The systems well known in the art, however, are designed so that the user has to adapt to the filing systems rather than the other way around. Furthermore, the filing process will generally lead to some extent, to the loss of the flow of information, as portions of information are separated during the filing process. Creating multiple links is usually tedious, complicated, requires self-discipline and is very costly in terms of memory space.

Conventional computer systems for organizing information are often implemented as part of the operating system of the computer system and are therefore provided as a basic utility to the user of the system to allow the user to organize information in a manner embedded in the operating system.

The main organizing system that is usually provided with existing operating systems is the hierarchical filing system. The hierarchical filing system is well known in the prior art and provides a hierarchy of folders (i.e. directories or subdirectories) into which the user may store information, such as text documents, data, pictures, videos, and music files.

Classification and accessibility to the information usually require user knowledge of numerous applications, as well as, self-discipline in the mapping of the data storage system. Each type of file has a unique software that is suited to open it. Now, the Internet provides some kind of interchangeability between files of differing format although the interchangeability is often limited to Internet related files (i.e. HTML, XML, JAVA . . . ).

Even if the meaning of one information as part of a group of information is critical, generally it is not possible to have a global overview of all the various types of information recorded because of the number of different programs needed to visualize the different file types. The links between various files relate to a common topic and are not obvious to the user.

The most popular hierarchical filing system in operating systems are Windows™ Explorer™ on Windows™ operating system and the Finder™ on the Macintosh™ operating system. Despite popularity, the systems provide tools that manage efficiently only small quantities of information at a time. These systems both remain restrained to filing by file names using the "save as" function in most applications. With this kind of classification a user can only have a "local" view on what is stored in the computer system; a problem typically occurs when the information quantity is too large and diversified. The problem is exacerbated if links between the different information are provided between the information locally stored in various folders.

While the hierarchical filing system allows a user to specify a structure within which to file and store information in order to avoid the clutter of a single folder receptacle, the hierarchical structure forces the computer user to be as organized as possible in filing information. If the user has difficulty in filing documents because of the difficulty in deciding the proper categories for the document (e.g. the document does not clearly apply to only one specific folder), the user can file the document in a folder where it will be difficult to retrieve considering it could have been placed logically in many different folders. The usual manner prior art systems use would be to save a copy of a document in as many different directories as there are links and save linked documents in the same directories. Such an approach is labor-intensive, requires considerable self-discipline, and is extremely costly in terms of memory space. Furthermore, the links between the documents remain non-evident.

As more and more documents are stored in the computer system memory, an increasing number of documents are arbitrarily stored in the hierarchical filing system. The user begins to have a bewildering clutter of documents in every folder.

Some of the documents are misplaced or should have been located in many folders at the same time. With time, the user's needs change and the hierarchical filing system must be updated with newer considerations but most users are dissuaded because of the known difficulty and time requirements. Usually, users prefer to continue saving files to the same directories and folders and then wishing they could remember where the files were stored. In addition, the time needed to search in that kind of hierarchical filing system becomes more and more important as the number of files is growing.

It should be noted that the difficulty in filing documents in a computer system also affects the way the user interacts with the computer in that the user attempts to avoid the difficult work involved in filing a document that is hard to categorize. This tends to result in the computer becoming cluttered with documents that are hard to categorize or otherwise filed or the user does not attempt to place the documents in the computer system memory at all because of the realization it will be difficult to organize. This effect tends to negate the advantages of a filing system that has a hierarchical filing system with a graphical user interface.

Every user has a preferred manner to file information in a computer system. Some prefer a file name to distinguish each document while others will implement different hierarchical architecture. Other users will file information according to time. It is hard for someone else to understand what the computer system is keeping in its memory considering the different ways users can tailor the hierarchical filing system. It is hard to understand what is important, what is not, and what is related to what. Interchangeable knowledge is still difficult to attain. This is evident in that it is often difficult to understand the information on an unfamiliar computer and the time needed to familiarize oneself with an unfamiliar system is often time-prohibitive.

Prior art information organizing systems usually do not provide a way to easily understand links between the information. Every information is usually considered as a unique piece of information and only the creator of the information is aware as to what it relates to. An E-mail, a web page, a spreadsheet, or a text document are certainly information but the value they have is limited as long as the links between them is not obvious to another user. Computer system do not have information organizing system that allow the user to perceive efficiently the links that connect information elements in an "understandable story" to get the whole meaning of the information. That is, the user is still oblivious to the trends underneath the information.

When one is given a document to review, there is often a desire to annotate the electronic document similar to annotating a paper copy. Doing so with an electronic document will, similar to the paper version, result in permanent alteration of the base document unless a second copy is made. Furthermore, if different notes and comments are aimed at different individuals, there needs to be as many different copies as there are targets or receivers. It then may be desirable that such annotations be made on a layer that does not alter the original document to avoid creating new documents for each desired target.

In addition, conventional information organizing systems suffer from at least another disadvantage: they do not provide a tool to easily search and visualize the search results starting with an arbitrary information element. Search results provided by conventional information organizing system are given in order of relevancy using typed text as a searching interface. Results are not given using pictures or images although the information would be much more valuable since it is not possible to explain in a short paragraph what a picture can show. When the user is doing a search within a conventional organizing system or even with Internet search engines, the user is usually beginning searching with specific words, topics, or file formats. This allows the user to isolate information elements that contain the searched words either in the title or in the file itself. It is similar with file format in that only file names of a specific format will be showed as a search result.

Often, results will be presented by relevancy using a listing. Relevancy is based on arbitrary considerations depending on the search engine used. That kind of search fails to present search results where the related links with the information element are clearly shown.

With a conventional information managing system, the user must often meticulously store documents in numerous directories. Easily displaying all the elements linked and their sequence of entry is usually difficult. Furthermore, displaying all the elements of information linked by a combination of attributes to display all the linked elements in the order or sequence that they have been entered (it may, for instance, be useful to show a series of communications that have led to a final memo, or a series of reports that have led to a given professional decision) is also impossible.

Conventional information managing systems are often time-consuming and include obstacles that prevent users from maintaining a structured manner, important quantities of information regularly.

For example, if a user wants to keep a "life long" information journal or logbook, the user cannot use prior art information organizing systems to record the information from his/her life. It is not possible for an individual to record and to file various information elements from multiple sources over a long period of time and hope that someone else will be able to understand quickly and efficiently the meaning of the information, the relationship between the information elements as well as the order in which the events occurred.

In corporate environments, it is important that the "knowledge" of the corporation remains usable, regardless of the employment status of the author. Additionally, it is also desirable that the data management methods used by employees be unified, both for efficiency and ease-of-training reasons. That is, a unified system enables the decision-making process to be more coherent. An efficient and coherent information managing system should also be an intricate part of a company quality assurance program.

Furthermore, companies that are engaged in extensive research and development generate substantial files and documents from several sources. As a result, these document-driven firms need a tool to efficiently track these documents. It can be useful to keep track of project history and the objective behind each stage of the project. By maintaining a detailed history, additional projects may be fostered and repetitive projects avoided.

Adding to the need for efficient and organized document management is professional employee turnover. One example of an incentive for a structured file management structure is tax incentive. In some countries, research and development can be tax deductible. In order to have access to the R&D tax credit a company must prove the work was done and with the current filing systems it represents an enormous task to find the information needed to make the proof.

Knowledge tracking, recording, and interchangeability represent a constant challenge and a huge task that prior art systems cannot adequately accommodate.

Maintaining an address book and a calendar or agenda are usually considered by conventional information managing systems as separate tasks using separate software. These two relations to information are fundamental and should be included in a complete designed information managing system.

The prior art computer systems or computer interfaces have not provided solutions to deal with the aforementioned problems and each of these deficiencies in the prior art yield a demand for an improved information managing system and method using an intuitive and natural way to visually present information as well as the associations between the information.

SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the objects and aspects disclosed in a simplified form, as an introduction to the more detailed description that is presented later.

It is, therefore, desirable to provide a method and a system that organize information that is an improvement over known information organizing methods and systems.

The present patent application provides a non-transitory computer-readable medium that includes computer-readable instructions operable to perform a method of displaying an on-screen graphical user interface, the method comprising reading data for a plurality of user-selectable icons associated with attributes, and data for a plurality of content icons representing respective items of contents, generating image data for the on-screen graphical user-interface with a two-dimensional array which includes a first array comprising the plurality of user-selectable icons adapted to be arranged in a specific direction on a screen and which is also adapted to include a second array comprising the plurality of content icons in a direction intersecting the first array on the screen, and outputting the image data for the on-screen graphical user interface related to displaying the contents to a display device, wherein the generating displays the second array to intersect the first array, in accordance with at least one embodiment of the invention.

The present patent application provides a non-transitory computer-readable medium that includes computer-readable instructions operable to provide a graphical user interface comprising a first array of user-selectable icons, at least some of the user-selectable icons being adapted to display a second array of user-selectable icons thereof, the second array of user-selectable icons being substantially orthogonally displayable about the first array of user-selectable icons, in accordance with at least one embodiment of the invention.

The present patent application provides a system capable of displaying contents, comprising a control which acquires an instruction for displaying of contents via a users manipulation; a storage which stores data for a plurality of attribute icons associated with respective types of content, and data for a plurality of content icons representing respective items of contents; a display output module which outputs image data for an on-screen menu related to displaying of the contents to a display device and which displays the contents acquired from the storage in response to the users instruction acquired by the control; a display controller which generates the image data for the on-screen menu with a two-dimensional array which includes a first array comprising the plurality of user-selectable icons arranged in a specific direction on a screen and which also includes a second array comprising the plurality of user-selectable icons in a direction intersecting the first array on the screen, wherein the display controller displays the second array to intersect the first array at a position of one of the user-selectable icons selected by the user, and if the contents are adapted to be chronologically ordered, represents the chronology by displaying the content icons in chronological order in the second array each time the control acquires an instruction to move an icon provided by a game controller, in accordance with at least one embodiment of the invention.

These and other advantages and features of the present invention will become apparent from the following description and the attached drawings.

BRIEF DESCRIPTION OF THE DRAWINGS

FIG. 14 depicts a more detailed view of the characterization attribute window from the attribute sub-area in the SMLOI;

DESCRIPTION OF EMBODIMENT(S) OF THE INVENTION

A System and Method for Locating and Organizing Information (SMLOI) stored in the memory of a computer system will now be described in detail. The following description, specific steps, procedures, method, commands, graphic representation, computer user interface and other specifics are set forth in order to provide a thorough understanding of the present invention. However, it will be apparent to one skilled in the art that the present description of the invention provides only one example of how someone skilled in the art can produce the claimed invention. It will also be apparent to one skilled in the art that the present invention may be practiced without the specific details. In other instances, well known systems and methods are shown in schematic and diagrammatic form or not shown at all in order not to obscure with unnecessary details the present invention.

The "Vector" Knowledge Theory

In order to build a good knowledge management system it is necessary to analyze how knowledge is acquired and how it is processed by a human being. A model was created to help understand how people are managing information and knowledge.

To improve the efficiency of knowledge management, the usefulness of the knowledge should be increased. If the knowledge is defined as the sum of the information retained, it can be said that the increase in efficiency of knowledge management can be attained by improving the usefulness of the retained information. The usefulness of the information lies in its ability to be understood, recorded, classified, retrieved, extracted and shared.

Figure 1:
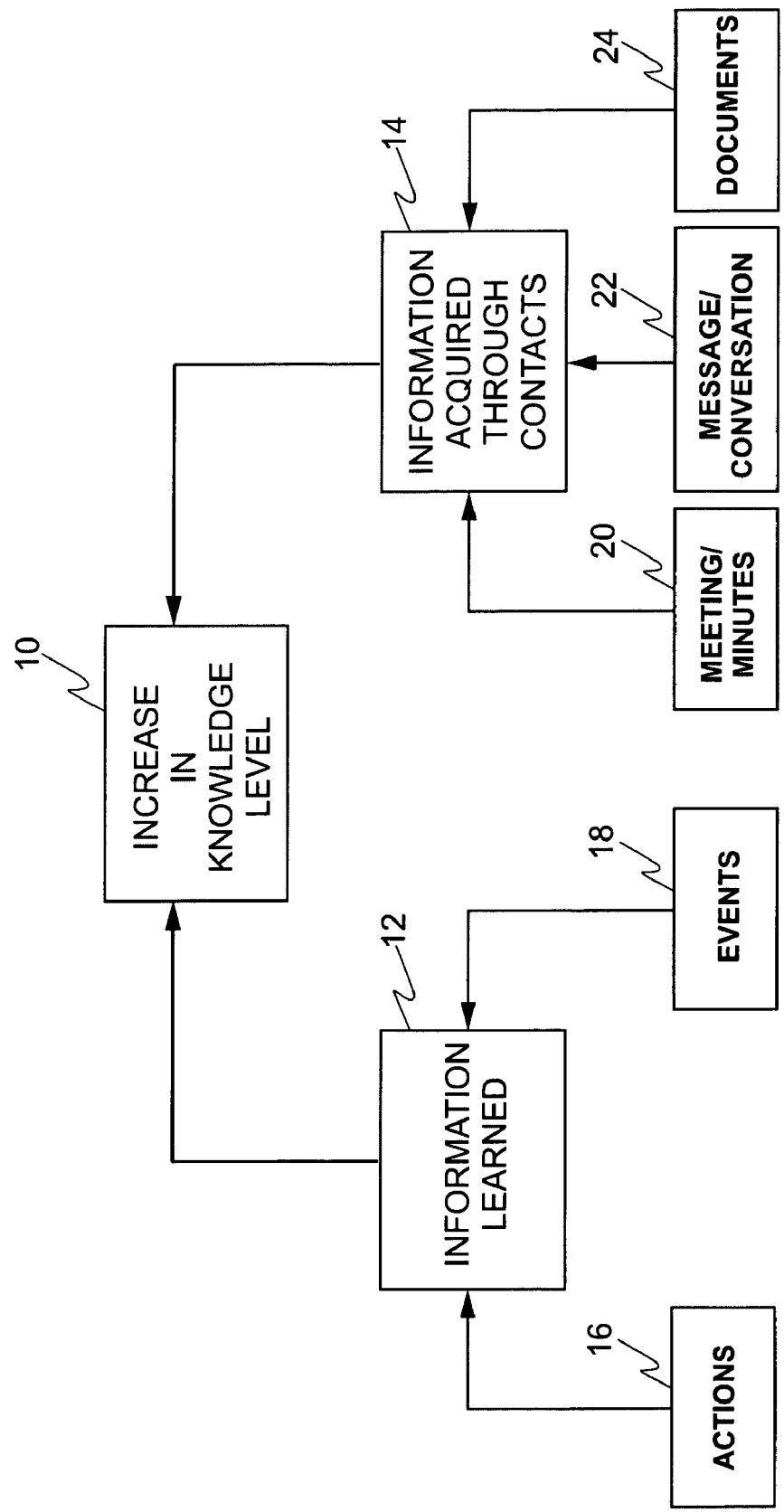
FIG. 1 is a block-diagram of the sources of information leading to growth in knowledge.

FIG. 1 illustrates how someone's knowledge level 10 increases. Information is acquired through contact 14 with other individuals or learned 12. The learned information 12 can be provided by actions 16 and events 18. FIG. 1 illustrates also that information acquired through contact 14 with other individuals can come from meetings or minutes 20, messages or conversations 22, and documents 24.

Figure 2:
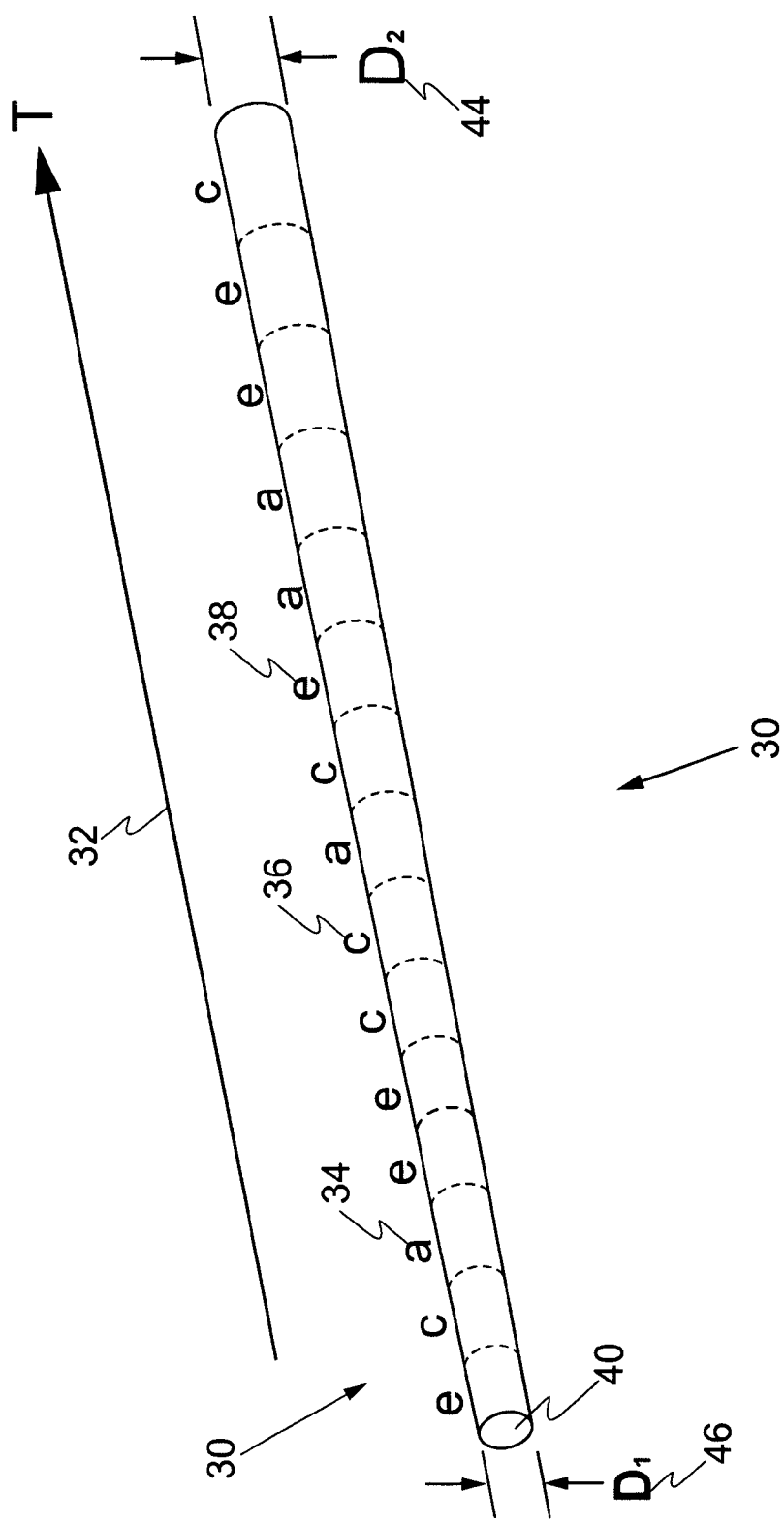
FIG. 2 depicts the growth of an individual's knowledge in time using the vector theory.

The information gathering process is continuous for an individual. FIG. 2 shows the path of an individual, schematized by a cylindrical shape 30, relative to the absolute time vector 32, as being a continuous gathering of information. The cylindrical shape 30 is a schematized vector and will be explained in details later in this description. The gathering process is operating through actions "a" 34, contacts "c" 36 and events "e" 38 for the purpose of this description. The amount of the knowledge or information is represented by the cross area 40 of the cylindrical shape 30, and, as information is acquired through time 32, the knowledge is increased, hence, diameter $D_2$ 44>diameter $D_1$ 46.

Figure 3:
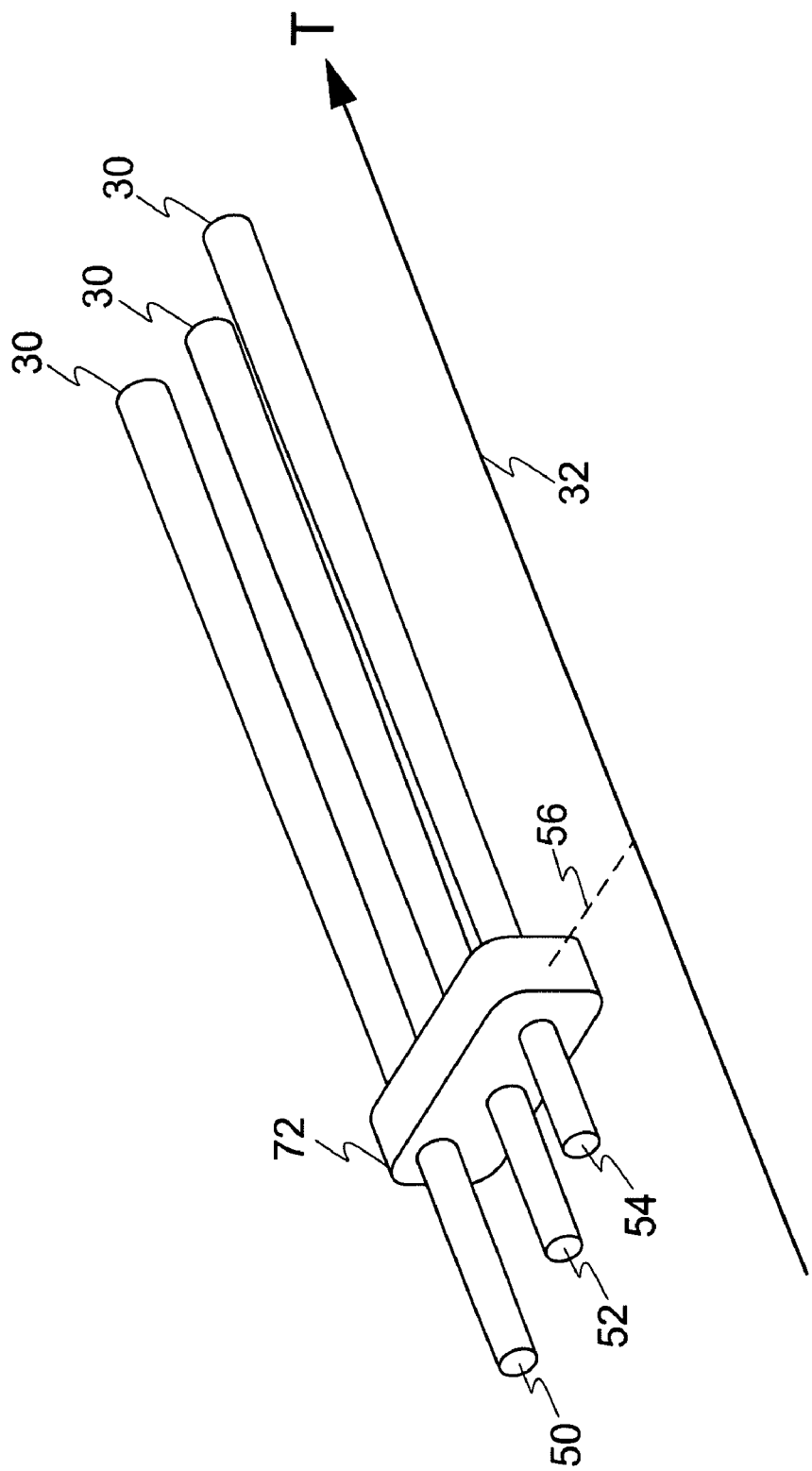
FIG. 3 depicts multiple individual's vectors in time.

FIG. 3 shows three cylindrical shapes 30 that represent the continuous, parallel paths of three different individuals 50, 52, and 54, respectively, relative to time 32. Interaction 72 occurs between individuals 50, 52, and 54 at time point 56 on the absolute time vector 32.

Figure 4:
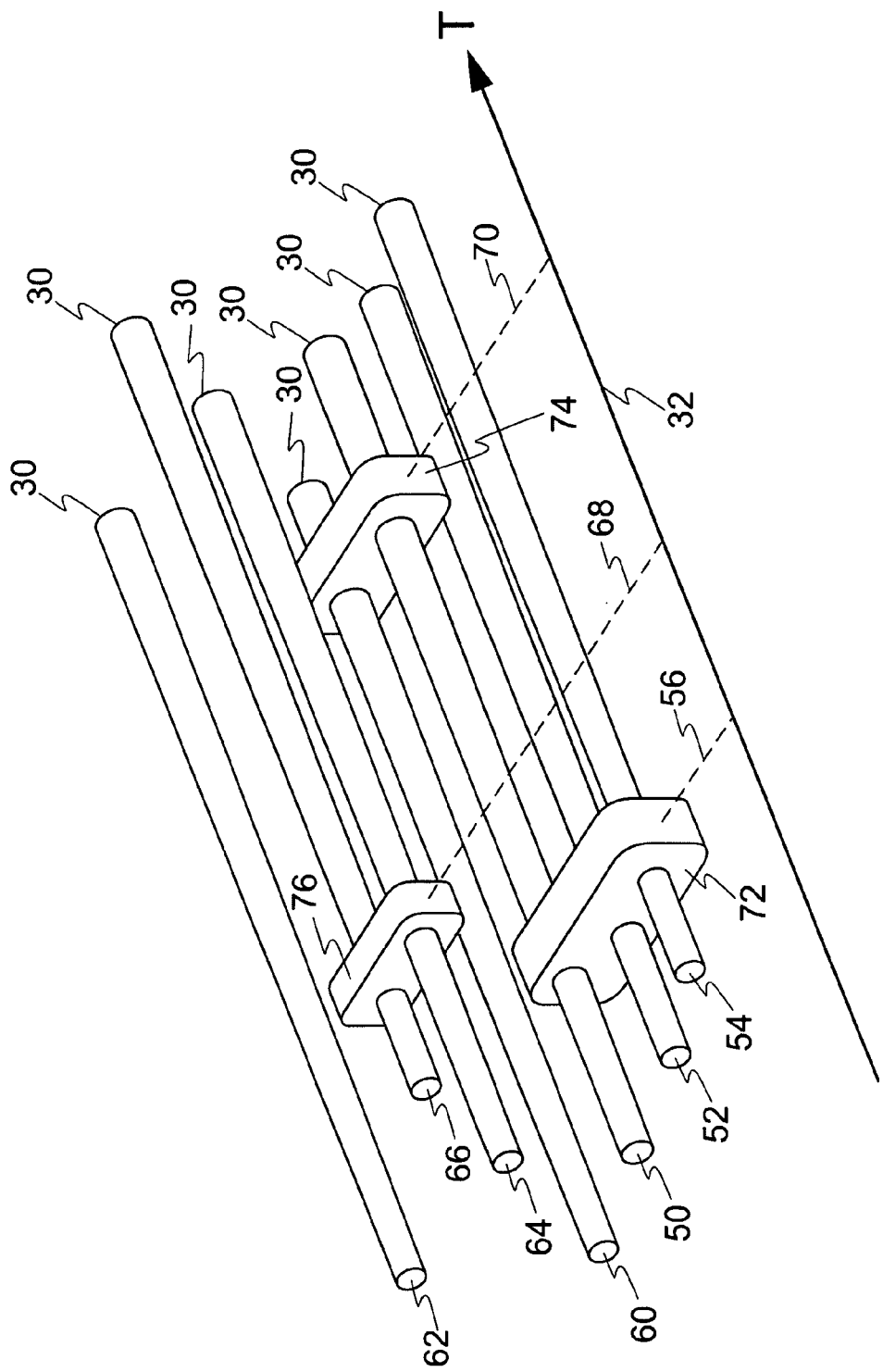
FIG. 4 depicts the parallel vectors of individuals in time and the contacts leading to the exchange of information between them.

FIG. 4 shows the continuous, parallel path of individuals 50, 52, 54, 60, 62, 64, and 66, respectively, relative to time 32. Interaction 76 occurs between individuals 64 and 66 at time point 68, interaction 74 occurs between individuals 50 and 60 at time point 70, and interaction 72 occurs between individuals 50, 52 and 54 at time point 56. At interactions 72, 74, and 76 the contacts are likely to generate an exchange of information. The information can be of a personnel or a professional nature. For example, if individuals 50, 52, and 54 are employees of the same company their professional information transmitted during event 72 at time point 56 may be labeled as corporate.

Figure 5:
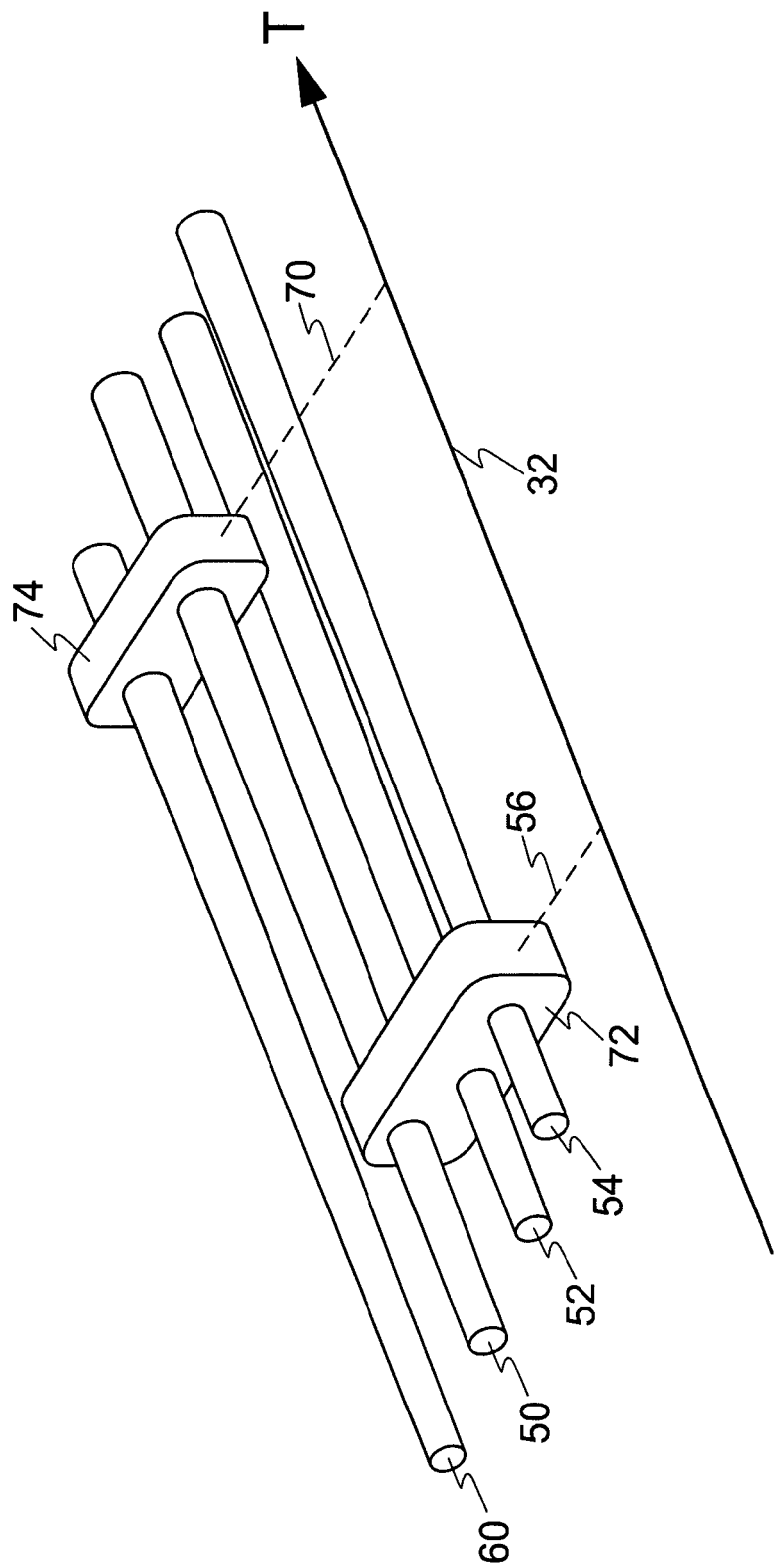
FIG. 5 depicts the bicephal (personal/professional) aspect of an individual's path in time.

FIG. 5 shows the path of individual 50, 52, 54 and 60 with one professional interaction 72 at time point 56 and one personal interaction 74 at time point 70. Personal interaction 74 is labeled and considered differently than a professional interaction 72.

The cylinder 30 diameter variation, as shown in FIGS. 2 to 5, represents the amount of knowledge 10 acquired by an individual. Equations and algorithms can be applied to that cylindrical representation 30 of the increasing diameter 46. Some of the variables may be the time vector 32, the cross area 40 of the cylinder 30, the time between contacts, the number of individuals, the nature of contacts, the diameter variation rate, the contact rate, the event rate, and the communication rate.

Accordingly, this theory, as schematized by this model, considers the time as a major reference in the knowledge gathering process of an individual. Different interactions between individuals generate information exchange. Further in the description it will be useful to understand that the schematized cylindrical shape 30 is a vector, further described as 230 and 232, in the SMLOI.

The Computer System

Figure 6:
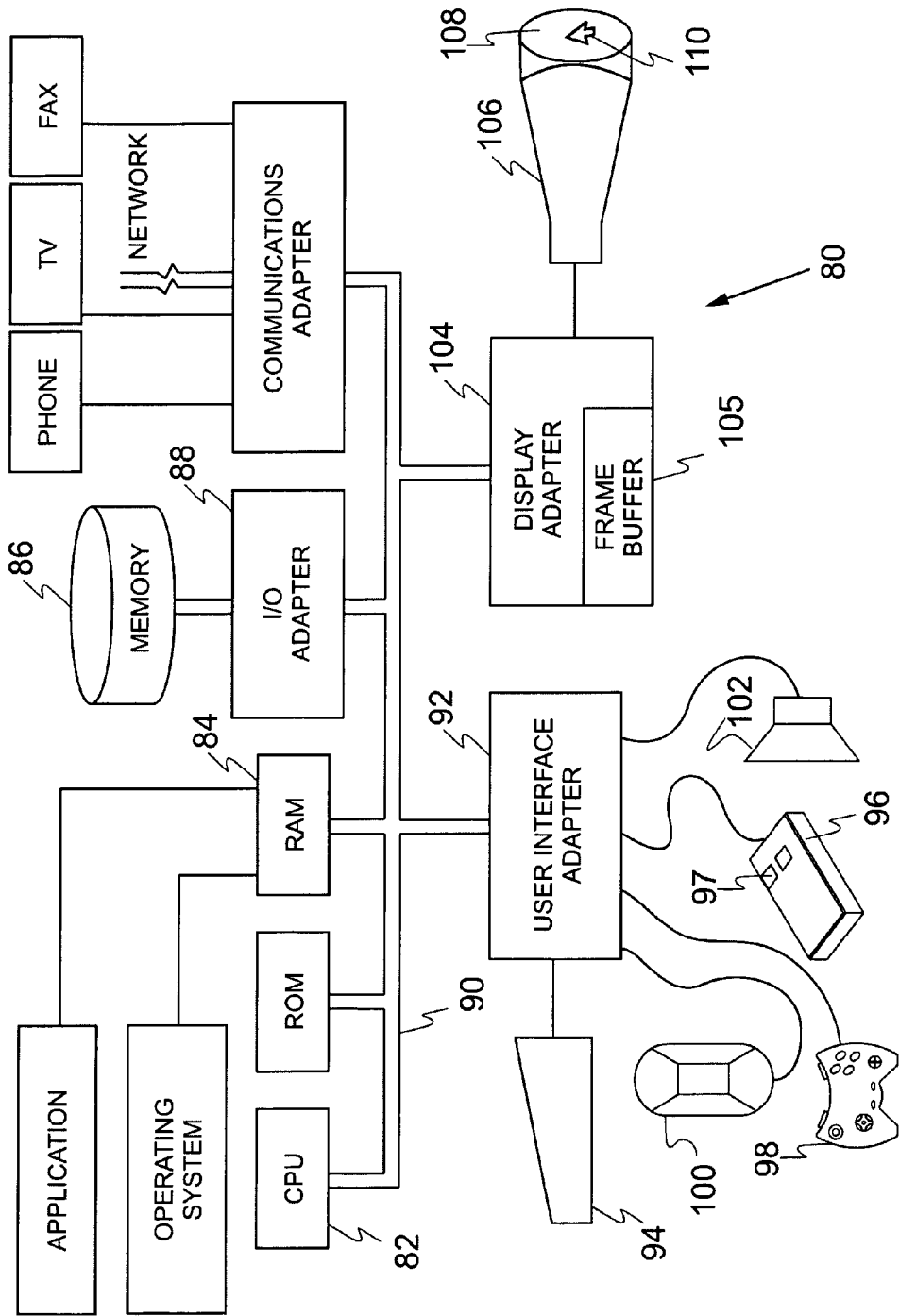
FIG. 6 is a block-diagram of an integrated hardware and software computer system.

The System and Method for Locating and Organizing Information (SMLOI) of the present invention is part of a computer system such as the one shown in FIG. 6. The computer system shown in FIG. 6 is a complicated one, it could have been described only by an input/output interface unit, a system bus or network, a storage device and a processor. The type of computer system presented in FIG. 6, that is well known by one skilled in the art, includes a processing means, such as a microprocessor, a memory mean 84, such as system RAM, and a storage means that can be network based, such as a hard disk or other storage means having a high capacity for storing documents and other information maintained by the filing system. The processing means 82, the memory means 84, and the storage means 86 (which may have its own I/O controller 88) are interconnected by a system bus 90 which includes control signals as well as address lines and data lines for sharing information, including data and instructions, between the components of the computer system. Also connected to the system bus 90 is an I/O controller 92 which controls the signals received from a keyboard 94, a mouse 96, an image capture device 100, a microphone 102, and a game control 98 and provide those signals, which indicate instructions from the user, to the computer system. A display controller 104 is coupled to the system bus 90 and receives commands and data from the processing means 82 and from the memory means 84 via system bus 90. Display controller 104 controls a display device 106 in order to provide images for the user. It will be appreciated that the typical computer system includes a bit mapped screen stored in memory, which may be a dedicated frame buffer memory 105 or the system memory. As shown in FIG. 6, a display means 106 displays on a display screen 108 a cursor 110, which is controlled by the pointing device 96. The display means 106 may be any one of a variety of known display systems, such as a video (CRT) display monitor or a liquid crystal display. Future display devices such as E-paper, rolled screen and other display devices such as direct retina projection, direct brain stimulation means, and means for 3D representation are also considered as appropriate display devices. The SMLOI can also use a gaming console or a portable data assistant (PDA) as a computer system.

The pointing device 110 of the present invention may be substantially identical to the cursor control means shown in U.S. Pat. No. Reissue 32,632. However, it will be understood by those in the art that many other types of cursor control means may be utilized, such as graphic tablets, keyboard, touch tablets, trackballs, pen input mechanisms, touch screens, game controller for game console, etc. Indeed, any device capable of indicating x-y locations and capable of controlling a cursor on a display means of the computer system may be utilized in the present SMLOI as a pointing device. This includes the "target point" located in the center of the display means in action video games.

The pointing device, such as a mouse 96 will often include a signal generation means which typically includes a switch connected to a button 97. A user presses the button 97 to send one signal to the computer and releases the button to send another signal to the computer. Other signal generation means, as is well known in the art, may be used such as using certain keys on a keyboard 94 or using a pen input device which positions a cursor and, by pressing the pen's tip, or simply a finger, against the display screen, selects the item pointed to/pressed at on the display screen.

Other kind of devices can be utilized as pointing devices and can also work to indicate x-y and x-y-z locations if the display device allows the user to perceive a third dimension. Game pad, tactile glove, voice activation and other kind of pointing devices means are considered as appropriate pointing devices.

Entering a document, which can be any kind of digitized information, in the present invention can be made in more than one way, through at least one action on the computer system. One way is as the user is working on a document through an application software to click on the designated SMLOI icon located in typical windows-like operating system in the "task bar" or "status bar". One alternate way in a typical windows-like operating system is to drag a document (opened or not) on the SMLOI icon on the "desktop" and drop it. One other alternate way is for the user to consider his/her SMLOI as a printer, and do a print-to-the-SMLOI command. One other alternative way could be for the user to consider his/her SMLOI as a drive, and do a save-under-the-SMLOI command. The SMLOI icon can sit in the "dock" in an apple-like environment. The SMLOI can also have embedded functions in other applications that automatically achieve the same actions or tasks.

Figure 7:
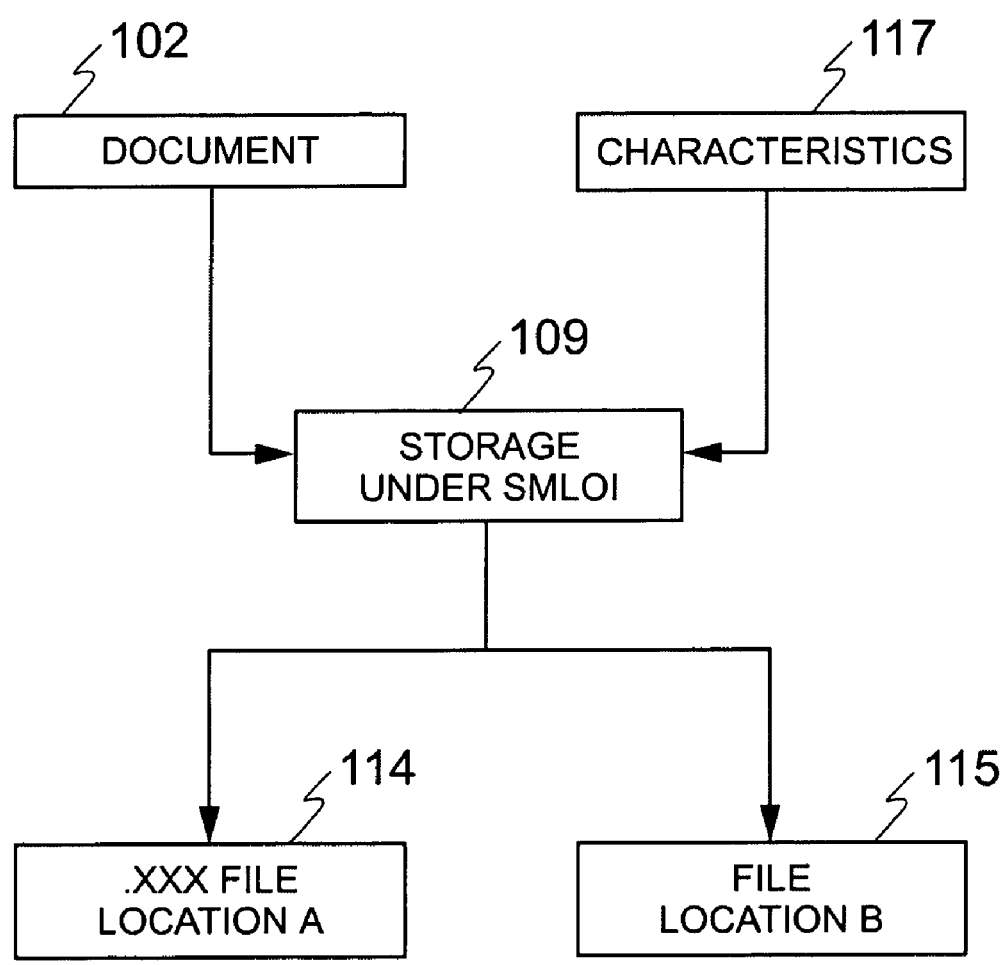
FIG. 7 is a block-diagram of a filing process controlled by the SMLOI.

In the SMLOI, the management of the computer memory space allocation can be handled by the SMLOI. FIG. 7 shows a block-diagram of such a handling from the SMLOI. The document 102 is linked to the characteristics 117 and stored 109 under the SMLOI. The SMLOI can generate a standard file 114 on the storage means 86. The SMLOI could provide the added benefit of automatically encoding and/or encrypting all files and generating a unique or multiple ".SMLOI" type files 115 making their access without the SMLOI impossible, thus increasing security.

All existing documents or other data in a computer system directory can be entered in the SMLOI as the SMLOI is installed on the computer. All files from different memory devices and storage devices such as a floppy disk, a hard drive, magnetic tape, optical drive, RAM, Flash memory, DVD, CD-ROM or other memory support can be entered as SMLOI elements as a result of a single enter-in-SMLOI command. All incoming e-mails and their attached files can be entered in the SMLOI as a result of the choice of such a default mode in the SMLOI setup options.

Figure 8:
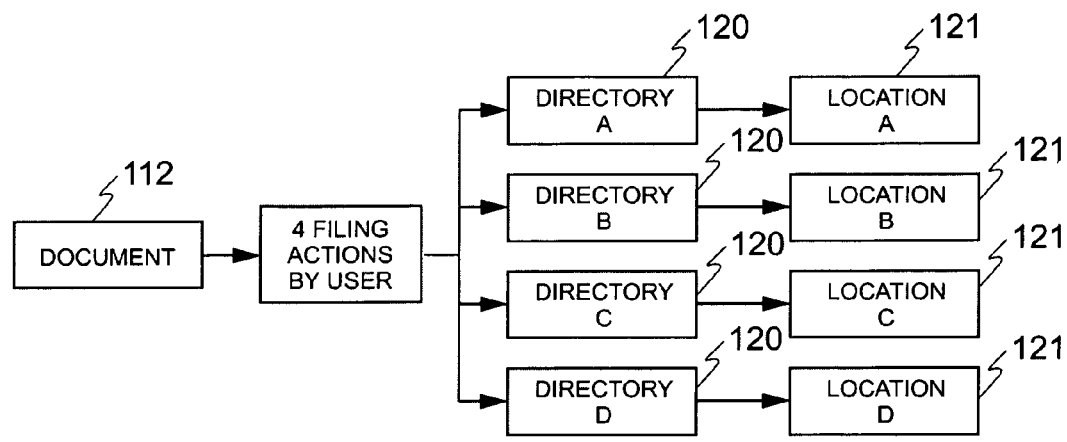
FIG. 8 is a block-diagram of the multiple unique filing process controlled by a prior art operating system.
Figure 9:
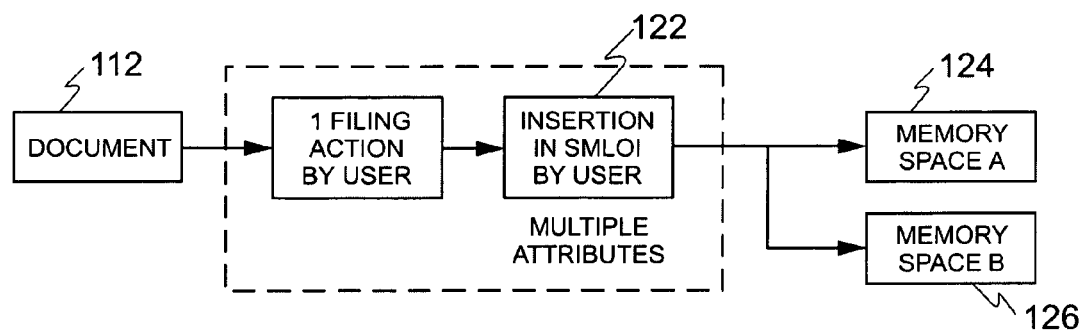
FIG. 9 is a block-diagram where the multiple-link part of the filing process is controlled by the SMLOI.

The SMLOI reduces the number of times a document file has to be saved in the computer memory means. FIG. 8 shows a block-diagram of a prior art system, where a document 112 gets linked to four different subjects or topics, namely A, B, C and D. This is accomplished by filing copies of the document into four different directories 120, occupying four locations 121 in the computer's memory and four times the memory space. FIG. 9 presents a block-diagram of the SMLOI where a document 112 is singly stored in the computer's memory (through the operating system OS or SMLOI) and entered in the SMLOI. The document is then attributed related characteristics. The only memory spaces occupied are then for the document itself 124, and its SMLOI-only information 126, respectively.

Figure 10:
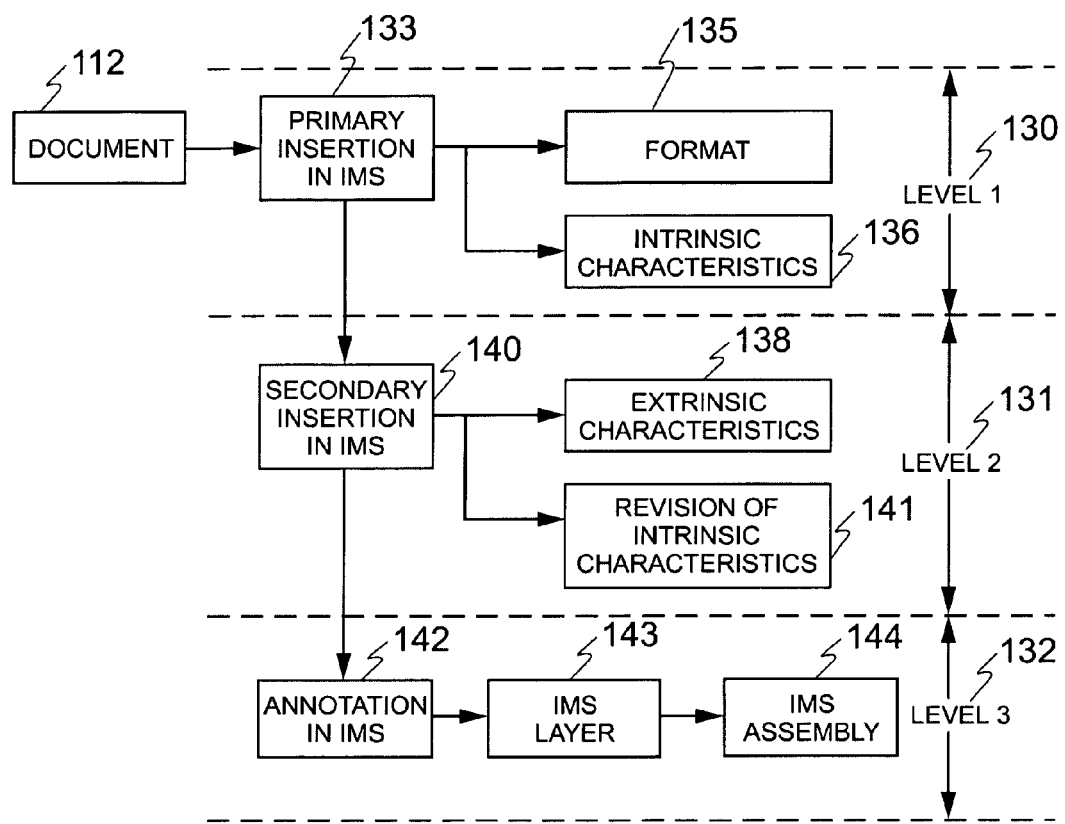
FIG. 10 is a block-diagram of the information insertion levels in the SMLOI.

FIG. 10 shows a block-diagram of the system levels. Level zero corresponds to the level without the SMLOI. Level one 130 is attained through installation of the SMLOI. Level one 130 allows the SMLOI to record a document with minimum interaction with the user. Level one 130 considers the primary insertion 133 as a "drag and drop" like means action from the user. The SMLOI automatically records the information linked to the document 112 such as the file format 135, the time the insertion in the SMLOI was made, and the size of the file. These characteristics are considered as intrinsic characteristics 136 because they only ask for the insertion action from the user.

Level two 131, as presented on FIG. 10, is the same as level one 130 with the addition of extrinsic characteristics 138. Extrinsic characteristics 138 correspond to the information known by the user that helps with understanding the meaning of the document 112, to that which it relates, and all other information that can assist with understanding the value of the document 112. Simply, each document has its own unique extrinsic characteristics. The addition of the extrinsic characteristics requires more actions from the user. As such, level two 131 is considered a secondary insertion 140 because it can be done at a different time from the primary insertion 133 in the SMLOI. Level two 131 also allows the user to modify intrinsic characteristics 141. Level one 130 and level two 131 do not alter the document in the SMLOI itself.

Figure 11:
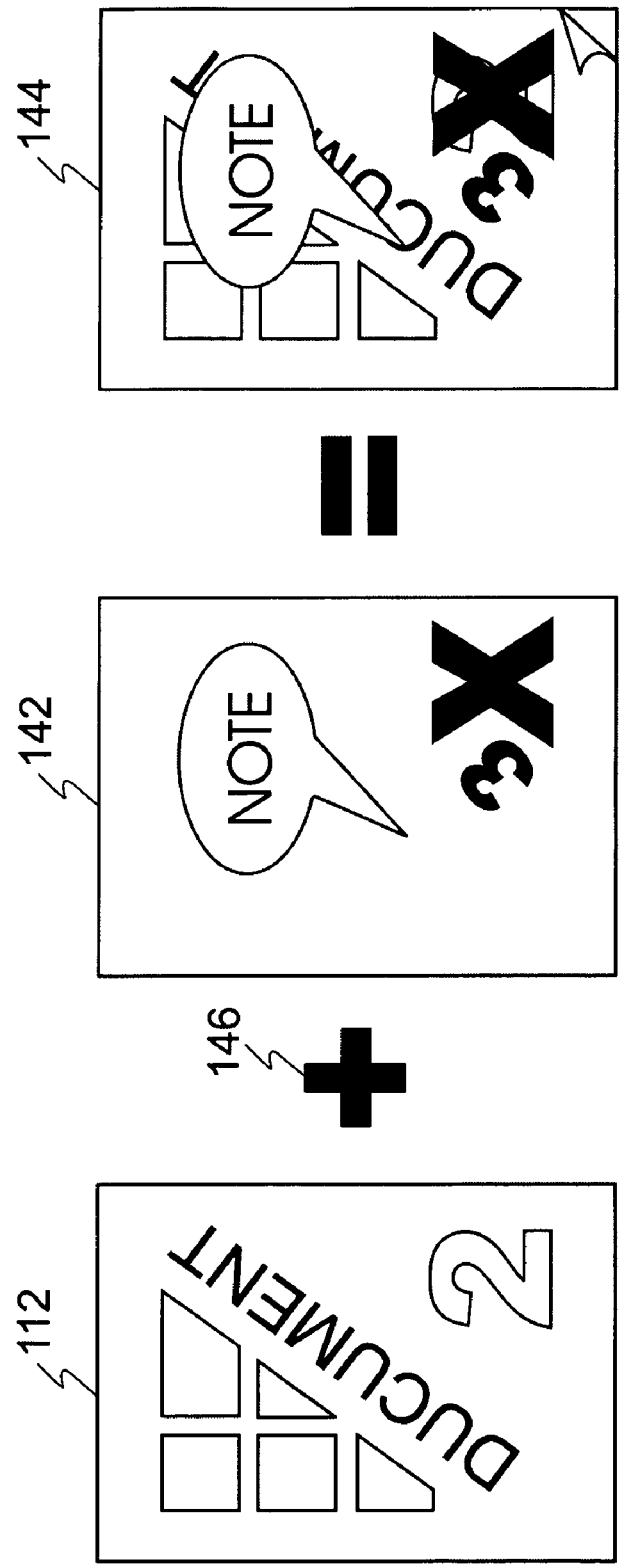
FIG. 11 depicts the notions of information's layer, version and assembly.

Level three 132 brings the user to a level where the document may be modified in the SMLOI. Annotations 142 can be made by the user in order to add more meaning to the document already entered in the SMLOI. The annotation, namely a layer 143, can be considered as a distinct document. FIG. 11 shows an annotation 142 on which the user can chose to merge 146 the layer 143 so it will become an assembly 144. An assembly 144 is an independent document. Actions on documents through application software can be monitored by the SMLOI and altered documents being saved and entered automatically as new annotations in the SMLOI as a level one 130 insertion.

In order to increase the efficiency of the SMLOI, computer peripherals that are well known in the art such as printers, scanners, or safety systems such as the ones used for biometrics recognition of the user can be under direct control of the SMLOI. The SMLOI can also rely on the operating system (OS) to accomplish these tasks. To further increase the efficiency of the SMLOI without requiring too much of the user, links between the SMLOI and certain application software for functions such as e-mail, agenda/schedule or network access may also be provided.

In order to capture ongoing audio stream media or video stream media, a memory buffer allows the user to constantly record information so the user can keep information before he/she gives the recording order. The memory buffer continuously records the streaming media that was seen and/or heard by the user. The buffer has a user's specified time length and eliminates old data to record new data unless the user has instructed the system to record that which is in memory. Useful data is then kept in another memory location for further consultation.

The Information Element

A document, or every other kind of data, recorded in the SMLOI is preferably represented using a unified format. The document under its unified format is called an "information element". One of the goals of a unified format is to provide an easy and constant manner of presenting various documents or data, using the same pattern. An information element can also be done by direct writing by the user inside the SMLOI using any mean like a keyboard or a pen-pointing device. An information element generally presents an image of the document, the multiple characteristics linked to the inserted document, and other information related to document and to the SMLOI. The information element presents either an image of the document or the real document itself. The user can access the real document using the application program on the computer system directly through its information element.

Each information element is composed by a document and by "areas". The "areas" are presenting, preferably in a standardized manner, the information related to the document in order to give the user an instantaneous overview of what is related to a given document. The areas are distinct for every information element and are generally superposed on the related document while letting the underneath document image appear in order to allow the user to see the document. The areas are also utilized to manipulate the SMLOI functionality and are considered as a specific interface for each information element in the SMLOI. The SMLOI then provides a global interface and multiple specific interfaces.

Figure 12:
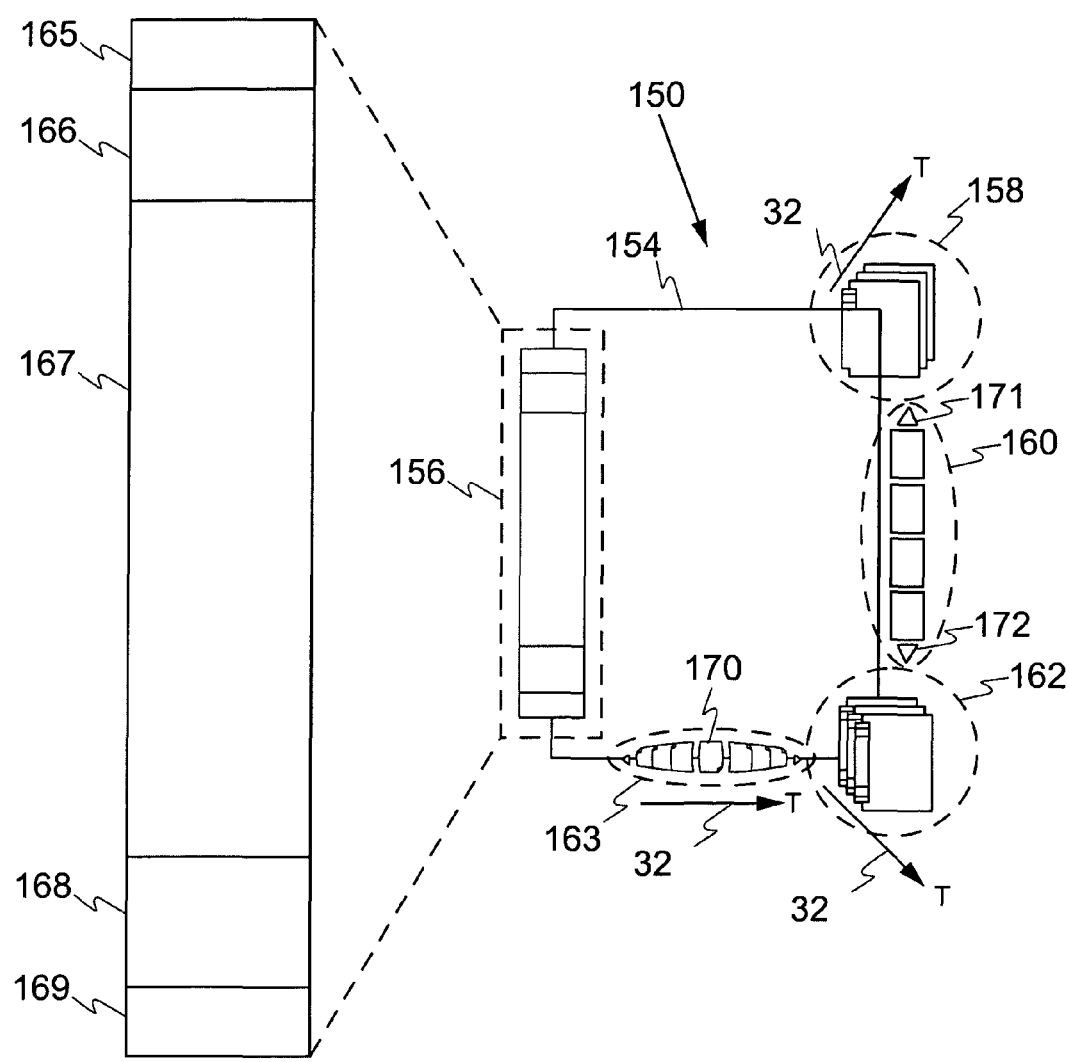
FIG. 12 depicts the SMLOI information element.

FIG. 12 shows a complete information element 150 unified representation. The document image 154 is completed by an information area 156, an anterior assemblies area 158, an intra-document multi-page area 160 and an ulterior assemblies information area 162. Alternatively, the anterior and ulterior assemblies information areas can be located at the information element bottom 163.

The information area 156 is itself divided between a date of entry sub-area 165, an event-task-action sub-area 166, a information element characterization attributes sub-area 167, a hyperlink sub-area 168 and an entry sequence number sub-area 169. The information area 156 as presented by FIG. 12 is partially surimposed on the document so it is easy to see which area is related to a specific document.

The date of entry sub-area 165 indicates the moment when the information element was inserted in the SMLOI. Generally the user keeps the entry date generated automatically by the SMLOI but it is possible for the user to voluntarily modify the date of entry. The date of entry can be modified if the user wants the information element to appear in the SMLOI at a different sequential order. If the date of entry is modified, the original date of entry can be kept by the SMLOI. The information element that has multiple dates of entry can be seen at multiple places in the sequential order of the SMLOI.

FIG. 12 shows the event-task-action sub-area 166. This sub-area has the specific role to provide all kind of time-related information to the SMLOI user. Time-related information includes meetings, tasks, alarms, status, reminders, or the like. Icons and text are mixed to give a visual effect in addition to sound that attract the user's attention. The background color of the event-task-action sub-area can change to give the user further visual indications. For instance, green could mean that everything related to that information element is completed, while yellow could mean that something is currently ongoing and red that something is late or past-due. Flashing background color may also have a specific meaning. Selection of this sub-area 166 or selection of the text/icon using the pointing device acts on specific functions as the creation or the modification of a task, an event, or an alarm. The information contained in this sub-area may also generate a to-do list or be fully integrated with the agenda.

The characterization attributes sub-area 167 as shown in FIG. 12 presents intrinsic and extrinsic characteristics that provide the meaning of the information element according to the SMLOI user. The characterization attributes can be categories, information element types, status, specific sequences according to time or statistic results; it is in fact any mean that gives order or meaning to the information elements. The user can have its own characterization attributes and can have characterization attributes that are shared by a group of SMLOI users. Each characterization attribute selected by the user to be linked with the information element will be presented in this sub-area 167. The visual presentation of each characterization attribute will preferably be in the form of a button or an icon so the SMLOI user can easily select anyone of them individually or in group with the pointing device. The latter action will allow the user to generate relative vectors that will be further explained in this description. The visual aspect of the selected characterization attributes will change so the user will easily know which characterization attribute has been selected. The background color of the sub-area 167 can change to give the user further visual indications. The order in which the characterization attributes are presented in the sub-area is set according to the user's preferences.

The hyperlink sub-area 168 as shown in FIG. 12 contains external hyperlinks and internal hyperlinks. External hyperlinks are generally of two types, internet related hyperlinks and other users' SMLOI direct access. Internal hyperlinks are generally direct links to other information elements in the SMLOI of the same user. This has the purpose to give direct access to the information element references so the user can have a quick overview of the links to the information element he or she is visualizing.

The entry sequence number sub-area 169 as shown in FIG. 12 presents a sequential number that indicates the sequence in which the information elements are entered in the SMLOI. The entry sequence number helps the user to have an intuitive way of classifying each information element. The entry sequence number are hyperlinks in the SMLOI so it is possible for the user to use them to draw quick access path between different information elements in the SMLOI. The entry sequence number can be used as hyperlinks between multiple distinct SMLOI thereby giving direct access to other users information elements using the same intuitive method; although, when a user has another user entry sequence number in its SMLOI this entry sequence number will be preceded by the other SMLOI user number.

FIG. 12 also shows the anterior assemblies area 158. This area gives the user a direct view of the anterior assemblies, versions, or annotations of the visualized information element according to the time vector 32. The user can directly access another information element assembly by selecting the desired assembly in the anterior assemblies area 158.

FIG. 12 shows the ulterior assemblies area 162. This area gives the user a direct view of the ulterior assemblies, versions, or annotations of the visualized information element according to the time vector 32. The user can directly access another information element assembly by selecting the desired assembly in the ulterior assemblies area 162.

FIG. 12 also presents an alternate way for presenting the anterior and ulterior assemblies. The alternate anterior and ulterior assembly area 163 presents various assemblies, versions, or annotations, according to the time vector 32. The current information element 150, in FIG. 12, is also presented in the anterior and ulterior assembly area 163 as the assembly at location 170. Variation in the size of the presented assembly helps the user to perceive the closest assembly from the currently visualized information element 150, 170.

The multi-pages document area 160 as shown by FIG. 12 presents to the user a few other pages from the information element 150 if the information element 150 includes more than one page. If the information element 150 includes for instance 5 pages, the multi-pages document area 160 will present the four that are not shown in the document image 154. The user can select them if he or she wants to have a bigger picture of the desired page. If the number of pages is larger than the space available arrows 171, 172 will indicate that there is more pages to see so the user can scroll up or down to visualize them.

Figure 13A:
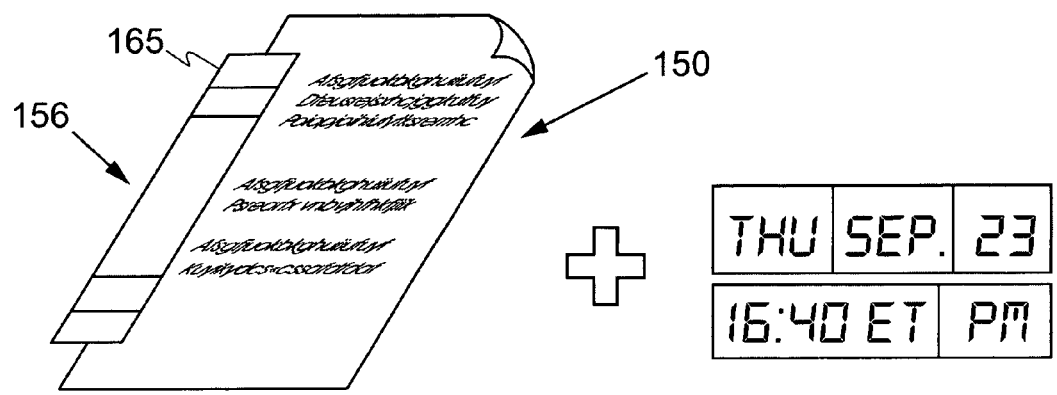
FIG. 13a depicts a real-life document and a date and time counter.
Figure 13B:
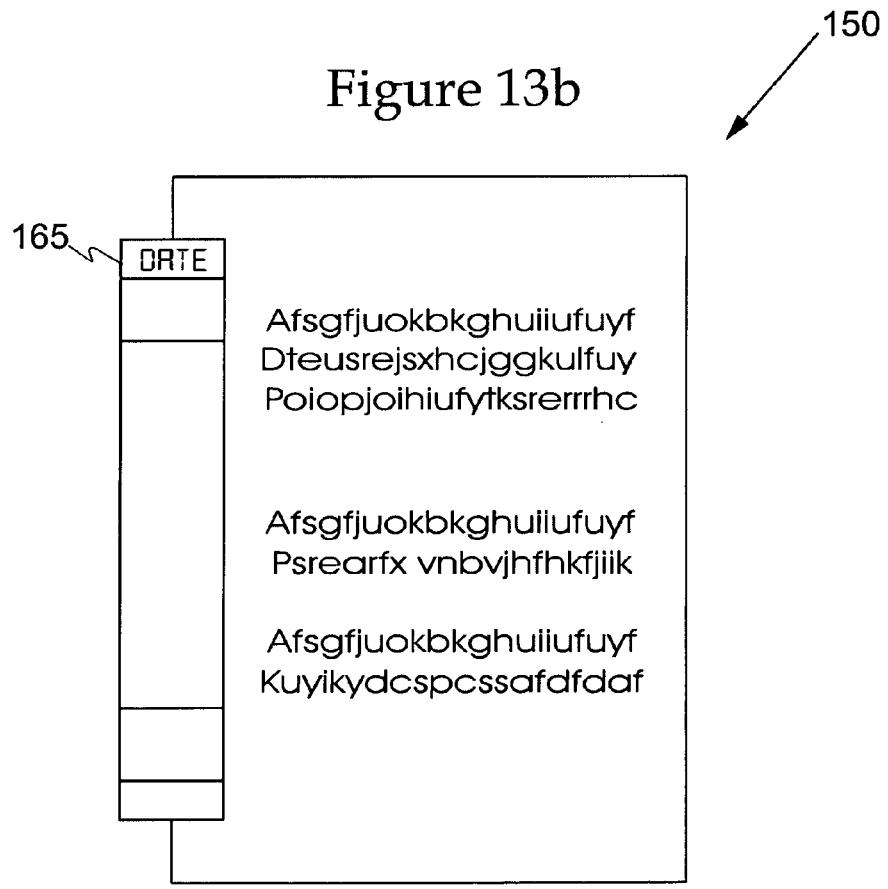
FIG. 13b depicts a unified format representation of a document.

FIG. 13*a* presents an information element 150 with its information area 156. The date of entry area 165 generated by the SMLOI is applied to the information element in FIG. 13*b*. The date the information element is entered in the SMLOI can be seen in its date of entry area 165. The background color of the date of entry area can change to give the user further visual indications. Selection of this sub-area using the pointing device acts on specific functions.

When the user inserts a document in the SMLOI he or she can select the appropriate characterization attributes. FIG. 14 presents a means to select the appropriate characterization attributes for an information element 150. Entry window 174 is used for the display of the intrinsic and extrinsic characterization attributes. FIG. 14 also presents, for instance, only extrinsic characterization attributes. When the user clicks on the characterization attribute sub-area 167, the information element characterization entry window 174 opens, allowing the user to add, modify, or delete information element characterization attributes while getting access to his/her list of "favorites" characterization attributes. The user can either type in a new 176 characterization attribute or click on the proposed characterization attribute or click on the arrow to have the characterization attribute list appear on a specific topic. Picking one with a pointing device from the list will make it appear with a button in the characterization attribute sub-area. To increase the first-glance impact, symbols and colors are added to the characterization attribute sub-area 167 as well.

In the event of a subsequent alteration of these characterization attributes, a trace can be kept of both the change details and the original information. Not all extrinsic characteristic attributes need to be typed in each time. That is, user should be able to build his/her list of favorites, and to select from it. The most frequently characterization attribute can be displayed automatically at the top of the list by the SMLOI. The user is also able to link an information element to a task he or she has to perform or to an event, such as a meeting minutes being linked to the agenda. These are statutory characterization attributes.

Figure 15:
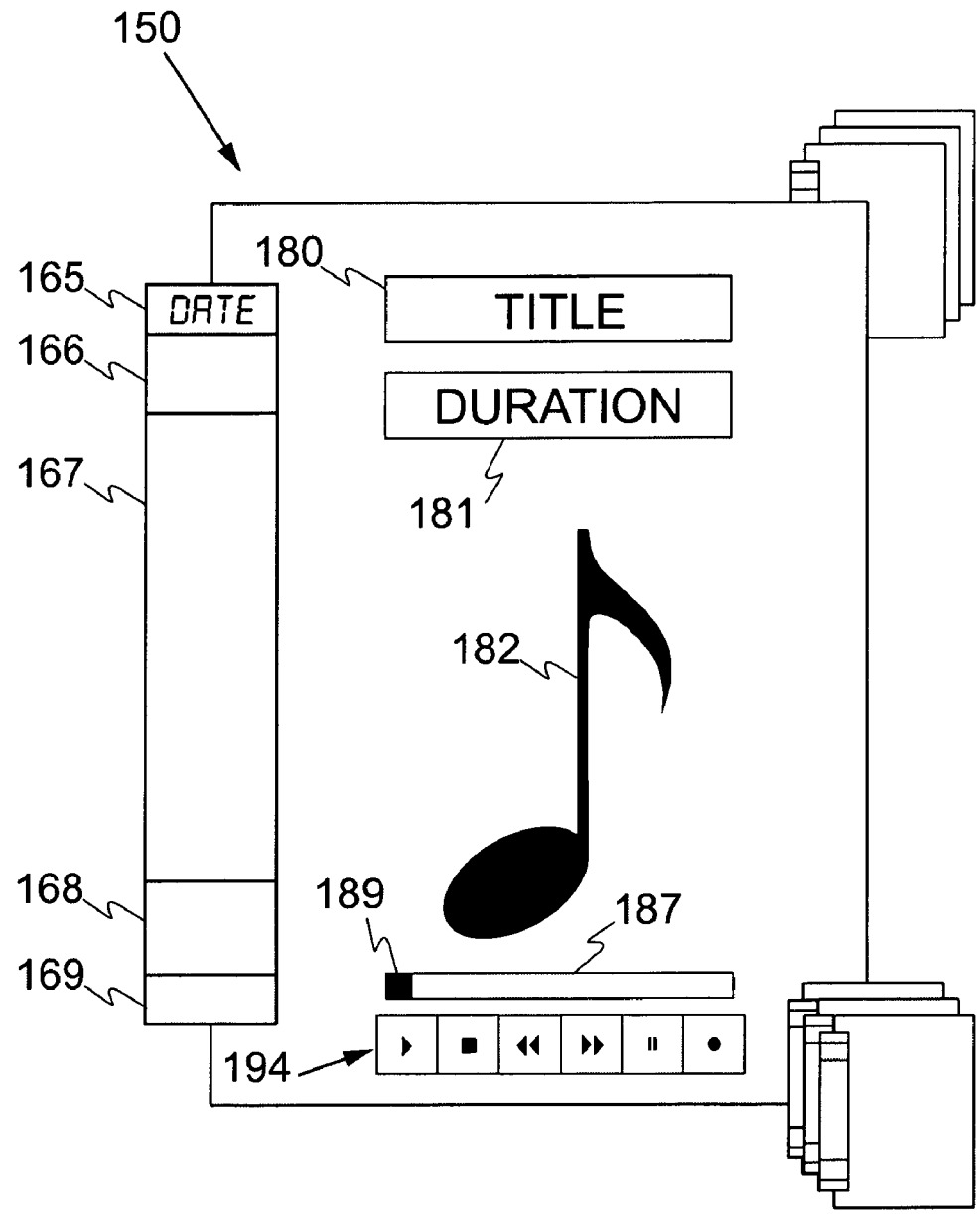
FIG. 15 depicts a SMLOI information element, an unified format representation of an audio document.

The SMLOI provides a unified format for audio and video documents. FIG. 15 shows an information element 150 that is an unified format representation of an audio document with its title 180, duration 181, and audio symbol 182.

Figure 16:
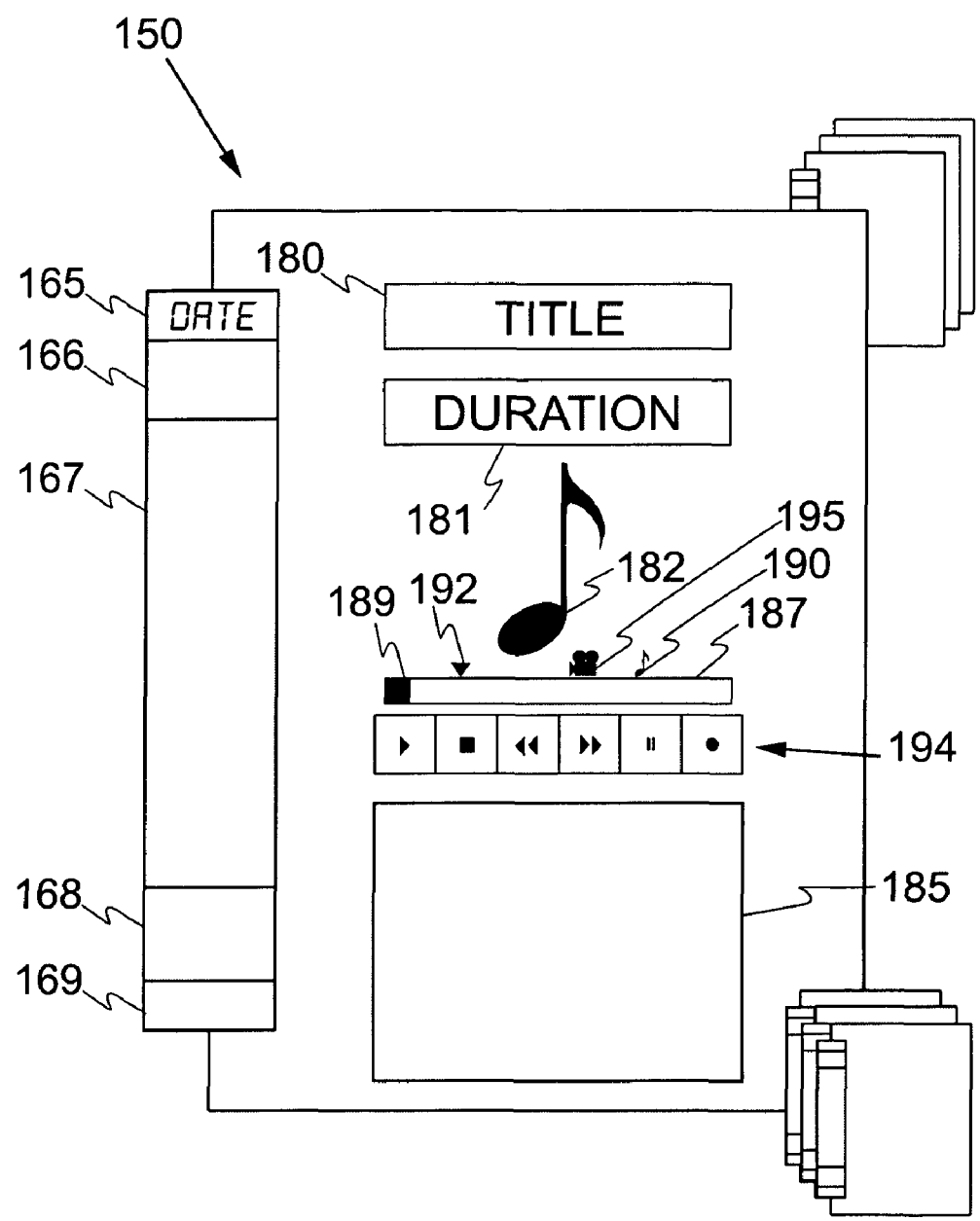
FIG. 16 depicts an alternate dynamic assembly of an audio unified format representation document in the SMLOI.

FIG. 16 shows a dynamic layer over the unified format representation of an audio document. The title 180 and symbol 182 are part of the basic audio information element 150. Dialog box 185 is part of the layer and allows the commentaries to be displayed/sounded as the basic audio information element is displayed. The display bar 187 gives an idea to the SMLOI user on the position of the audio listening. The position indicator 189 moves from left to right as the video document is played in typical media player fashion; using the pointing device, the user can drag this position indicator 189 to the left or the right, and resume listening to the document at another point. The musical symbol 190 in FIG. 16 is the indicator of additional audio comments added to a layer over the audio information element 150. The triangular symbol 192 is (for instance) an indicator of a written comment added to a layer over the audio document and shown at a specific time. The camera symbol 195 is an indicator of a video comment added to a layer over the audio document. A duration indicator shows up when the user points the pointing device to one of the comment indicators and displays in the window 185 the time at which the comment has been inserted over the total duration of the original information element.

In FIG. 16 are buttons 194 typical of media player, pause, stop, play, fast reverse, and fast forward, respectively, and, in addition, commands for displaying/activating comments. Comment window 185 shows the written and visual, graphical and video related comments/documents as their insertion point is reached while the document is played or as the user clicks on the related indicator 192, 195, 190. If so desired by the user, the document can be automatically stopped from playing momentarily as comments 192, 195 and 190 are "reached".

Figure 17:
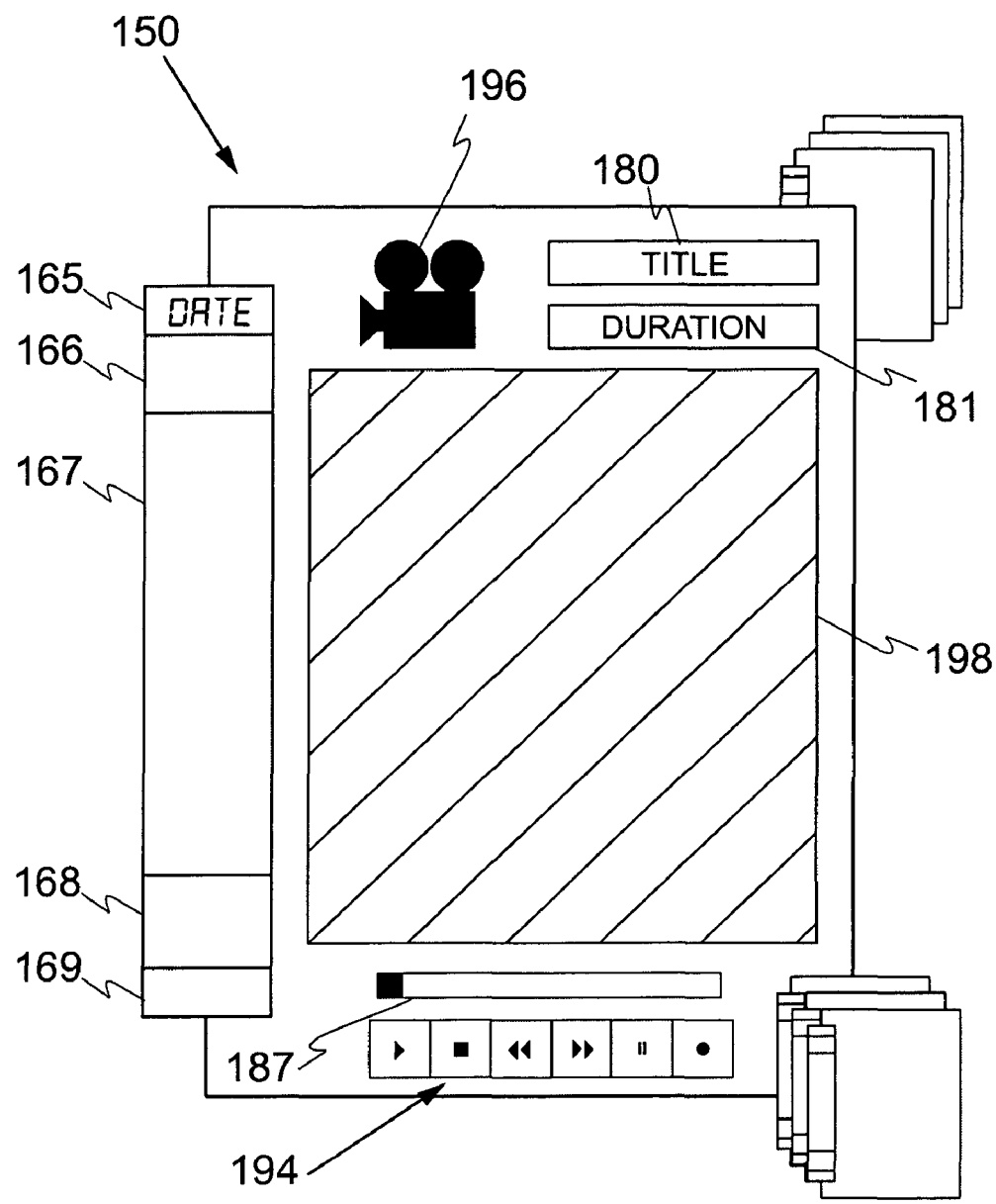
FIG. 17 depicts a SMLOI information element, a unified format representation of a video document.
Figure 18:
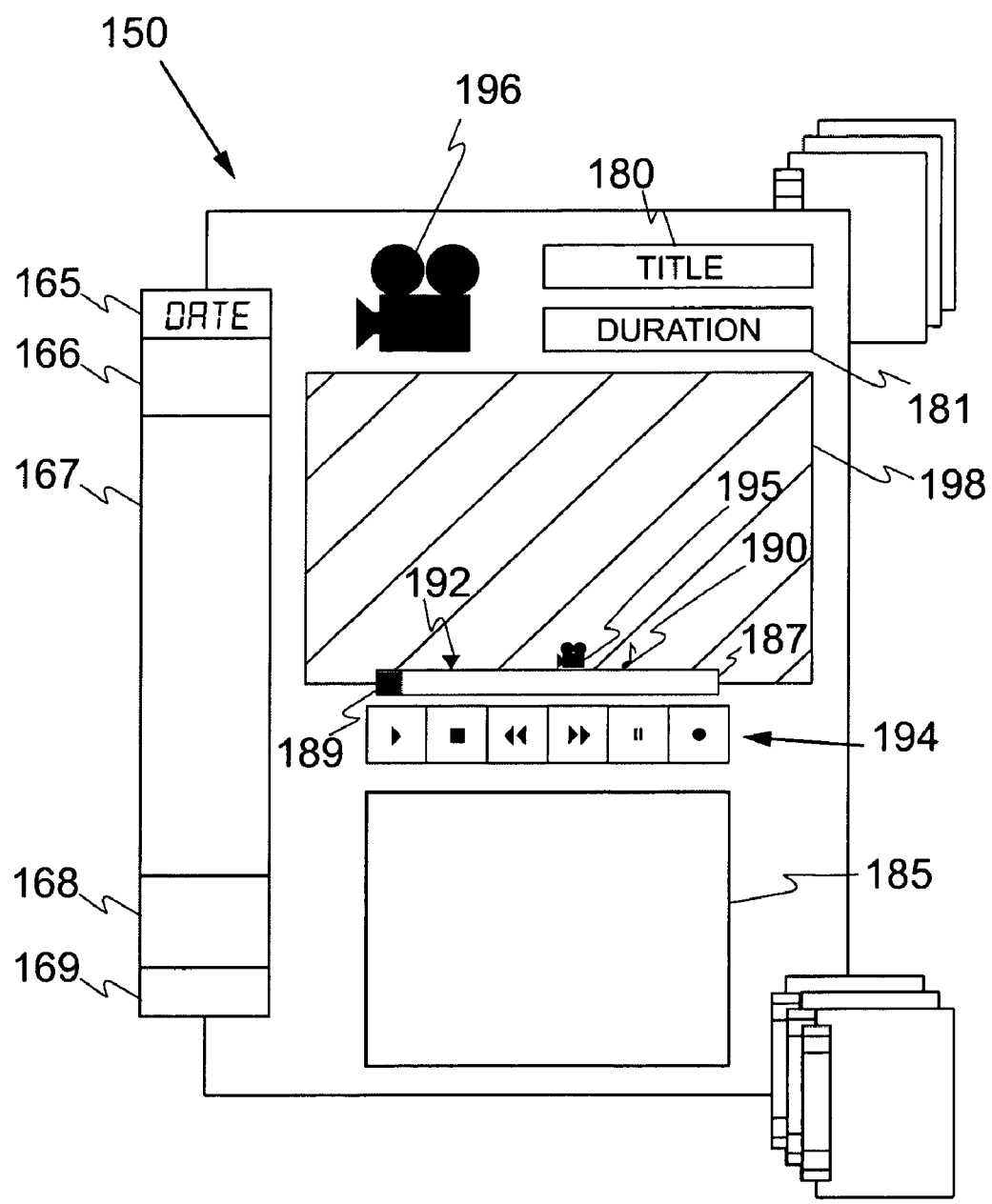
FIG. 18 depicts an alternate dynamic assembly of a unified format representation video document.

FIG. 17 shows an information element 150 that is a unified format representation of a video document with its title 180, duration 181, video symbol 196 and projection window 198 that is used for displaying the video information element 150 of FIG. 17. FIG. 18 shows an assembly built from the addition of a dynamic layer over the unified format representation of a video document. The title 180 and symbol 196 are part of the basic information element and are visible through the clear substrate of the layer. The functions are generally the same as the ones presented previously for an audio document in FIG. 16

Figure 19A:
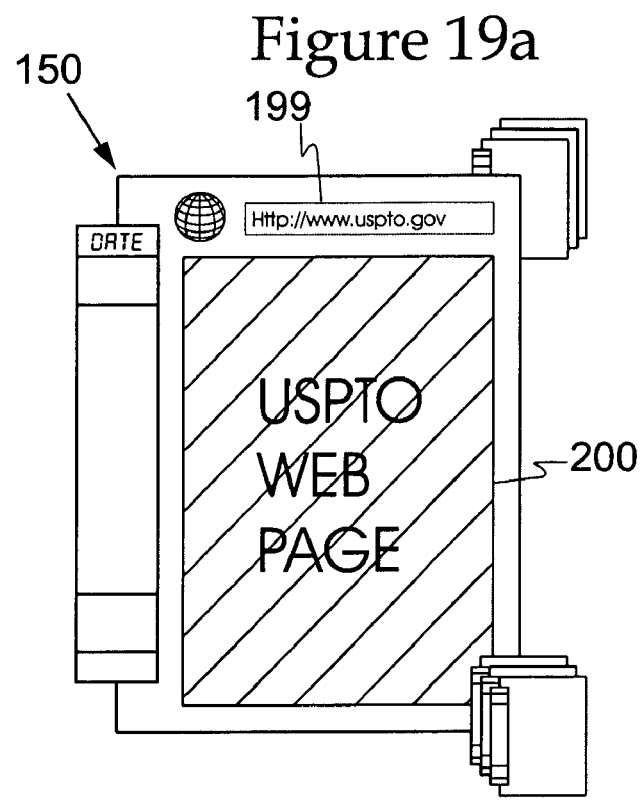
FIG. 19a depicts a unified format representation of an Internet sourced document.
Figure 19B:
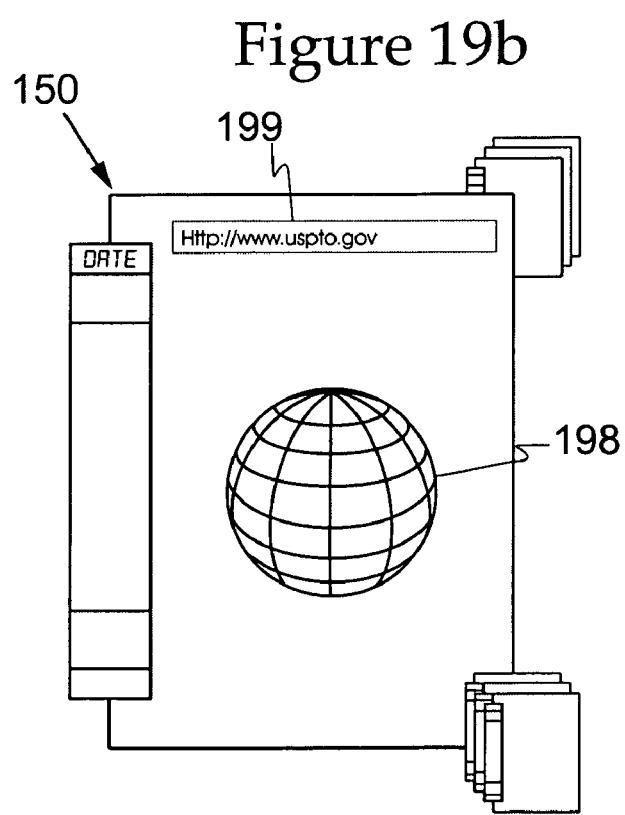
FIG. 19b depicts an alternative unified format representation of the same internet sourced document.

FIG. 19*a* shows an information element where the image 200 is the actual picture of a web page as an information element in the SMLOI. The user may either copy information as presented by FIG. 19*a* into the SMLOI or just write an hyperlink to reach the information as in FIG. 19*b*. FIG. 19*b* shows an alternative representation of the same element with only the symbol 198 on the center of the page and the web address (URL) 199.

Numerous software applications are available to help users keep track of their schedules and of the tasks they need to accomplish. The tasks of the user can be displayed as information elements in the SMLOI, and be graphically recognizable within the SMLOI. Tasks as information elements can be associated with related sub-space (item 166 in FIG. 12) and linked to appropriate characterization attributes. Color and other types of coding are part of the unified format representation of such an information element to graphically inform the user of the status of a given task as previously described. The appropriate sub-area will display codes related to the task as well as the due date characterization attribute. Events from the agenda (such as meeting) or not (such as voice messages or conversations) can be displayed as information elements, and be graphically recognized as such within the SMLOI. Details of the event such as date, time or location are accessible directly form the information element. The user can graphically visualize linked tasks (such as preparation for meeting or an action resulting from a voice mail) as well as linked information element (such as a list of documents he or she may need to recover to go to a given meeting). The user is able to visualize linked tasks graphically, as well as linked elements of information (such as a list of document he or she may need to recover as part of the task). The user can create work lists, prioritized or not, from the tasks inserted in the SMLOI.

Information elements can be linked to individuals (such as a list of participants present at a meeting where a given report has been distributed). Such a link can be established by 1) entering the event as an information element, with its participants as characterization attributes as well as indicating another element (the report) as an hyperlink and 2) by asking on that information element or on the areas of the information element to visualize the linked elements, which would then show the event on the relative representation vector.

For an information element of an event entered in the SMLOI, the statutory sub-area would become the event sub-area by displaying codes such as "preparatory task to be done", "past event" or "event to come", etc. . . . . . A direct link to another information element can be included in the characterization attribute sub-area or in the hyperlink sub-area.

Figure 20:
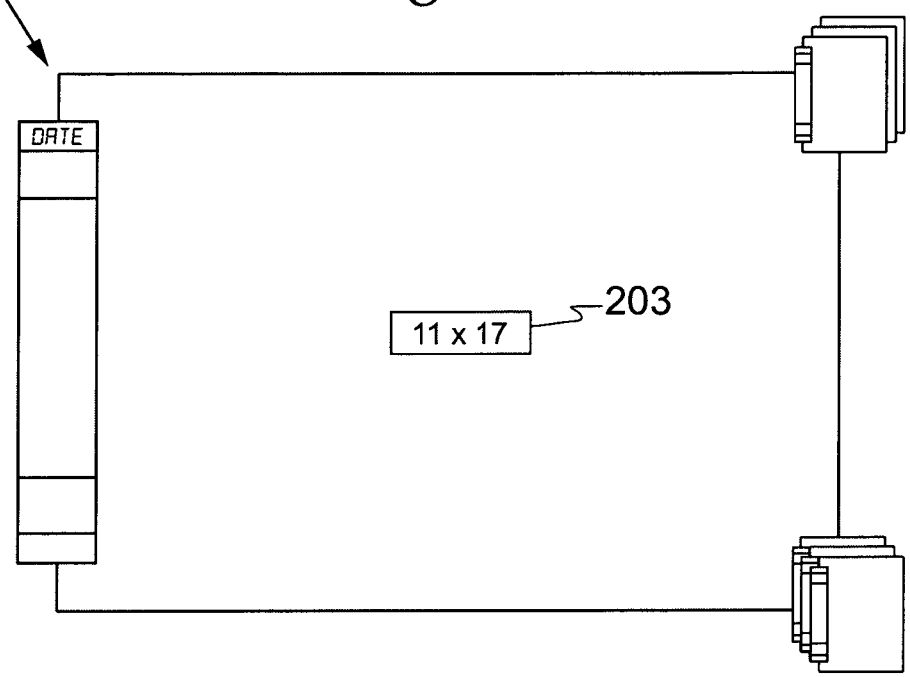
FIG. 20 depicts an unified format representation of an odd-sized document.
Figure 21:
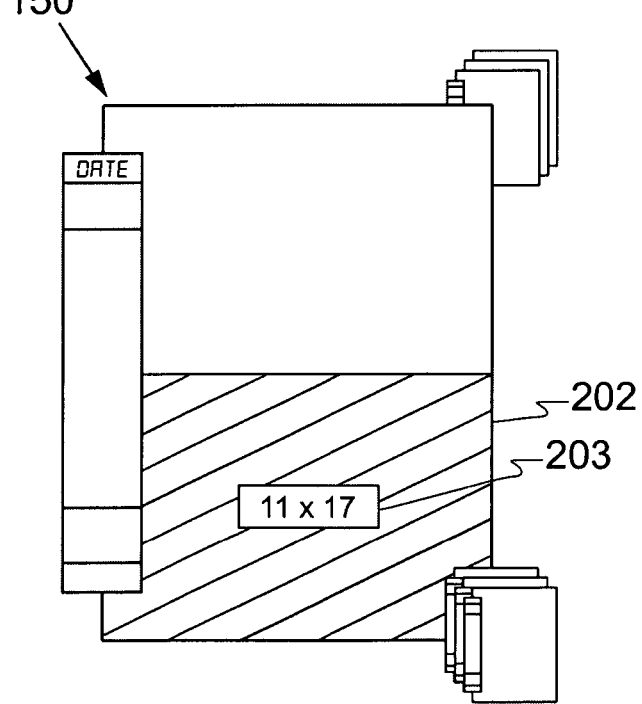
FIG. 21 depicts an unified format representation of an odd-sized document resized in a standard SMLOI information element size.

The SMLOI can display documents that were meant to be printed on paper formats different than the user-specified default format ("letter" paper size for instance). FIG. 20 shows an example of such an odd-sized document, where the proportions of the image are similar to the ones of the real document. Such an approach could, however, prove to be rather inconvenient if more than one element is to be viewed at the same time. It then may be desirable that all the information elements be displayed within a common-size "envelope". FIG. 21 shows such an arrangement, where 202 is the image of the document and a label 203 indicates the true size of the document. The information element "envelope" would then always be the same for "letter" paper size proportions.

Figure 22:
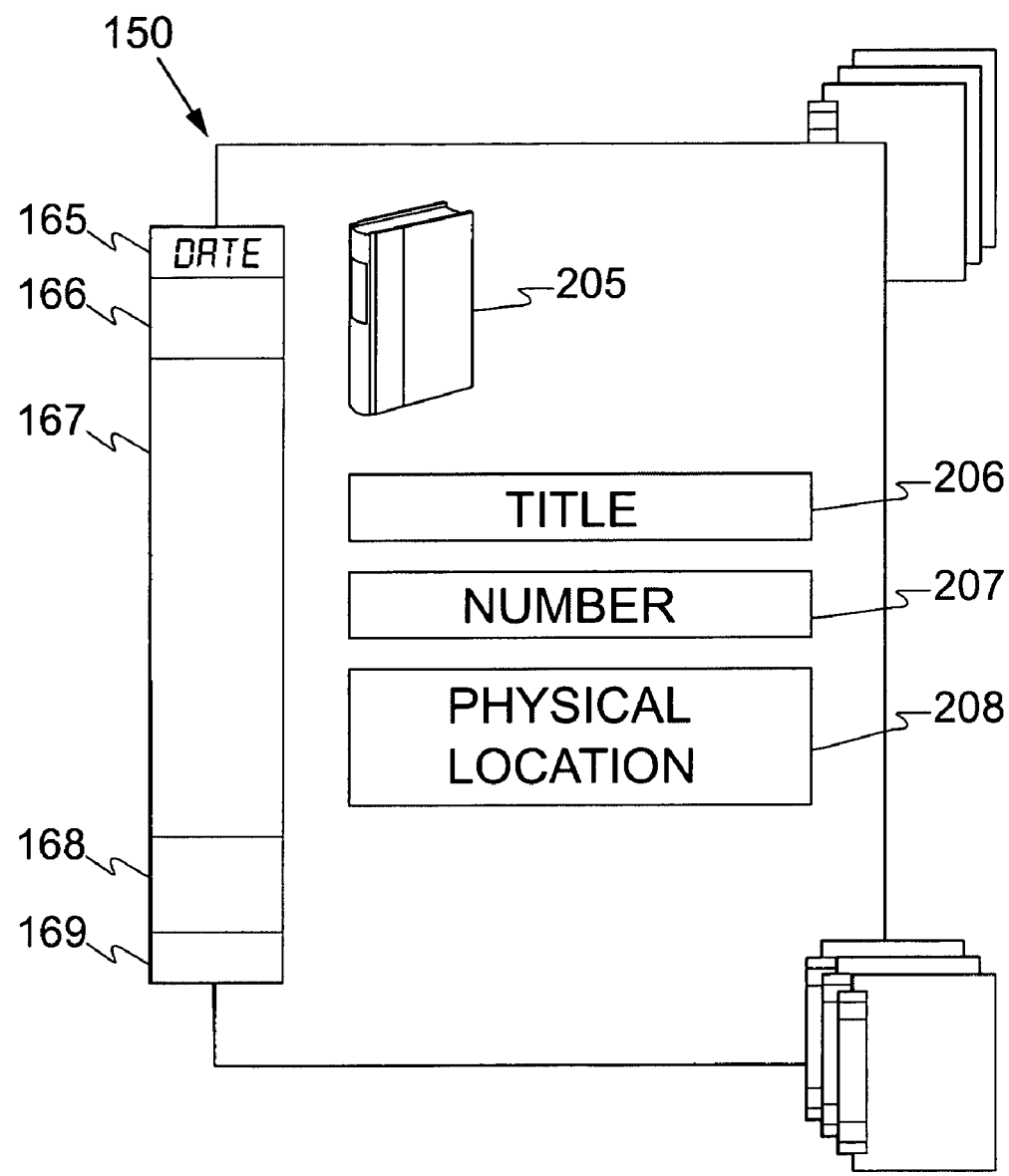
FIG. 22 depicts an unified format representation of a reference to a non-electronic document.

The user can keep track, via his/her SMLOI, of all of his/her information elements, even if they are not under an electronic format. A numbering system for those external reference materials may be created and a short comment for each may be written. FIG. 22 shows an unified format representation for an information element linked to an external reference material where a symbol 205 used to designate such external reference material. A title 206 given to the document by the user, a label 207 showing the number of the document as per the user's numbering system, and the location 208 where the actual document is physically kept may also be implemented.

Some information elements collected by a user can be made available for viewing by others as a means to stimulate creativity. For instance, interesting articles could be sent to a "pool" and available for browsing by other SMLOI users or be sent one at a time at a specific rate through e-mail to selected SMLOI users. A user may also choose to have old clippings sent to him/herself after a certain delay to refresh his/her own memory. Random order element visualization is also an option. Such elements could be sent through e-mails or be used as the "desktop of the day", the "screensaver of the day", or even be displayed in SMLOI as "publicity stripes".

The SMLOI user can select the "SMLOI web site" attribute. By doing so, the user may build a "SMLOI web site" with the selected information element. The user website will present the selected information elements in a web page for others to visualize the information elements on the Internet using a browser "plug-in". This way, the SMLOI user can share to everyone on the internet the selected information element without any complicated task. The other SMLOI functions that will be further described are also enabled within a browser plug-in.

The SMLOI includes a "collection tool" allowing for easy gathering and organizing of a series of information elements. Options for display are also offered to the user such as a formal portfolio, scrap book, logbook, notebook, or slide show. These collections may be sent to other SMLOI users, not as memory-consuming-bunch of files, but rather as a list of links and punctual access rights.

The SMLOI has an enabled collection process. For instance, five elements are selected by the SMLOI user who then creates a collection therefrom. The collection then becomes an element which, among its attributes, has the intrinsic characterization attribute "collection" and is inserted in the SMLOI. The user can then use the collection in many ways. For example, the user may send access rights to another user or do a full or partial print of the information elements.

The user could also visualize or print a list of the information elements contained in the collection or create a slide show of the information elements that could be sent or become presentation material.

It may also be desirable for the SMLOI to narrow the gap between the electronic data management and the more traditional handwritten information. This may be accomplished with the SMLOI through the integration of handwriting recognition, applicable software, and electronic signature capability. This may also be accomplished by integrating in the SMLOI the capability of generating encoded note-taking material and properly filing the digitized. A purpose-printed note paper (or template) may also be generated by the SMLOI and printed. The template is then used as normal paper for taking notes and is scanned for its insertion in the SMLOI. During the scanning process, the SMLOI recognizes identification marks on the template (such as a printed bar code or a hand filled boxes) and assigns intrinsic attributes accordingly as it creates a new information element in the SMLOI.

The Multi Dimensional Representation

Figure 23:
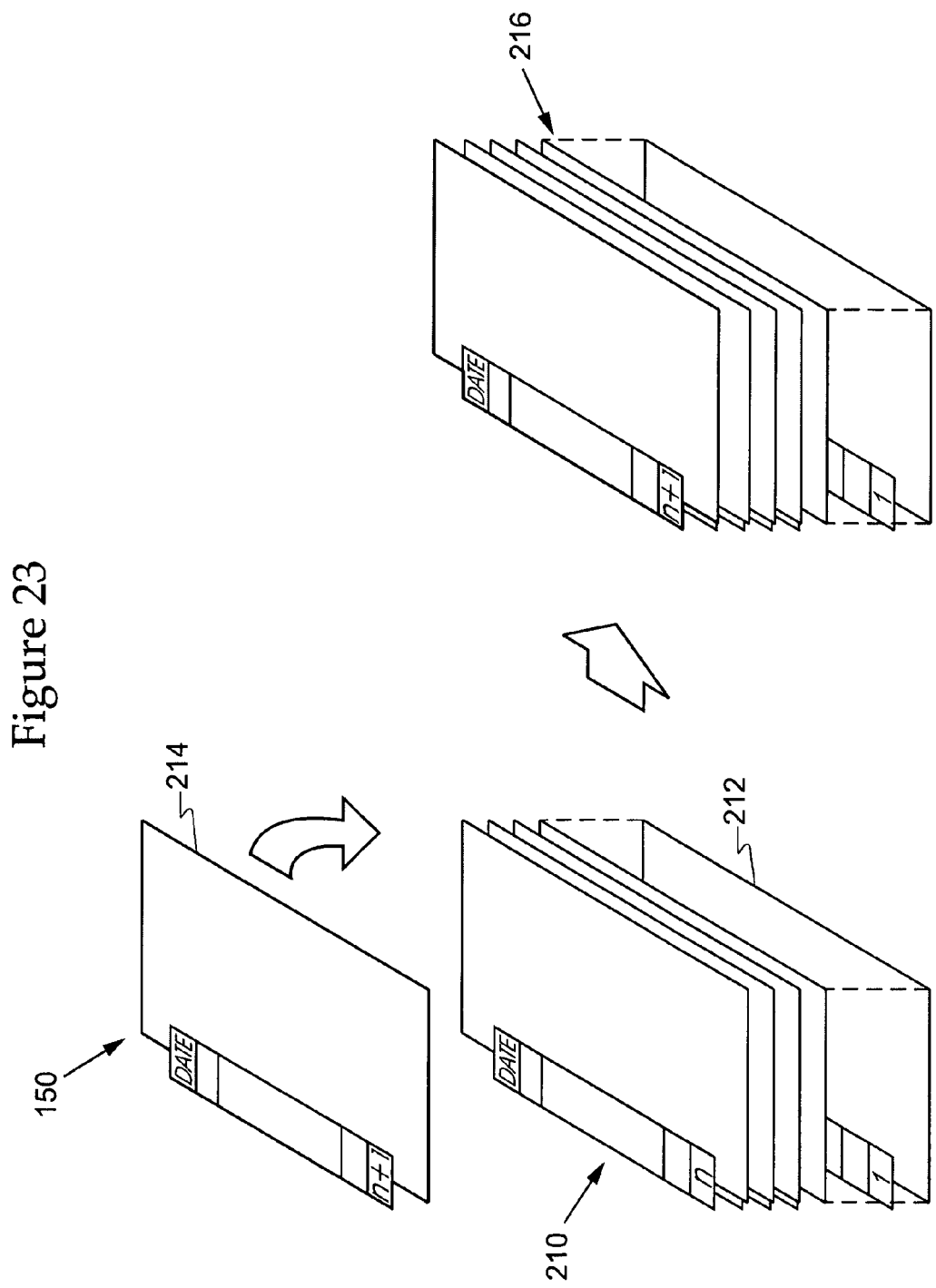
FIG. 23 depicts a SMLOI basic entry sequencing applied to an unified format representation of a document as it is inserted in the SMLOI.

In order for a user to keep track of the sequence in which the information elements are related to each other, the SMLOI provides a way to keep specific sequences between information elements. One means of establishing such a sequence is by representing the entry of an information element. While this would keep the information elements in the order that they have been entered, the SMLOI is also providing an entry sequence number. FIG. 23 shows an element 150 that is added to a pile of elements 210 where the entry sequential number for the first element 212 entered has number one and the last, "n". The new element 214 added then gets the sequential entry number "n+1".

Figure 24:
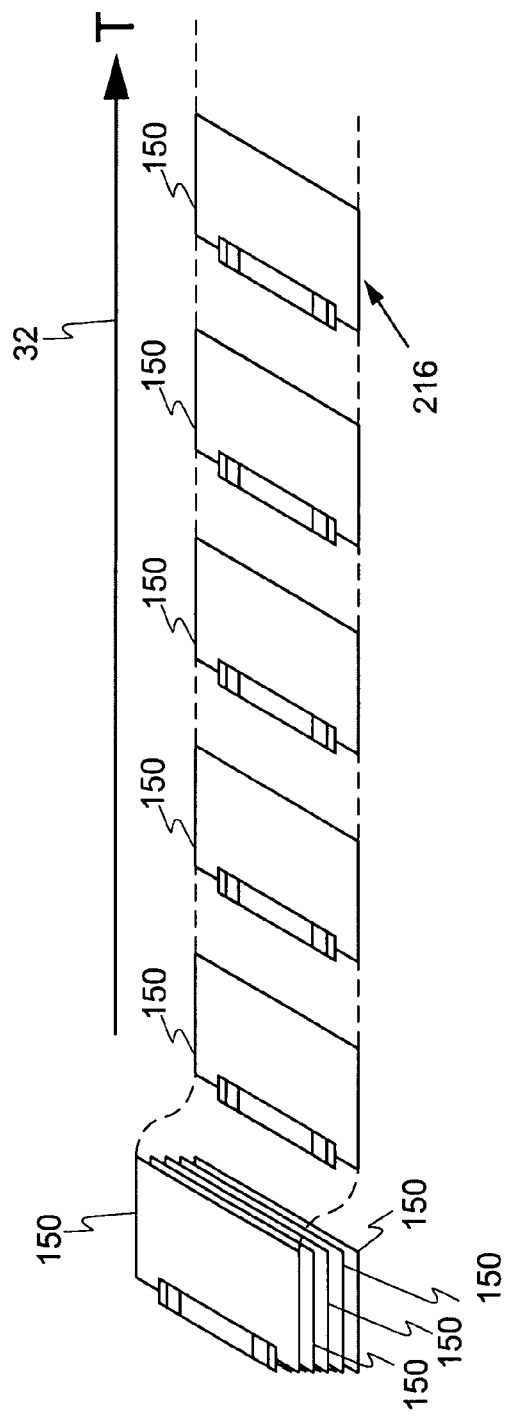
FIG. 24 depicts an alternative "pile" methods of graphically representing the information element order in the SMLOI.
Figure 25:
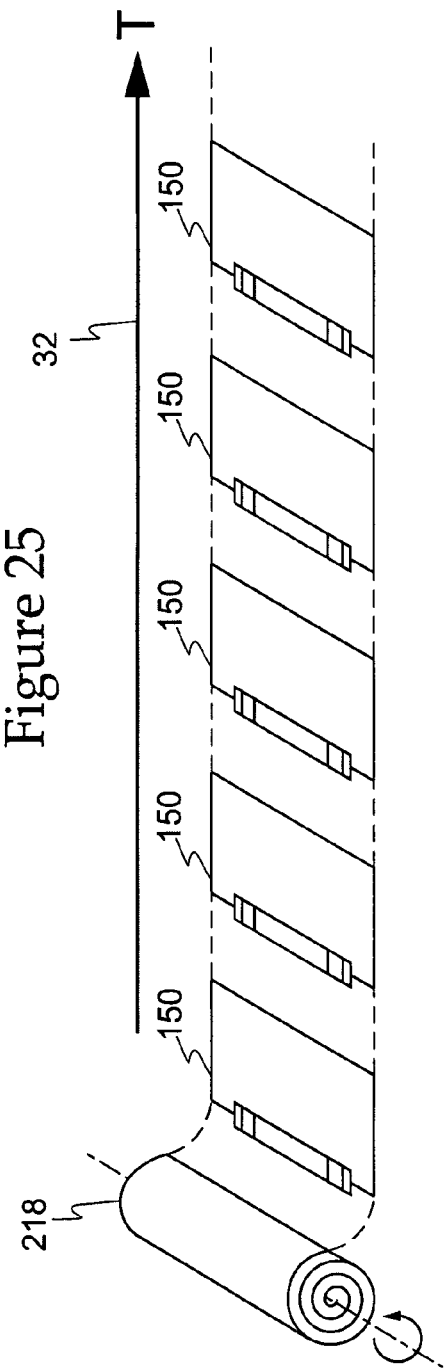
FIG. 25 depicts an alternative "roll" method of graphically representing the information element order in the SMLOI.

The invention provides a way to see part of a sequence through preceding and following information elements. For example, FIG. 24 illustrates that the information elements 150 are placed side by side and in the order that they had been entered. The last information element added to the sequence would be the one at the extreme right 216 according to the time vector 32. FIG. 25 shows another way of viewing the sequence. The information elements 150 are placed side by side and are rolled in that order on a roll 218 still according to the time vector 32.

The time vector 32 usually represents the absolute chronological order that is applied on information element vectors whether they are including all the information elements or only a portion. Absolute information element vectors and relative information element vectors are then linked to a time vector. The time vector can be replaced by a specific sequence vector that is not necessarily related to time. In that order, only the sequence aspect of the time vector would be kept and applied with some other consideration, like statistical considerations, to a specific sequence. Hence, an information element vector can be related to the number of times an information element has been selected. That is, the information element vector presents the information elements in an incremental order. The information element vector can also be generated ascendingly or descendingly considering the size of the information elements. The information element vector may also present the information elements considering the number of characterization attributes applied to each information element from the information element with the most to the least.

The spreading-the-information-elements exercise, shown on FIG. 24 and FIG. 25, directionally towards the right may also be done in any direction. The display of the information elements in such a manner creates an information element vector allowing the user to visualize the information elements entered as well as the absolute sequence into which entry has been done.

Figure 26:
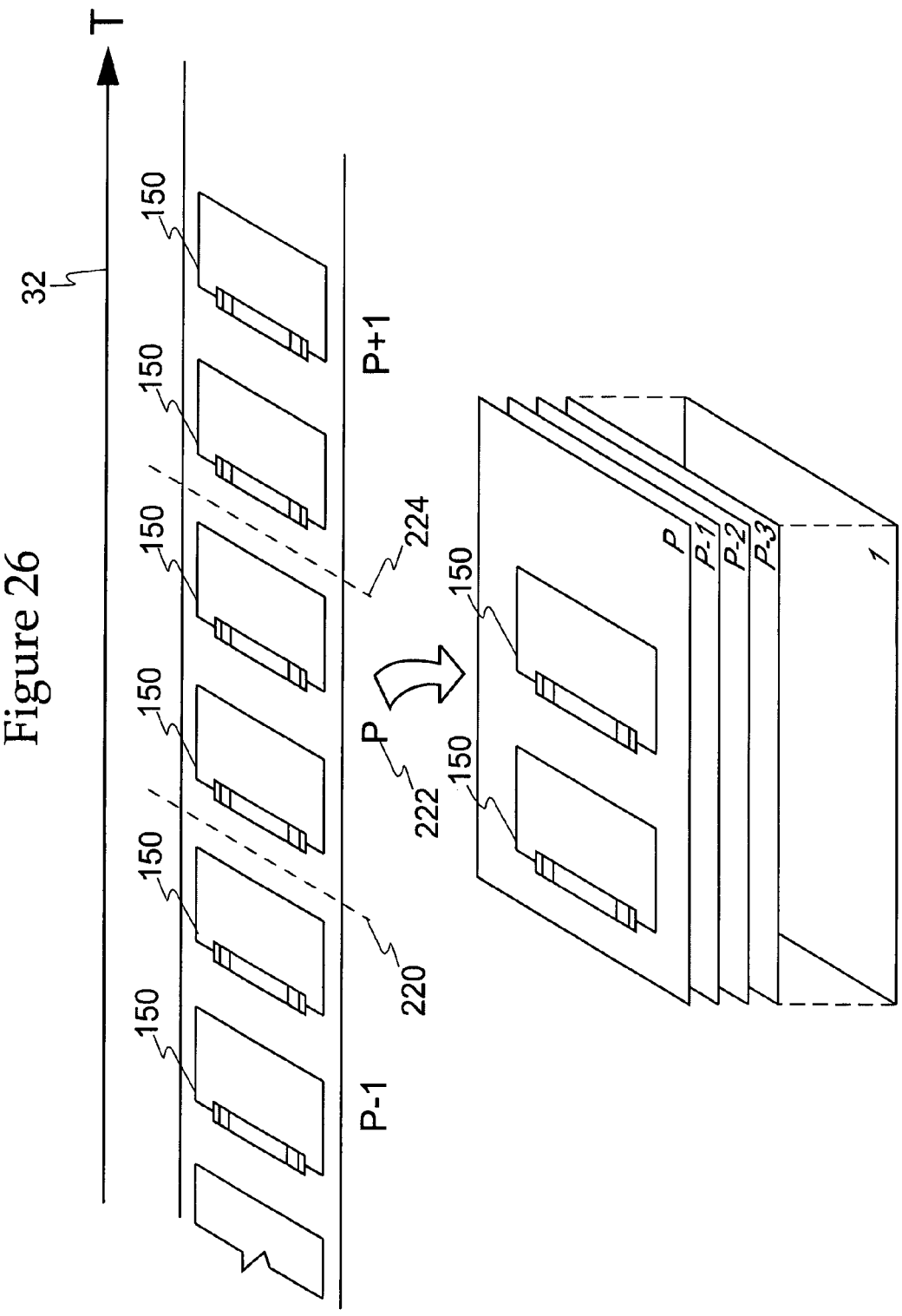
FIG. 26 depicts the use of bookmarks in the SMLOI.

The system user can introduce "breaks" and "bookmarks" in the information element vectors to have reference points within the sequence of information element entry. FIG. 26 shows such an implementation of bookmarks 220, 224 where, in that case, the bookmarks are relative to a period of time. For instance, two information elements have been entered during the period P 222 which is delineated by bookmarks 220 and 224. The bookmarks may also be specifically placed by the user as period markers as shown in FIG. 26 and/or automatically by the SMLOI at every period of time and/or in any user-defined manner.

Figure 27:
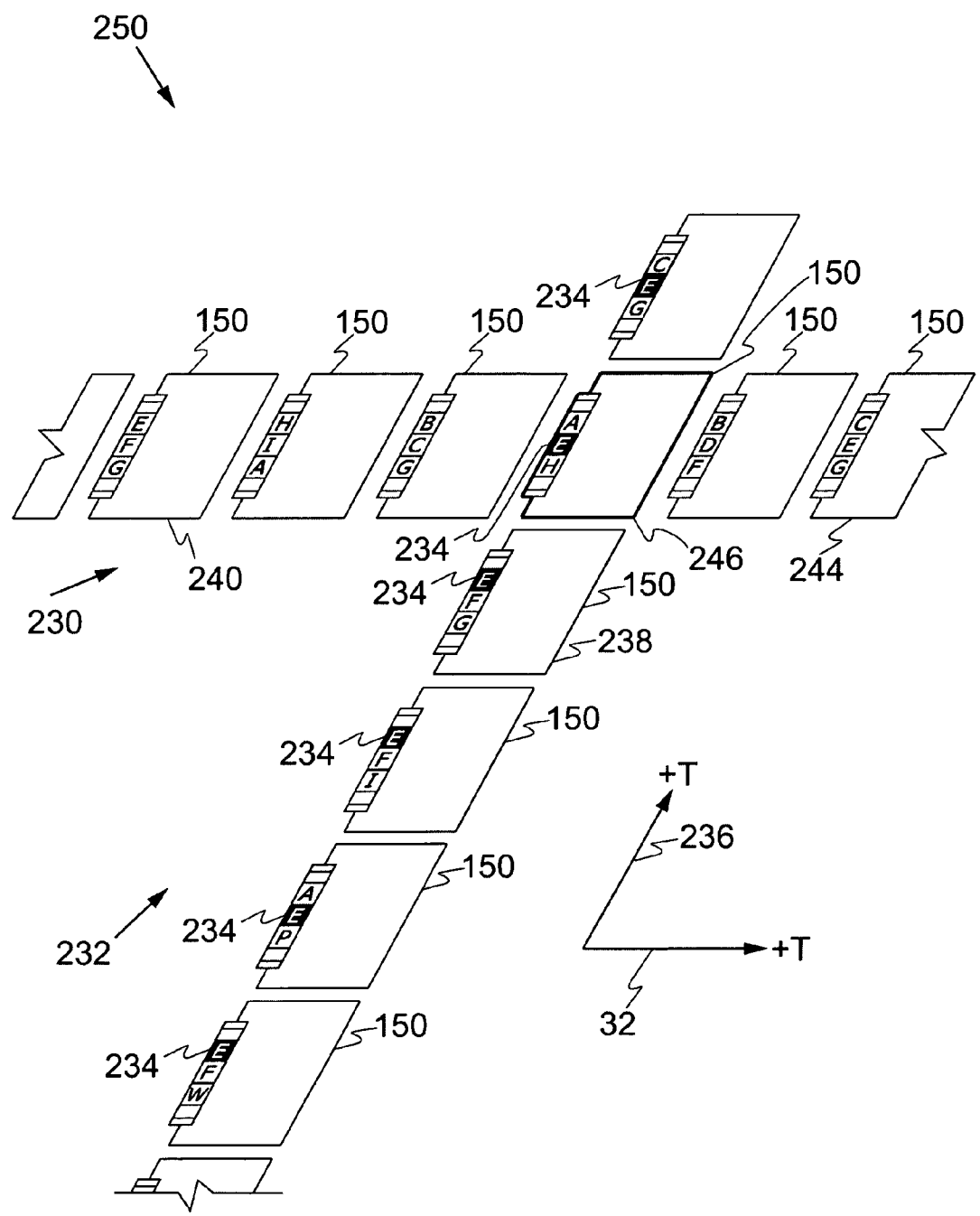
FIG. 27 depicts a bi-dimensional view of two information element vectors in the SMLOI.

FIG. 27 shows a bi-dimensional information element vector disposition where all the information elements 150 from the user's SMLOI are represented along an horizontal vector 230, where the most recent is shown on the right side according to the time vector 32. Information element vector 230 is the absolute information element vector.

The information element 246 is selected by the SMLOI user and at the same time the "E" characterization attribute 234 is selected by the user still acting on information element 246. A second information element vector 232 is generated by the SMLOI at a different angle (generally at a 90° angle from the absolute vector 230, on a 2D display) than the first information element vector 230 using the selected information element 246 as the intersection point. On the second information element vector 232 are shown only the information elements sharing the "E" characterization attribute 234 presented in the characterization attribute sub-area. The most recent of the elements being shown at the upper end of the vector according to the relative time vector 236. As a result, the information element vector 232 is a relative information element vector. It is important to note that information elements 238 and 240 are actually the unified format representation of the same document because they appear in the absolute information element vector 230 and the relative information element vector 232 screening for the "E" characterization attribute 234. This is also true for elements 242 and 244. The generation of the relative information element vector 232 can also be created according to the combinative logic equation of multiple characterization attributes (for instance: "A" AND ("B" OR "E")).

The absolute and relative information element vectors 230 and 232 in FIG. 27 create a plane (accordingly, they are co-planar). A volume can be generated depending on the number of information element vectors when depth is used a third dimension. This plan, or volume if the depth is used, can be considered as a vectorial space 250.

Figure 28:
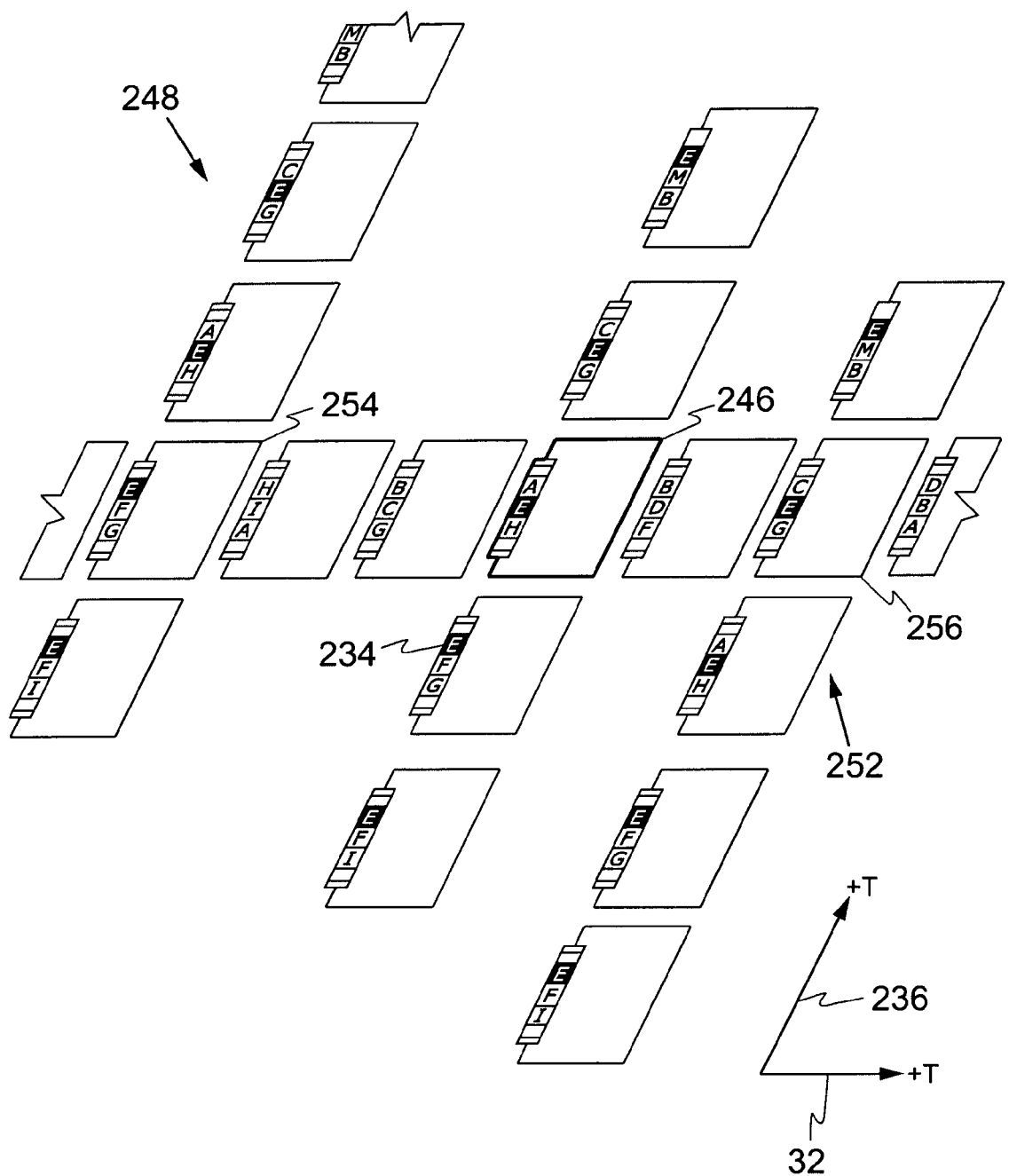
FIG. 28 depicts a bi-dimensional view of multiple vertical information element vectors in the SMLOI.

It is possible that the relative information element vector that carry the selected attribute appear on every information element on the absolute vector including the selected attribute. As shown in FIG. 28, two additional vertical vectors 248 and 252, aligned with elements 254 and 256, respectively, are provided.

Figure 29:
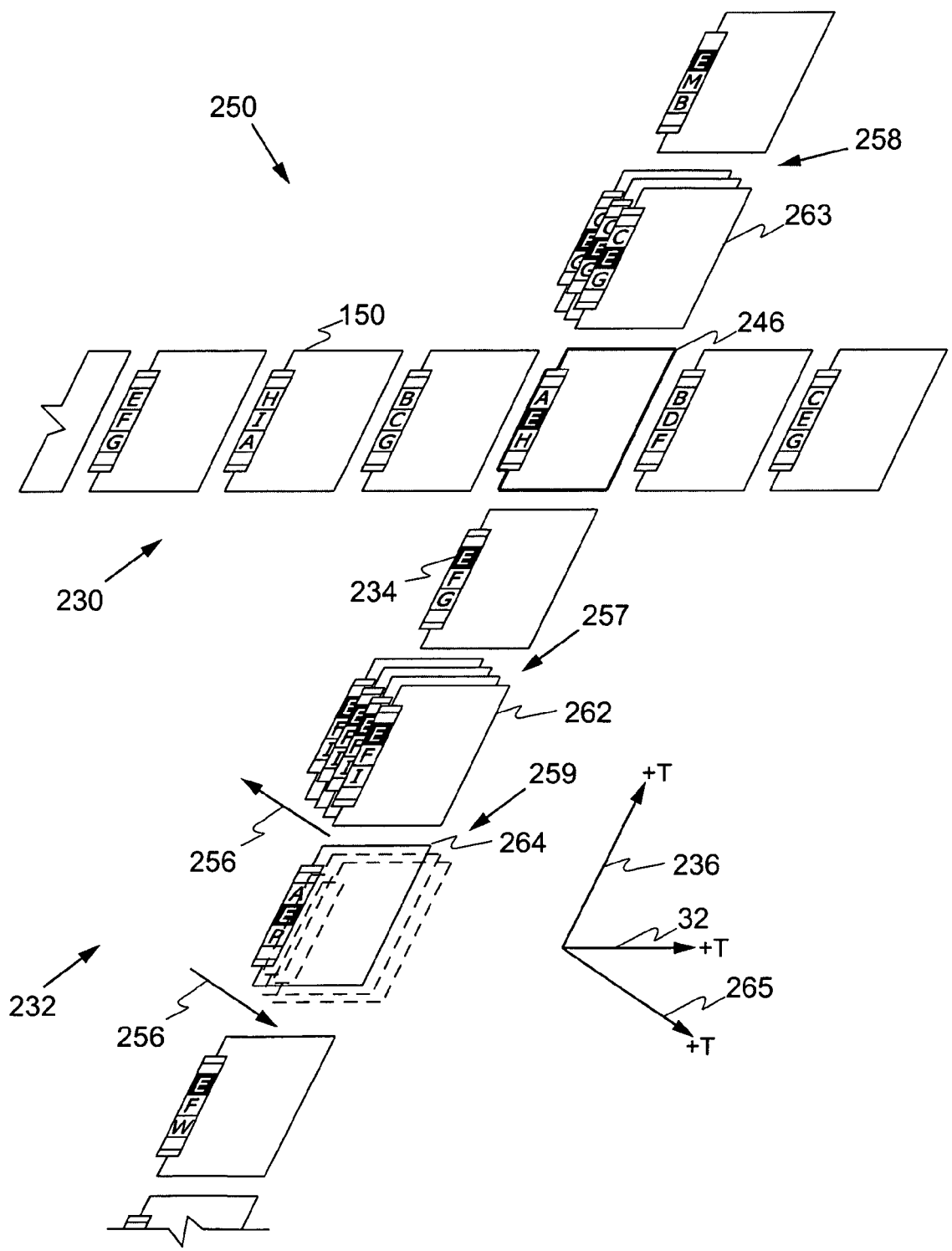
FIG. 29 depicts a tri-dimensional view of three information element vectors in the SMLOI.

FIG. 29 shows the SMLOI, now "tri-dimensional" with the addition of assemblies 257, 258 and 259 (or information element versions) related to their respective information elements 262, 263 and 264. The first dimension is the absolute information element vector 230 according to the absolute time vector 32. The second dimension is the relative information element vector 232 containing the attribute "E" 234 according to the relative time vector 236 with its intersection centered on the information element 246 from which the characterization attribute "E" is selected. The third dimension is another relative vector relative to time vector 265 and shows the assemblies relative to information elements that possess at least one assembly with the more recent being shown on top according to the time vector 256.

Figure 30:
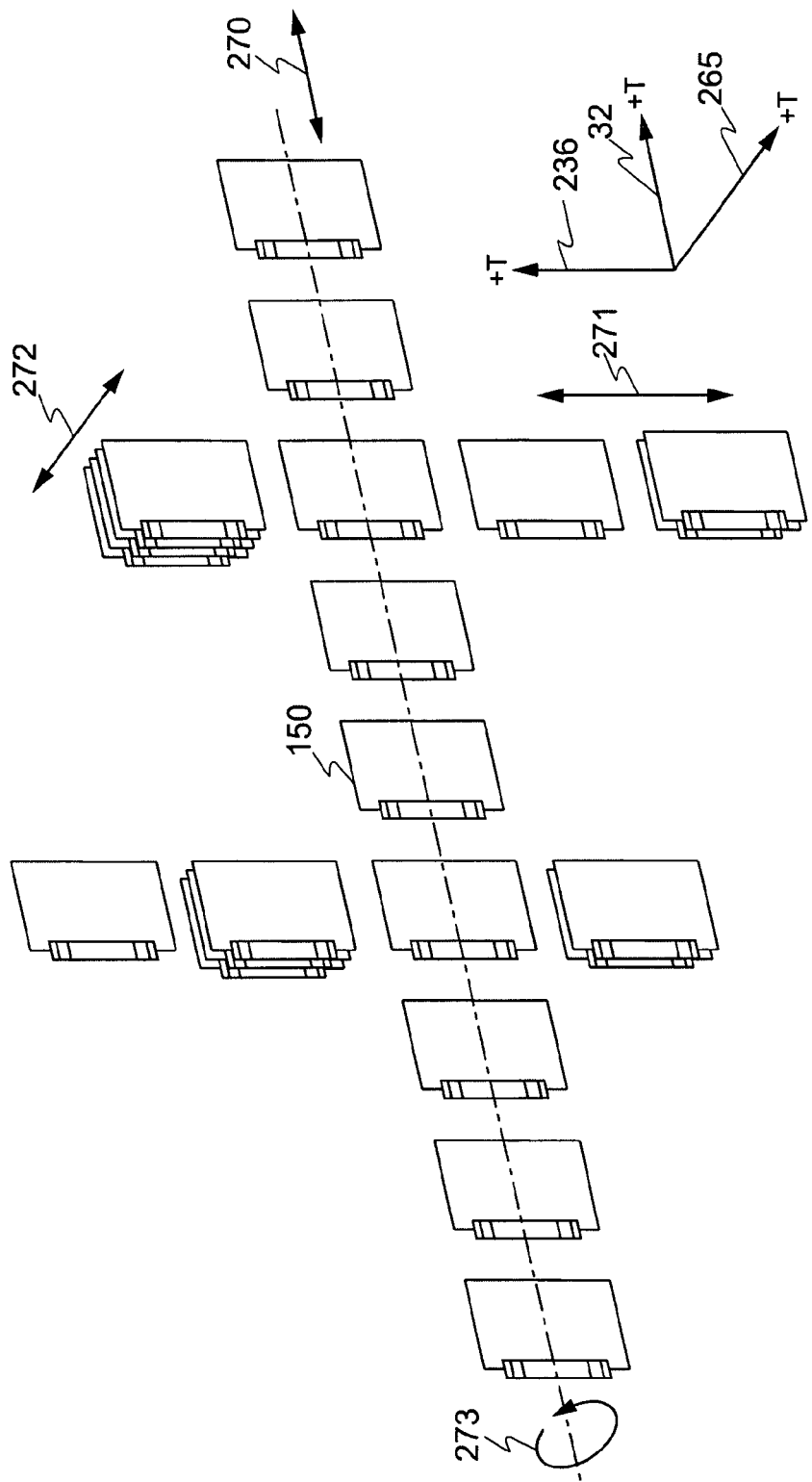
FIG. 30 depicts a tri-dimensional view of three information element vectors in addition to a fourth circular vector in the SMLOI.

FIG. 30 shows that the system may have four dimensions. The four dimensions are presented on the SMLOI where 270 is the first dimension, or absolute information element vector, 271 is the second dimension or relative information element vector and 272 is the third dimension or relative information element assemblies vector. Item 273 represents the fourth "circular" characterization attribute selection dimension. The characterization attribute choice, in order to generate the second dimension 271, is a dimension that can be schematically represented as a "circular vector" that can be visualized as orthogonal to the first information element vector axis.

Figure 31:
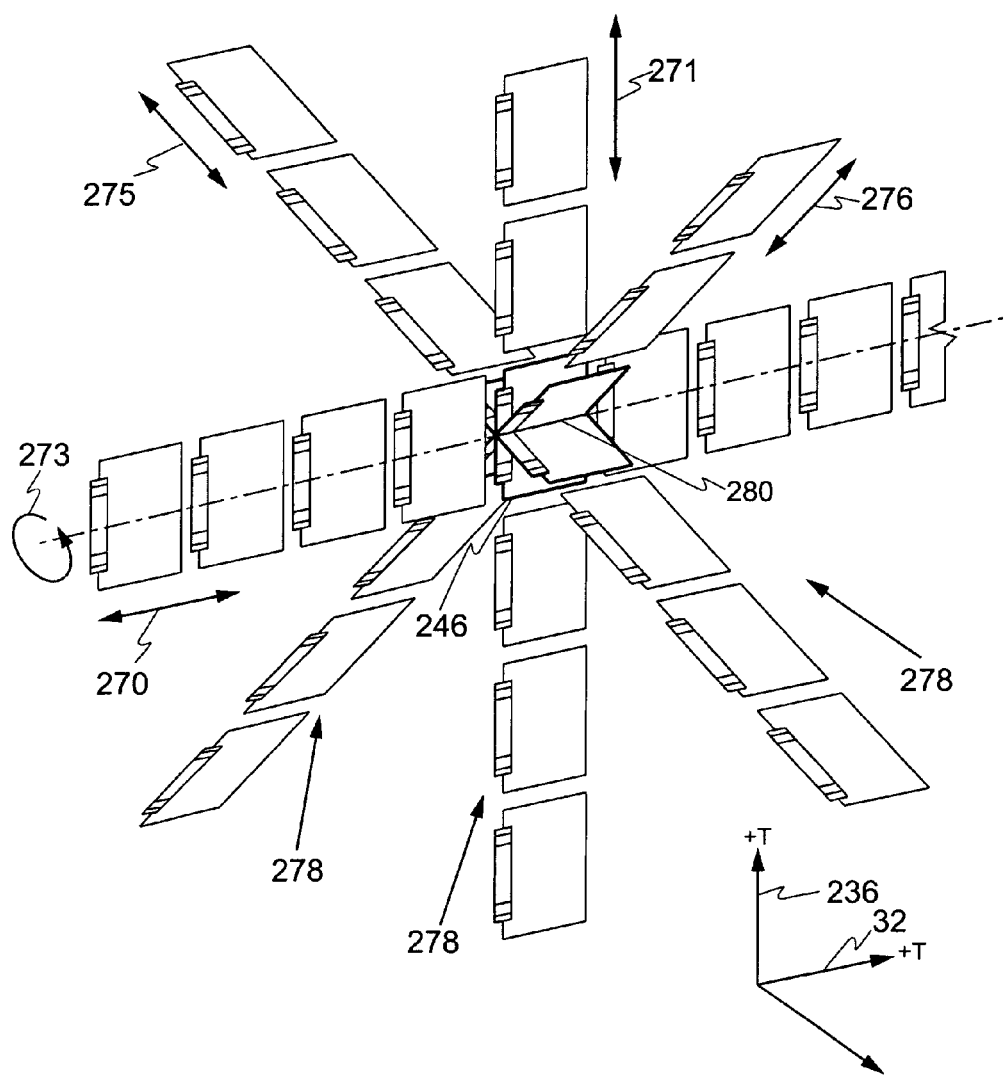
FIG. 31 depicts the second relative information element vector possibilities according to the fourth circular vector.

FIG. 31 shows that since there are at least as many relative information element vectors 271, 275, 276 as there are characterization attributes, all the relative sequences can be represented as many rays 278 coming out of a center hub 280 that are the selected information element 246 on the absolute information element vector 270. The fourth dimension 273 as it appears on FIG. 31 is an array of rays 278 and the selection of one (or composition of many) dictates which relative sequence becomes the second dimension displayed as the relative information element vector. The SMLOI user can group the information elements by combination or segregation of characterization attributes. Using combinative logic, this actually would turn the fourth dimension 273 into an infinite number of rays around the center hub 280 of FIG. 31.

When a proper computer system is used, characterization attribute attribution to an information element or selection in order to generate an information element vector can be made automatically by the SMLOI. Algorithms, statistics and other mathematical equations are used to choose the most applicable characterization attributes for a specified information elements or group of information elements in order to create a information element vector.

The SMLOI also provides an intuitive and efficient system for managing the user's elements of information, personal or professional in nature. The user and his or her professional information can be part of a bigger picture if he or she is an employee of a corporation for example. The SMLOI user is able to visualize his/her personal and professional/corporate SMLOI (distinction coming from one major attribute) at once or separately, and that that option be carried out through a single command.

A corporation is considered a moral user of the work related information of its employees. A corporation or other multi-user environment can have all its employees dealing with information elements in a similar manner for training purposes, and for the preservation of the "corporate knowledge" (structured and unstructured data), and for prior art recording purposes. The "corporate knowledge" is considered as a series of "parallel SMLOIs" with an SMLOI for each of its employees in a similar fashion to the previously described parallel paths for individuals. That way, some members of the corporation are able to access the information in the corporation's employees SMLOI.

At least one member of the corporation has the "knowledge administrator" status such an individual has full access to the corporate SMLOIs, can forward corporate messages to employees' SMLOI, and create standardized corporate characterization attributes to ensure cohesion in the filing, among other functions and capabilities. Such an administrator may have a formal role in a quality-assured environment, such as one governed by the ISO 9000 standard or a sophisticated information management analysis in order to provide an information management score that can quantitatively show the user's ability to manage its information.

Figure 32:
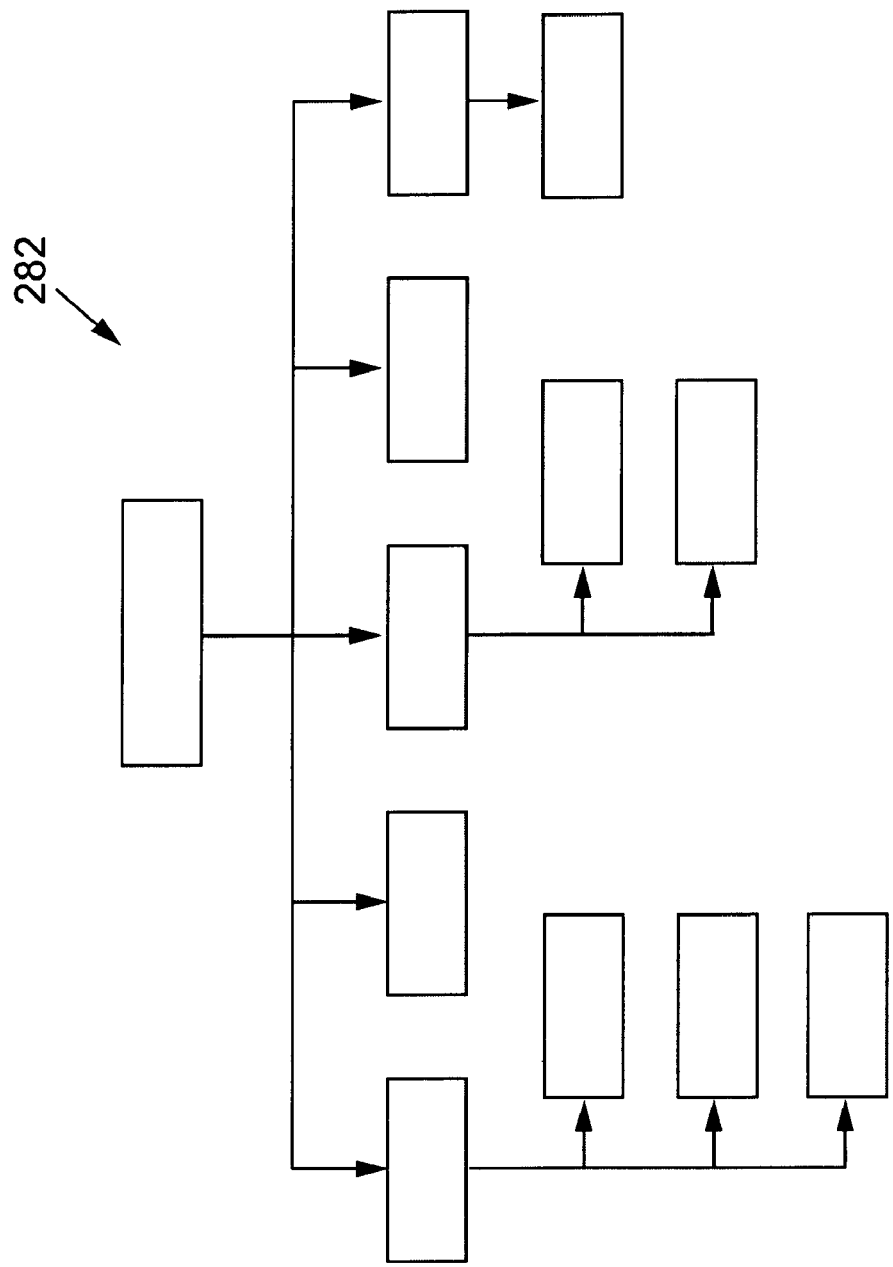
FIG. 32 is a typical corporate bloc diagram.
Figure 33:
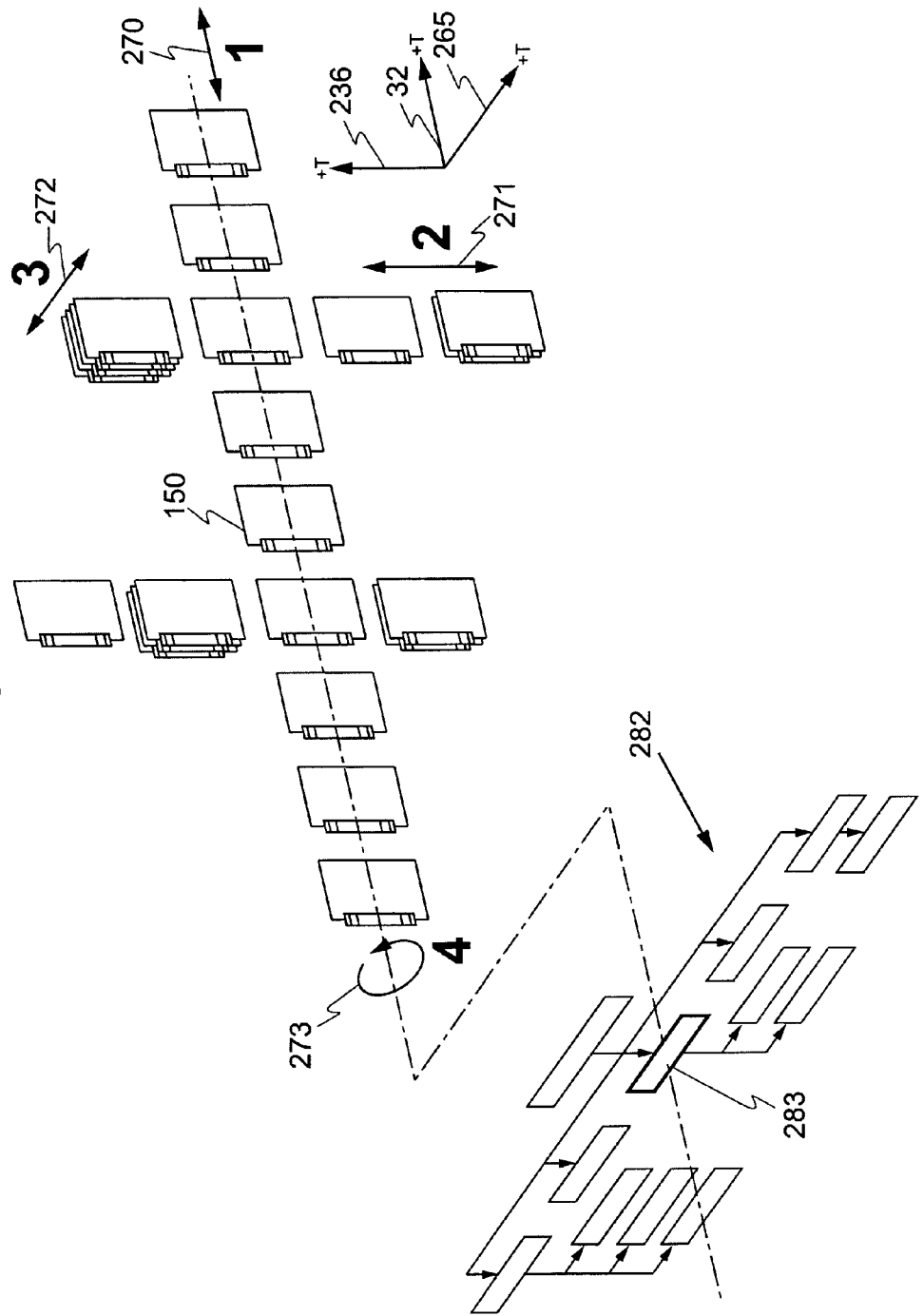
FIG. 33 depicts an alternative SMLOI in a multi-user corporate environment.

The corporate administrator can represent the corporation in an intuitive manner, such as the corporation organizational chart 282 as presented in FIG. 32 and directly link to every corporate SMLOI in the corporation as shown on FIG. 33. FIG. 33 shows the corporate SMLOI of an employee that has the position 283 in the organizational chart 282. The planar representation on the organizational chart is considered as the fifth dimension of the SMLOI. The organizational chart for that purpose can be replaced by a grid 285 on FIG. 34 and is, to the corporation user or administrator, a graphical representation of the multiple users. In this case, a two-vector system, for instance "5$x$" 287 and "5$y$" 288 is used to "name" different SMLOI users in the corporation, using an alpha numeric format. Other formats may also be implemented.

Figure 34:
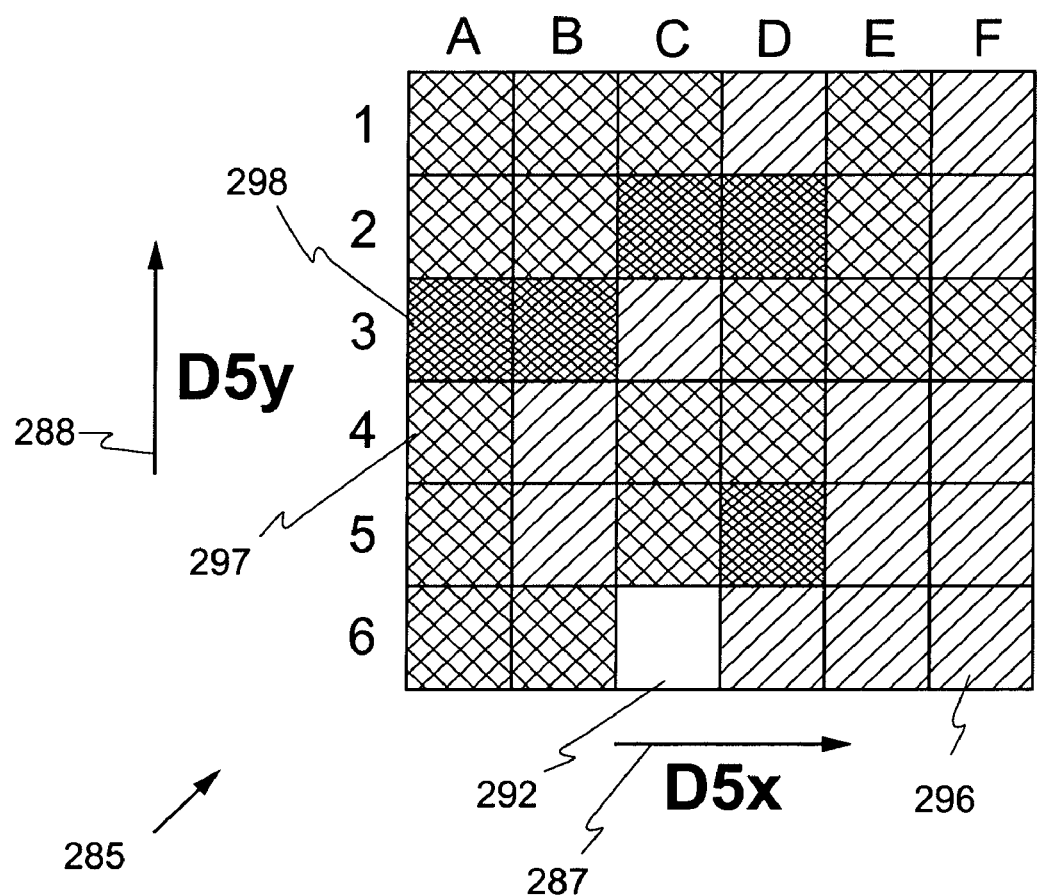
FIG. 34 is an access grid from a SMLOI in a multi-user corporate environment.
Figure 36:
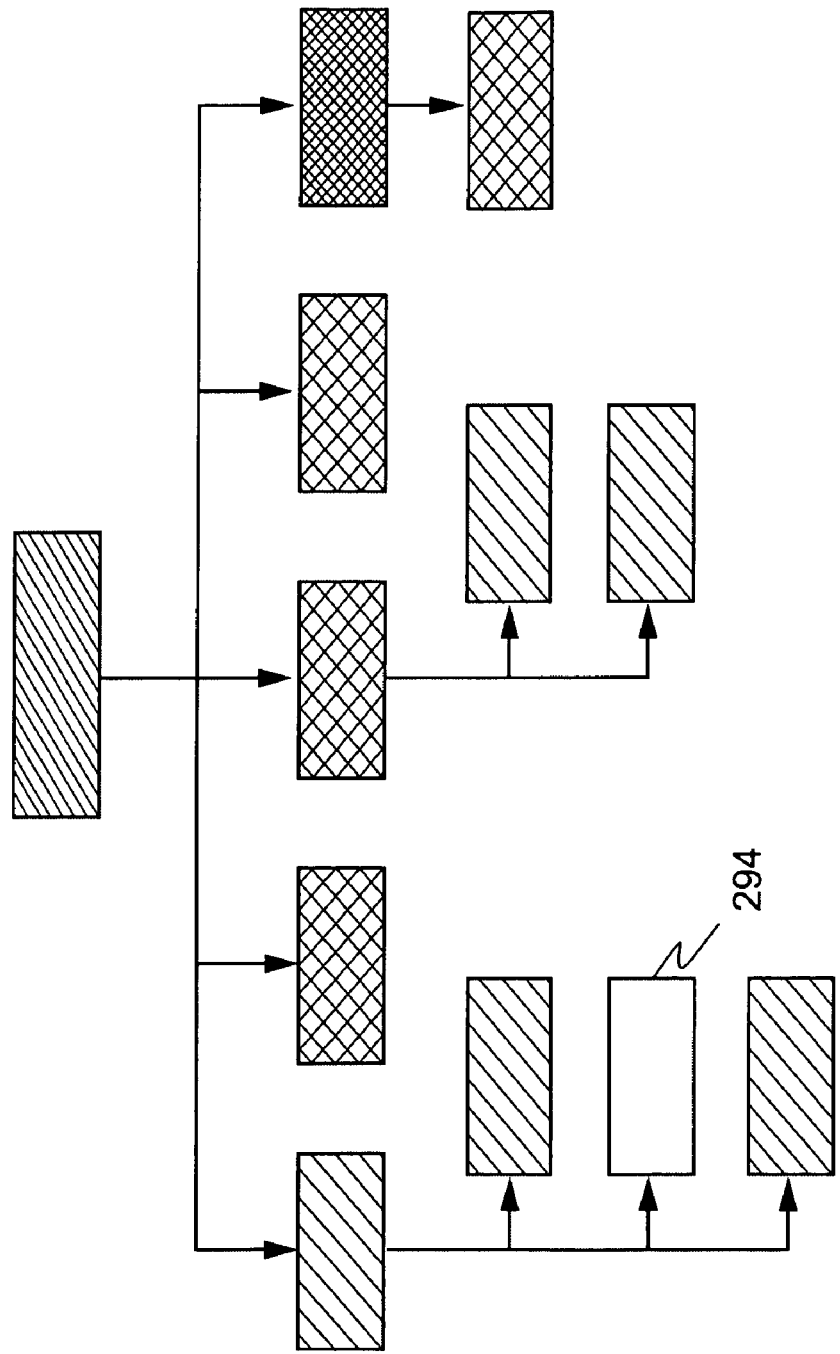
FIG. 36 depicts an alternative SMLOI access bloc diagram for a typical corporate environment.

FIG. 34 shows the fifth-dimension grid 285 where squares are filled using different patterns according to possible access. The grid of FIG. 34 is seen through the eyes of a user represented by box 294 of FIG. 36. As indicated by square 292 of FIG. 34, total access is given at that position of the grid. Hatched squares as in box 296 indicate the SMLOI of fellow employees to which the user 294 has full access (professional/corporate side only). Cross-hatched squares in box 297 indicate an SMLOI where punctual or microscopic access has been granted to user 294 (of box 292) allowing visualization of selected elements only. Smaller cross-hatched squares as in box 298 indicate the SMLOI to which the user of box 292 has absolutely no access to.

Figure 35:
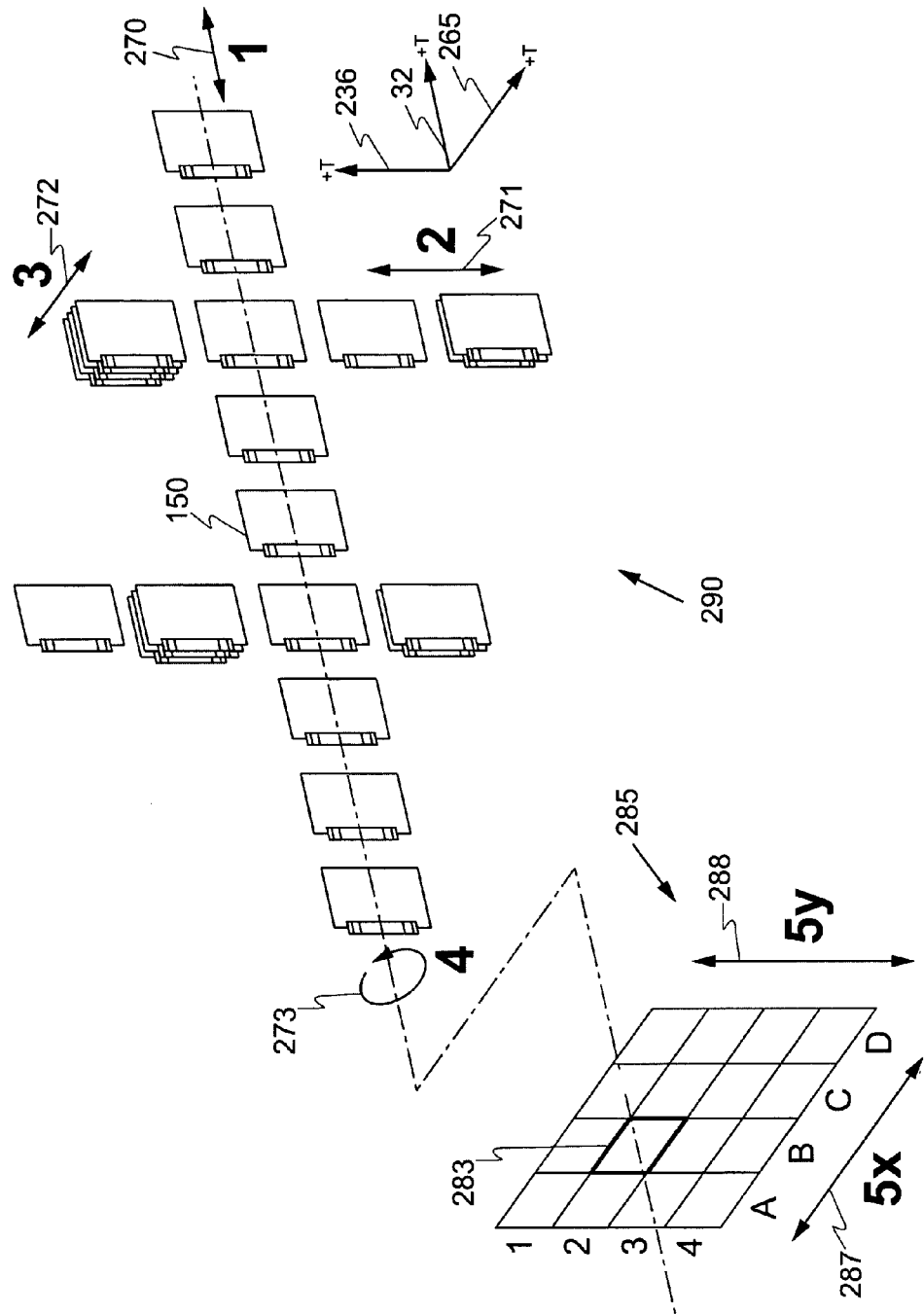
FIG. 35 depicts an alternate SMLOI in a multi-user corporate environment.

FIG. 35 shows the multi-dimensional graphic user interface of an employee of the corporation SMLOI where dimension one 270, dimension two 271, dimension three 272, and dimension four 273, as presciently described, can be seen. Dimension five 287, 288 may also be added. The darkened square contour of the grid 285 at the position "B2" indicates that the SMLOI 290 is the SMLOI of the "B2" employee.

An employee may allow access to his or her SMLOI, in part or in whole, to another employee or user. The user has only access to a portion of its SMLOI (such as the professional part) while maintaining the privacy of the remaining portion (such as the personal part).

Figure 37:
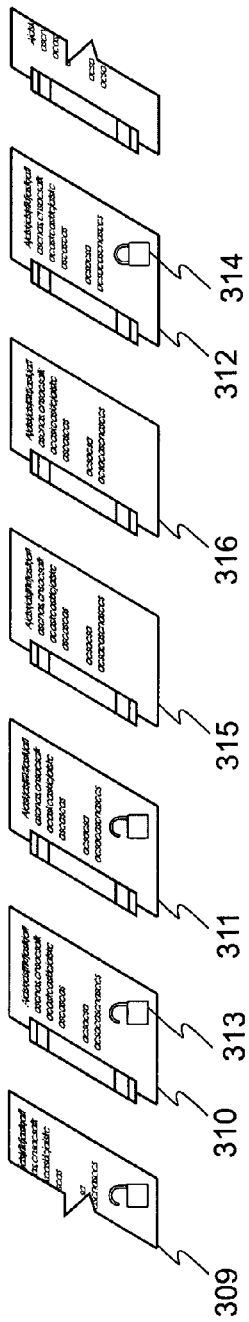
FIG. 37 depicts a uni-dimensional view of the SMLOI with access codes.

FIG. 37 presents the absolute information element vector of the SMLOI of a user "A" where it is possible to see that information elements 315 and 316 have no access restriction. Information elements 309, 310 and 311 can be locked so the user can block modification access to them. The open padlock icon 313 is representing that access is open although it can be locked. The lock 314 on information element 312 indicates the access is denied (which is a default mode for personal information elements).

Figure 38:
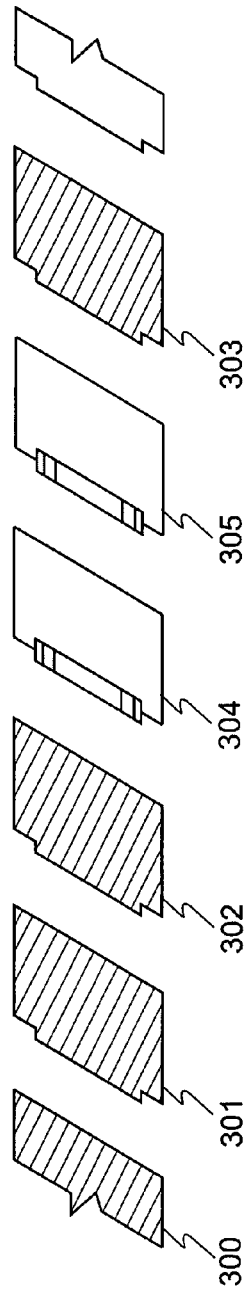
FIG. 38 depicts a limited access view of the SMLOI.

FIG. 38 shows the absolute information element vector of the SMLOI of a user "A", as seen through the eyes of a user "B", where "B" has only access to some information elements. Items that have a dark hatch filling 300, 301, 302, 303 are information elements for which access has been denied to "B" (because of the professional/personal firewall and/or specific access restrictions for a given element). Items 304, 305, with no hatch filling, are seen as they would be through the eyes of a user "A", the SMLOI owner. These information elements can be seen by the user "B", through his/her SMLOI.

Figure 39:
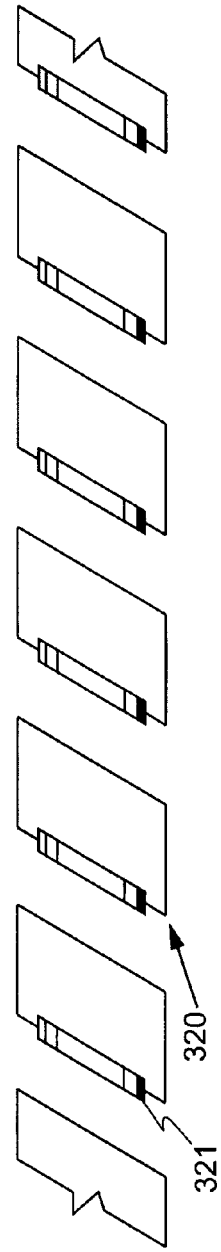
FIG. 39 depicts a privacy-enhanced view of the SMLOI.

For privacy reasons it is desirable that non-accessible elements, or their quantity be non-visible to other users. FIG. 39 shows the same SMLOI, as seen through the eyes of user "B", where all non-accessible elements are hidden, and space between accessible elements is reduced. For similar reasons, some parts of the seeable information elements, such as entry sequence numbers, may be hidden as well. Accessible information elements vector 320 all have their entry number "blacked out" so that neither the number of elements in the SMLOI or their relative position in the sequence can be known of user "B".

Figure 40:
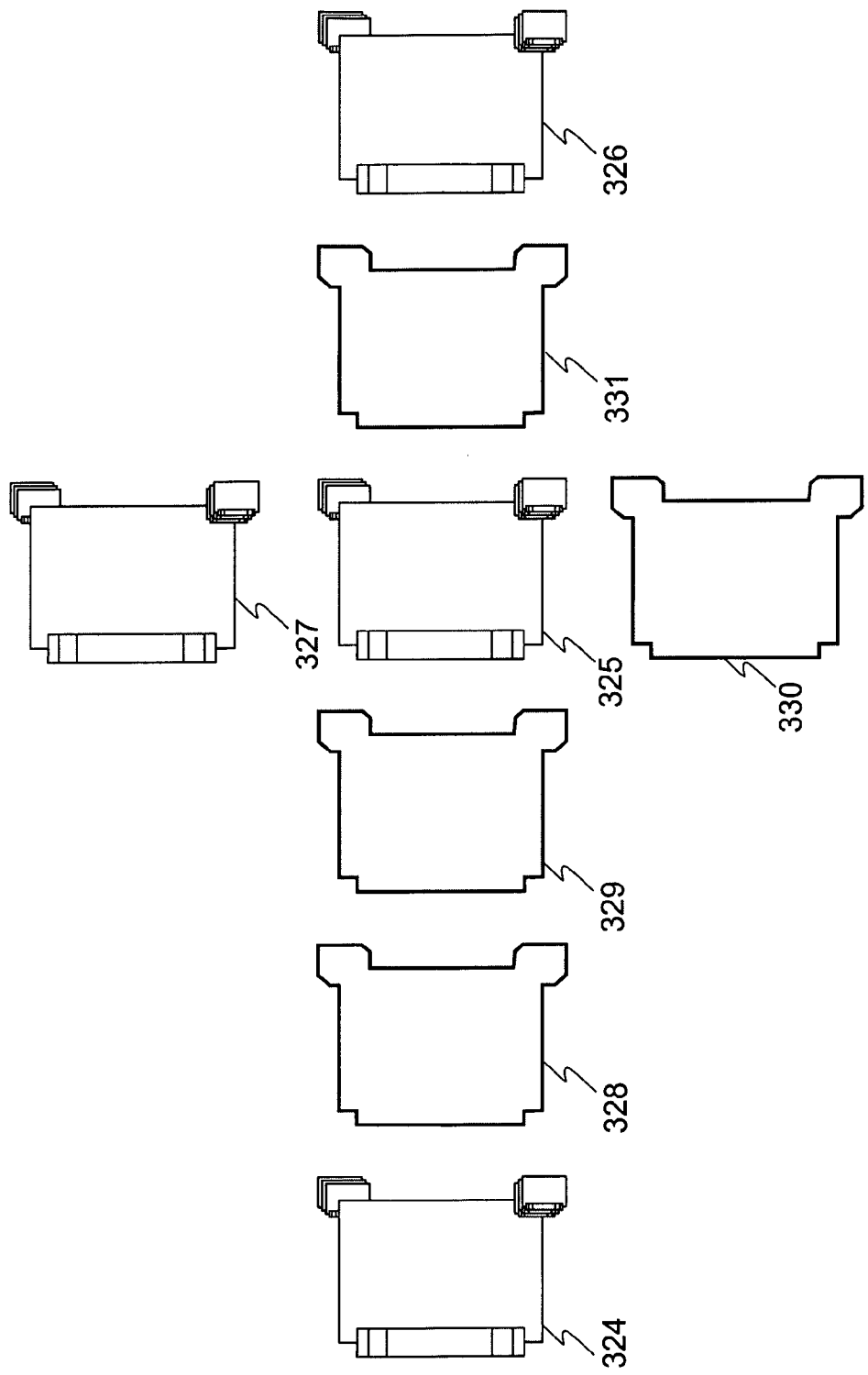
FIG. 40 depicts a bi-dimensional limited access view of the SMLOI.

FIG. 40 shows information element vectors of the SMLOI of one user "A" where, the user has granted access to information elements 324, 325, 326, 327 to user "B" while refusing him/her access to elements 328, 329, 330, 331.

Figure 41:
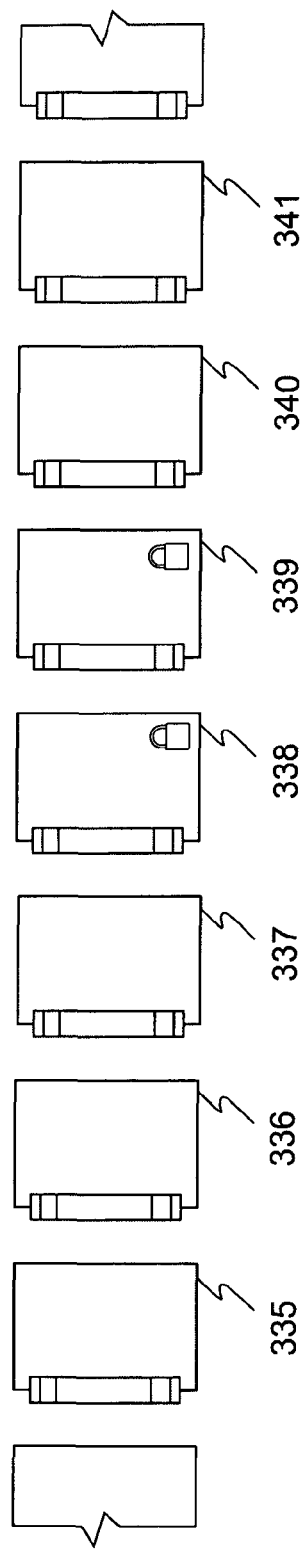
FIG. 41 depicts a uni-dimensional view of the SMLOI.
Figure 42:
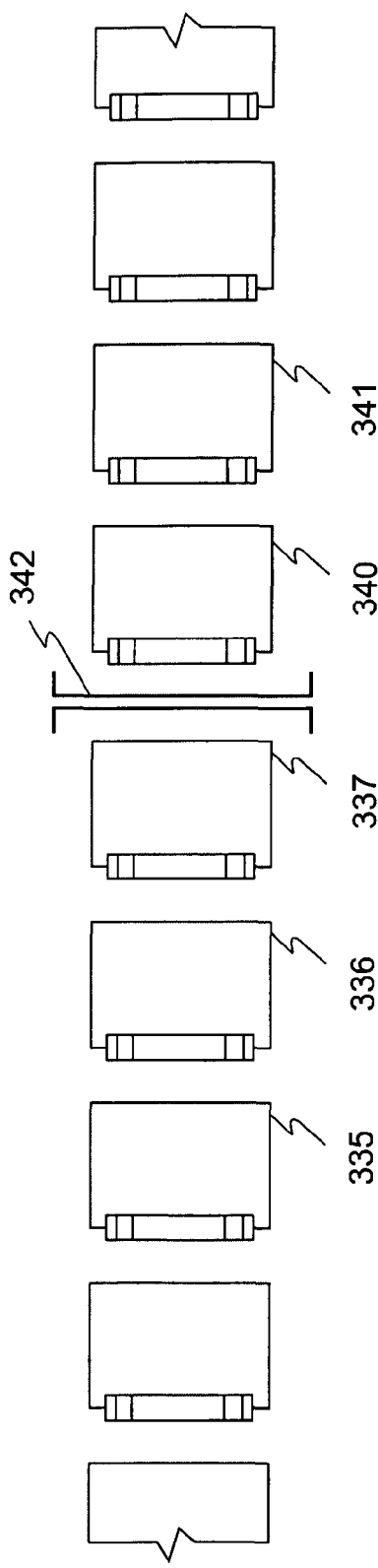
FIG. 42 depicts shows a uni-dimensional view of the SMLOI in privacy-enhanced mode.

FIG. 41 shows a absolute information element vector, from the SMLOI of a user "A", from which information elements 338 and 339 are locked so they cannot appear in the "B" user's SMLOI. FIG. 42 shows the same SMLOI, as viewed through the "eyes" (and SMLOI) of user "B". Information elements are hidden and replaced by one empty space 342 having a size that is irrelevant of the number of hidden information elements.

The Interface

Figure 43:
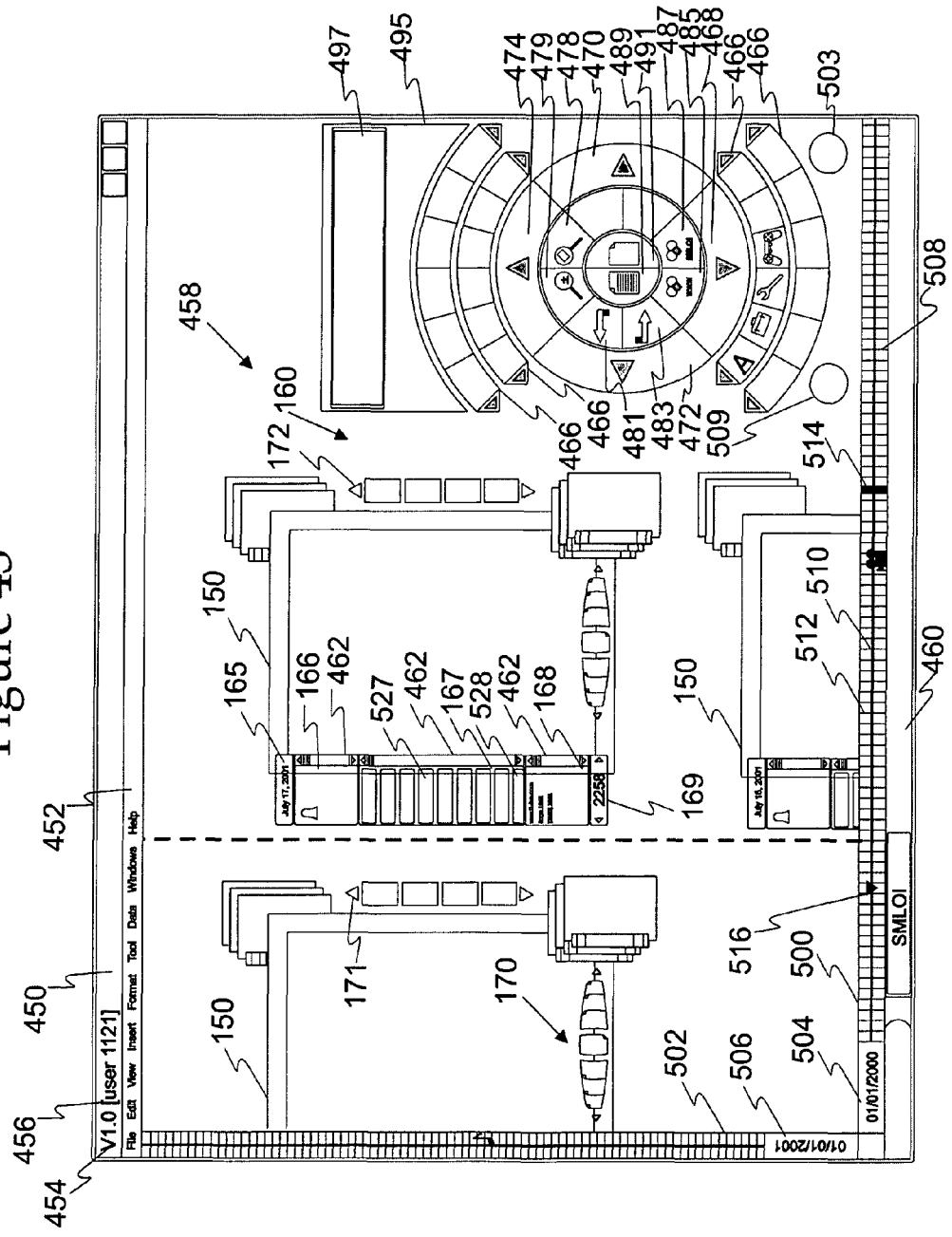
FIG. 43 depicts a proposed graphical interface for the SMLOI.

One proposed SMLOI interface using a typical windows-like environment main screen is shown in FIG. 43 although, the SMLOI can also be voice controlled. Item 450 is the operating system's bar displaying SMLOI details such as version 454 and user ID 456 (user name and user number). Item 452 is the menu bar of typical format and usage. Display of this item is left to the user's discretion. Item 458 is the window through which the SMLOI relays most of the information to the user. This is the window where the SMLOI is displayed, is known as the SMLOI window, and occupies the better part of the screen. This window completely fills the space between the menu bar 452 (if displayed) and the status bar 460.

A typical information element 150 is shown in FIG. 43 with its date of entry sub-area 165, an event-task-action sub-area 166, an information element characterization attributes sub-area 167, a hyperlink sub-area 168 and an entry sequence number sub-area 169. The anterior and ulterior assemblies area 170 are also shown as is the multi-pages document area 160. Scroll down buttons 462 are presented on some sub-areas. Margins from the original document 464 are also presented in FIG. 43.

The multi-part toolbox 466 is presented and acts on different functions available depending on the actions the SMLOI user is doing. The toolbox includes buttons identified by icons that allow the SMLOI user to act on selected elements. In some cases the buttons may call menus or dialog boxes.

The navigation box 468 of FIG. 43 includes buttons to navigate in the SMLOI. It contains all the buttons, identified by icons, to allow the user to surf or navigate in his/her SMLOI. Button 470 allows movement along the absolute information element vector 230 according to positive time vector 32. Button 472 allows movement along the absolute information element vector 230 in the time vector 32 opposite direction. Button 474 allows movement along the relative information element vector 232 according to positive time vector 236. Button 476 allows movement along the relative information element vector 232 in the time vector 236 opposite direction. Button 478 is for the "zoom window" function, while button 479 is for "zoom-in" and "zoom out" functions. Button 481 is the "back to the last view" function and button 483 is for "forward to the next visualized view" function. These functions are similar to the "back" and "forward" functions on a web browser. Button 485 allows the SMLOI user to access his/her intra-SMLOI favorites' list while button 487 allows access to his/her Internet favorites' list.

Button 489 allows the user to return directly to the last information element entered in the SMLOI while button 491 opens a new "blank" information element in the SMLOI. This enables the user to work directly on the new information element for inserting pictures or for adding text on a particular project. This is one way the SMLOI can act as a logbook or notebook.

The communication box 495 includes a communication information window 497 for displaying all the information the SMLOI wants the user to know when he or she is using it. The communication information window 497 concentrates all the communications in the same place; as such, it can display alarms, chat, enter phone calls, instant messaging, provide an image of another person when video conferencing or video phone calls. E-mail features are also presented in the communication information window 497 and usual functions such as in-box, new messages, attach document to message, reply, reply to all, transfer, exchange an element, sending box, sent box and contacts are available. The agenda and its related functions including adding the agenda or linking an information element to the agenda are also included. Both the e-mail and agenda capabilities are fully integrated in the SMLOI.

FIG. 43 also shows the absolute relativisation bar 500 and the relative relativisation bar 502. The purpose of these bars is to provide a broader point of view to the SMLOI user. The user sets limit dates 504 and 506 for each bar so that the length of the time frame represented is customized to the user's desires. Days 508, weeks 510, months 512 and years 514 are displayed time marks, as little bars (each with their own format), in the relativisation bars. The relative relativisation bar 502 is only visible when a relative information element vector ($2^{nd}$ dimension) is displayed. Signs of different shape and colors (for instance black triangle 516) can be added as bookmarks to keep trace of important information elements. A cursor providing the actual viewing position of the SMLOI is provided so it is possible to drag it to move quickly in the SMLOI.

The user can use its SMLOI in five distinct modes: consultation, insertion/creation, modification, list and extraction.

The toolbox 466 includes different functions related to those different SMLOI modes. There is, for instance, different functions related to the insertion mode: favorites (bookmark, hyperlink, hyperpage), quick insertion (direct insertion without extrinsic attributes), tasks, notes, events, video sequences, audio sequences, digitalization (paper, other), and project creation (reports, slides presentations, collections).

The toolbox also includes functions related to the manipulation mode. The buttons include square manipulation tool, copy, paste, element selection, annotation manipulation, hide element (by sequence of entry number, by date), and search (by sequence of entry number, by characterization attributes, combinative logic, by date, by contact, by key word, by document type, options).

There are also functions related to the extraction mode with buttons for deleting, information element collection (add element, remove element, save collection as a new information element, add note in collection, print collection, present collection as slides).

The toolbox 466 also includes a system functions section including buttons for setup (personal setup, system setup, general setup, corporate administrator), "favorites" setup, authentication and signature (document authentication, electronic signature), back-up, help, screen management (screen saver, wallpaper, information element presentation sequence) and the like.

Window 458 of the SMLOI includes two buttons 503 and 509. If the user clicks on the appropriate button, only the personal portion of his/her SMLOI can be visualized 503. If he/she clicks on the second button, only the professional/corporate portion of his/her SMLOI can then be visualized 509. Clicking on both buttons 503, 509 (with the use of the CTRL and SHIFT keys) will allow visualization of both portions of his/her SMLOI.

FIG. 43 shows a typical information element 150, with an information element characterization attributes sub-area 167, into which each characterization attribute is actually a button 527, or selecting means, that can be clicked for picking the information elements to be included in the information elements of the relative vector. Selecting blank button 528 at the bottom pulls out the main attributes' list for selection of the second dimension. Simple addition of characterization attributes to the selection can also be achieved in a typical fashion by using the CTRL and SHIFT keys from the keyboard. The user is also offered the possibility of including any given attribute in a combinative logic equation for the selection of the second dimension's vector (a pull-down menu can appear for additions and exclusions).

Such combinative logic capability can, for instance, allow the user to set border dates for his/her selection of elements carrying the attribute "x", allow him/her to set border entry numbers dates for his/her selection of elements carrying the attribute "y", allow him/her to look for attributes common to other system (such as events) or even allow element selection based on common status (such as tasks).

Figure 44:
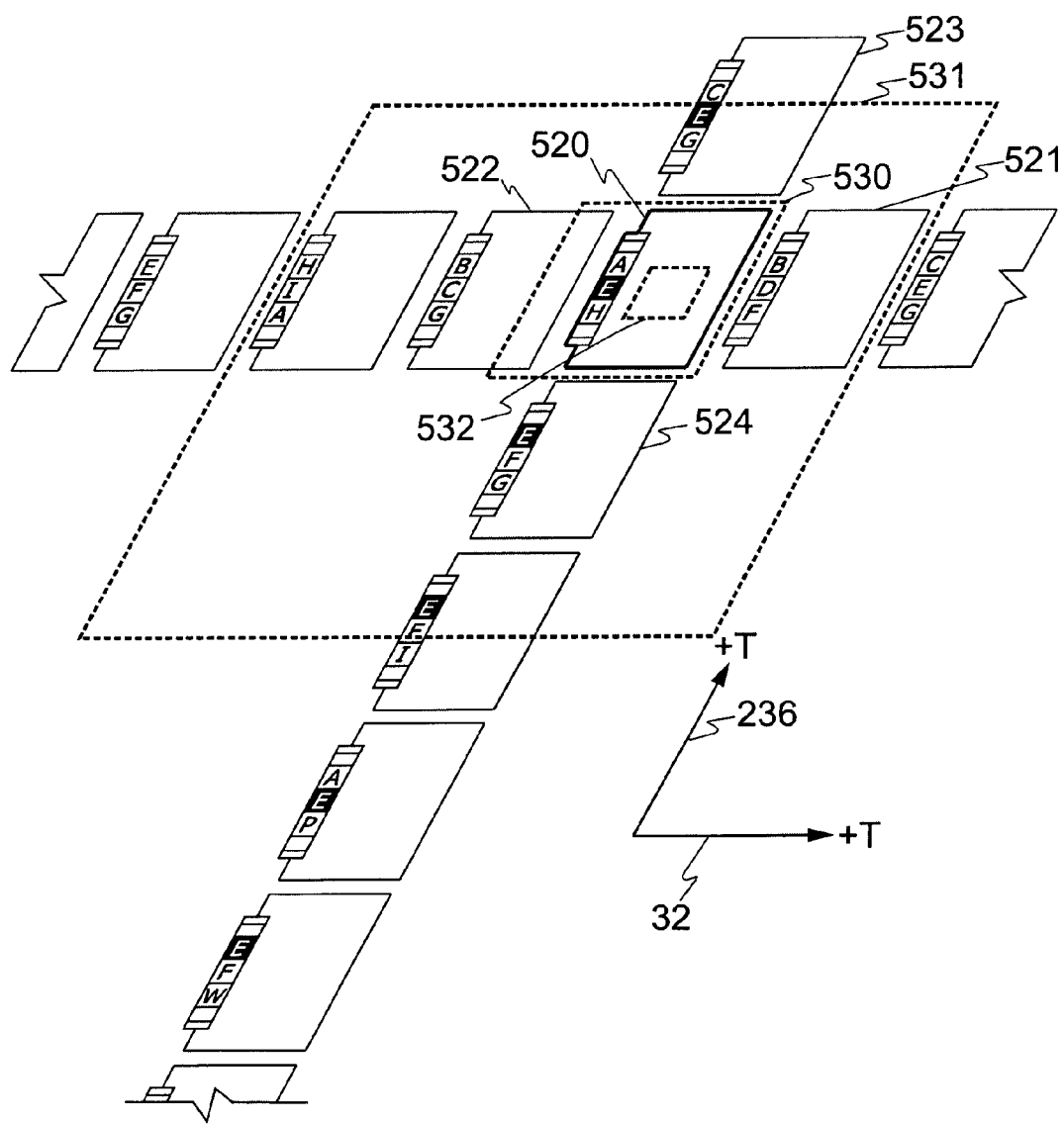
FIG. 44 depicts multiple view size windows of the SMLOI.

FIG. 44 shows a view of a user's SMLOI where the central information element is 520. Elements 522 and 521 are the preceding and following information elements along the absolute information element vector, respectively. Information elements 524 and 523 are the preceding and following information elements along the relative information element vector, respectively. Window 530 presents a close view of information element 520. Window 531 presents a zoom-out view of information element 520 and shows, at the same time, the preceding and the following information elements in order to provide a better perspective of the visualized information element 520. Window 532 is a zoom-in view of a part of information element 520 which provides the possibility for the user to visualize details of the information element 520.

Figure 45:
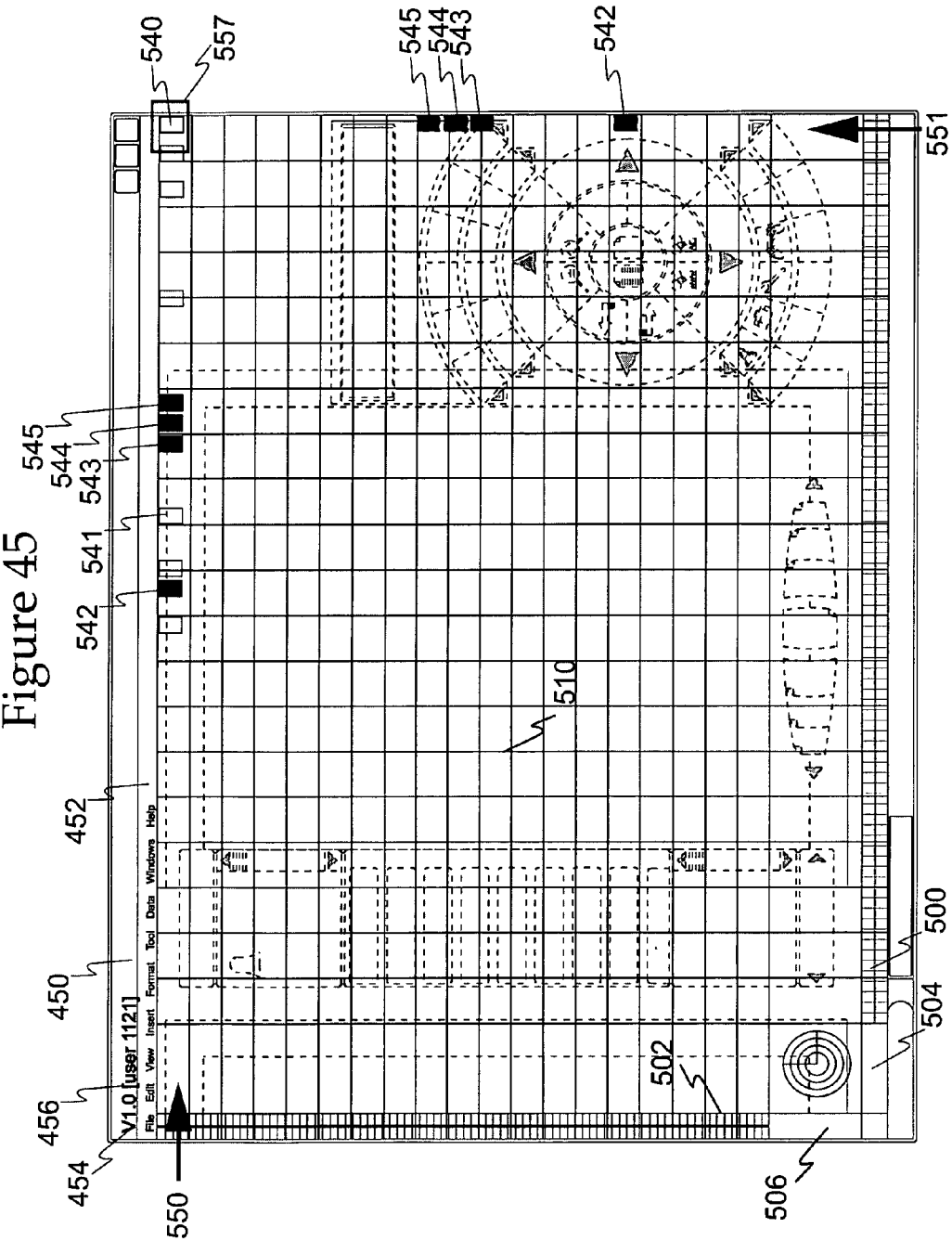
FIG. 45 depicts a radar-screen in the SMLOI.

The SMLOI also has a "radar screen" display format as shown by FIG. 45. The absolute relativisation bar 500 and the relative relativisation bar 502 have weekly time marks 510 (for instance, can be by days, months or other specific time length) extended upward and to the right respectively to effectively create a time grid.

An absolute information element vector 550 appears on the grid, and, accordingly, each of its information elements appears as a square 541. The color of square 541 information elements and the flashing aspect of the information element indicates something specific about the square information element. For instance, it can show search results or information elements representing tasks for which the deadline is approaching. This can be linked to any particular area aspect of an information element.

The relative information element vector 551 presents the same four information elements 542, 543, 544, 545 that appear in the absolute information element vector 550 that share the same selection of characterization attributes. A diagonal representation according to the two relativisation bars time frame can be utilized as well.

The "radar screen" display format as shown in FIG. 45 allows the user to have a meaningful overview of what is happening in its SMLOI. Colors and movements add information to the visual distribution of the schematized information elements. The background information element can be found in the "radar screen" in selection the box 557.

As an alternate way of navigating in the SMLOI, the user can drag, move or resize the selection box 557 and the background view will change accordingly so that the user can visualize whatever information element is in the "radar screen" selection box 557. This function acts like a magnifying glass on a map. When the user is switching from the visualization of an information element to the radar mode, box 557 on the radar mode will show exactly how the presented information element was on the display device. Also, change in the selection box 557 will change the background view as well.

Figure 46:
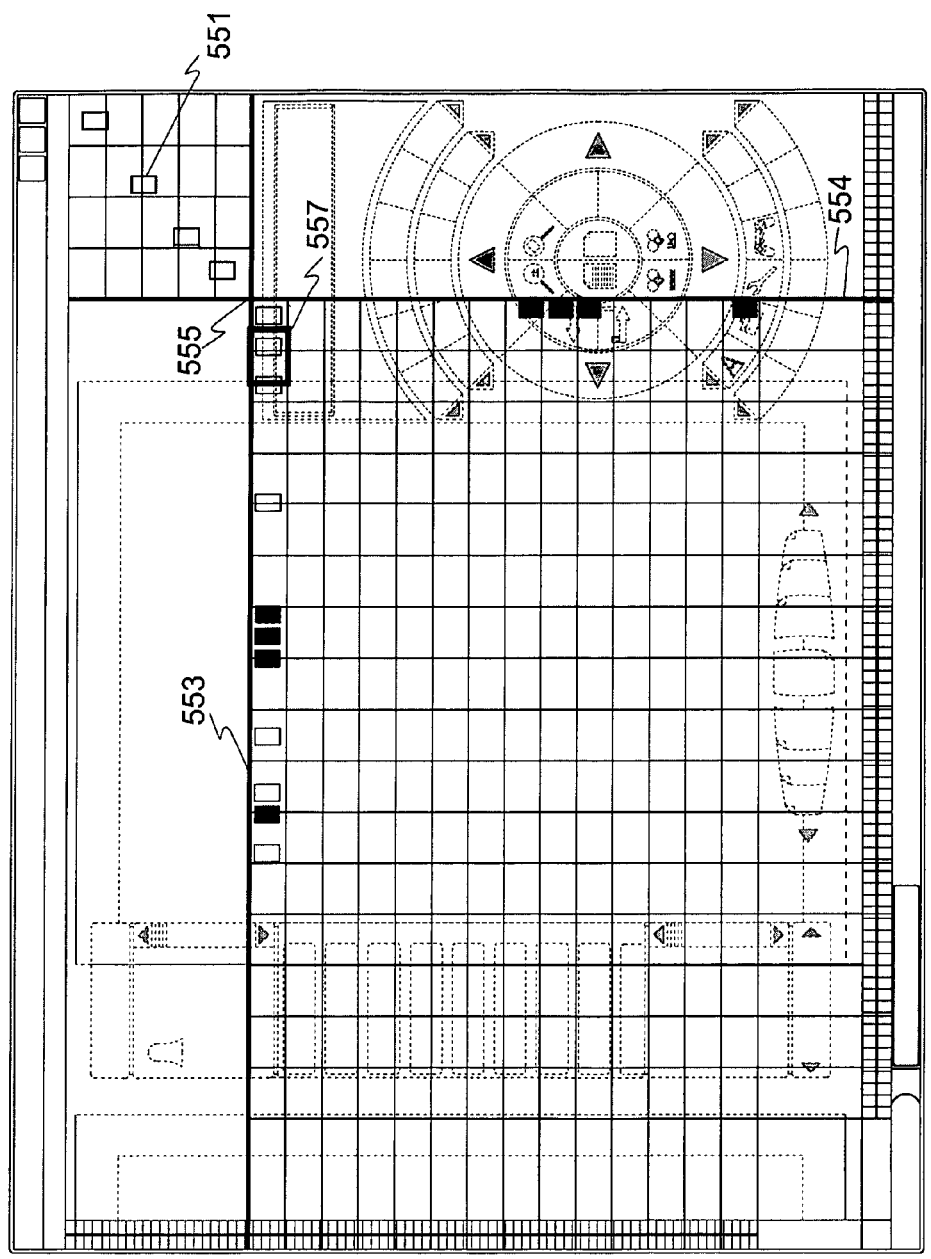
FIG. 46 depicts a radar-screen presenting the future in the SMLOI.
Figure 47:
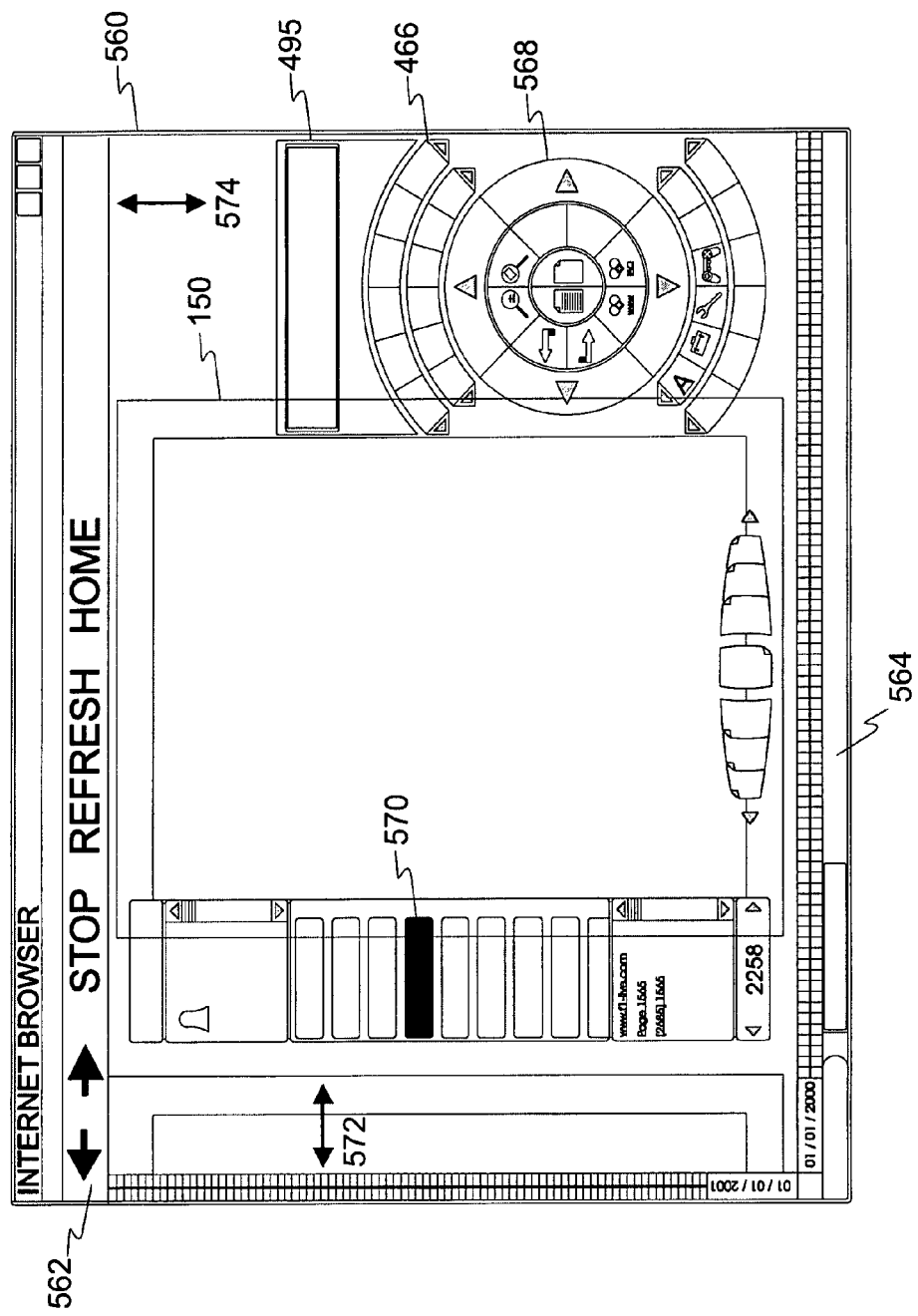
FIG. 47 depicts a view of the SMLOI in a web browser window.

FIG. 46 shows the SMLOI in an alternate "radar screen" display format, including the "future" area 550 that acts like an agenda. Accordingly, information element 551 is a task to be done according to the time frame of the relativisation bars 500 and 502. Separators 553 and 554 visually separate the past and the future and, in fact, 553 and 554 are the lines of the present and their intersection point is "now". This is a way for the user to graphically represent his/her "to do" list. In FIG. 47 is shown the SMLOI using a web browser or a plug-in applied to a standard web browser. This way, everyone using a web browser (i.e. for example Netscape™ Navigator™ or Microsoft™ Internet Explorer™) can add a plug-in (or means to adapt the web browser to use, to visualize or to act on the SMLOI) that allow the multi-dimensional data locating system to run on the web browser. A user can access data, information elements, documents or standard web pages using a web browser with the SMLOI. Non-users can visualize information, adapted web pages or other documents using a web browser with a plug-in. Users can allow access to specific information element to be viewed by other authorized users and non-authorized users with an appropriate web browser. Is considered here a web browser any device that allows navigation on the Internet. While using a web browser it is understood that the SMLOI can be web based and communication with the user is made using a network.

FIG. 47 shows the SMLOI using a web browser as a base program. Item 560 represents the web browser software window. Item 562 represents the web browser classic tools, icons and toolbars. Item 564 represents the windows-like OS task bar, item 466 represents the multi-dimensional data locating system SMLOI toolbox, item 568 represents the multi-dimensional data locating system navigation toolbox, item 150 represents the information element presented in the multi-dimensional data locating system inside the web browser, item 570 represents a selected attribute generating the second dimension in the multi-dimensional data locating system, item 572 represents the absolute information element vector and item 574 represents the relative information element vector.

Story, Game and Simulation

In order to add meaning to the information contained inside the SMLOI a story or a "game metaphor" can be applied to the vectorial space. This would help to link information elements between them to improve the user understanding. If necessary, when using a "game metaphor", a score could be calculated using multiple parameters. The SMLOI can use a 3D/virtual reality environment and, to some extent, turn the "chore" of SMLOI into some sort of a game; the system could even keep records and statistics of a user's performance as an information organizer and user.

Parameters can be as simple as the time to retrieve any information element, the number of elements inserted in the SMLOI per period of time, the number of information elements exchanged per period of time, the average number of characterization attributes applied to the information elements inserted in the SMLOI or the number of information elements visualized in the SMLOI per period of time. Those examples are given to explain that certain parameters can be evaluated and that a score can be attributed according to pre-established standards. Statistic curves can be used to represent what is considered by an individual or by a company as "information management standards".

The possibility is given to the user to access his/her SMLOI and some SMLOI functions and tools through other computerized devices, such as a game console or a PDA. In such cases, the program could be "installed" by the insertion of a "game cartridge", i.e. a self-contained software/memory block package, or by Internet download.

Figure 48:
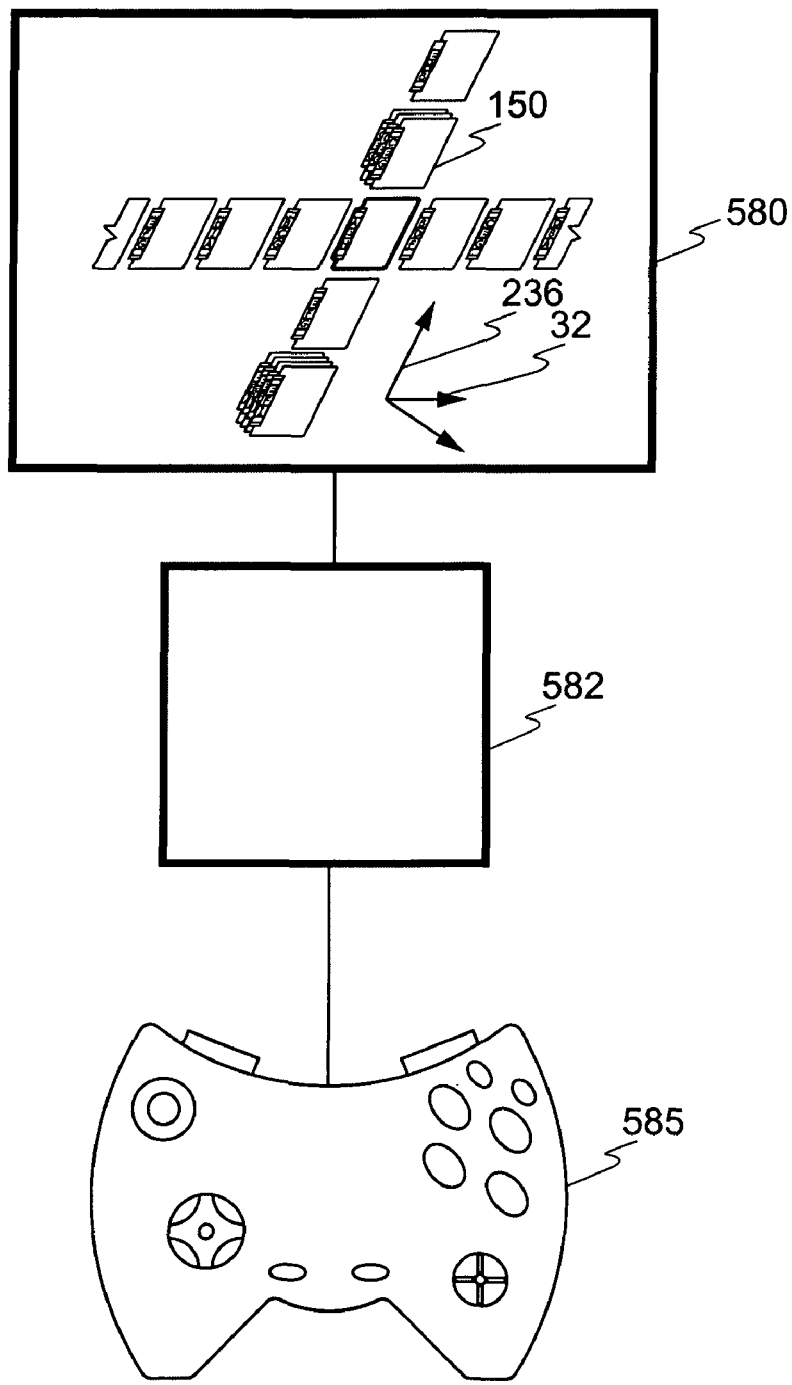
FIG. 48 depicts SMLOI as part of a typical game console.

FIG. 48 shows the SMLOI as seen through a game console 582 and computer controlled display 580 such as a TV screen. The actions are done using the game controller 585.

Figure 49:
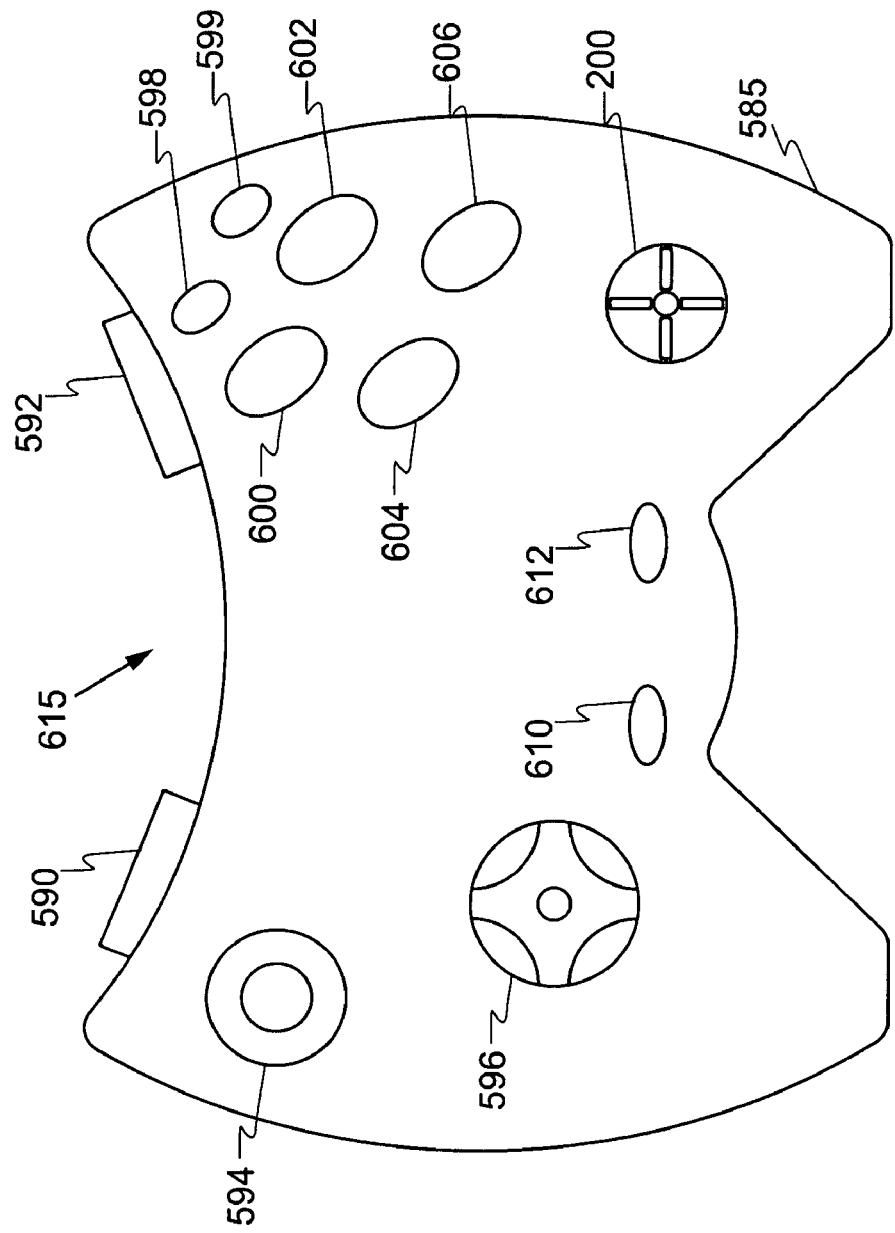
FIG. 49 depicts a typical game console controller.
Figure 50:
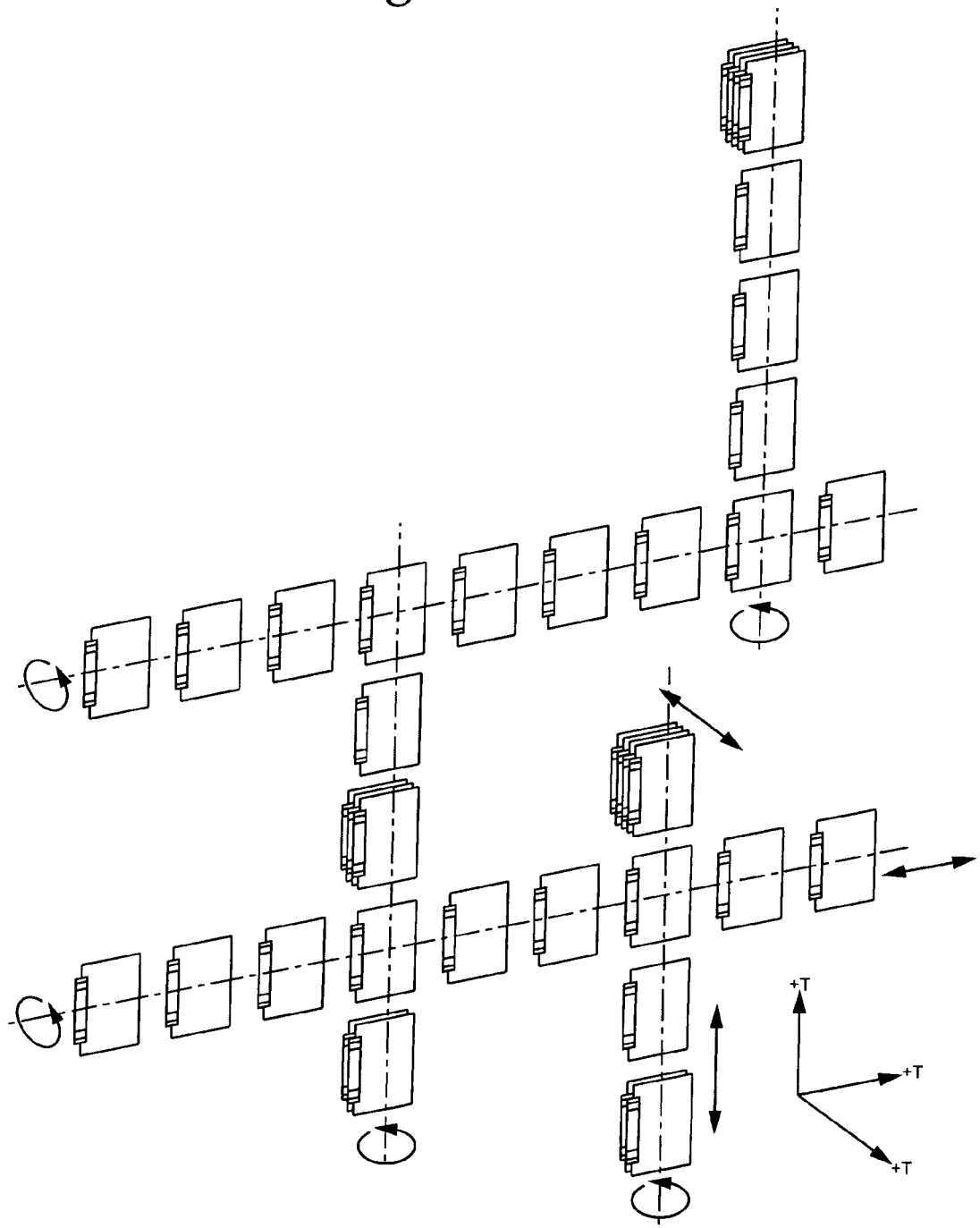
FIG. 50 depicts a path using multiple information element vectors.
Figure 51:
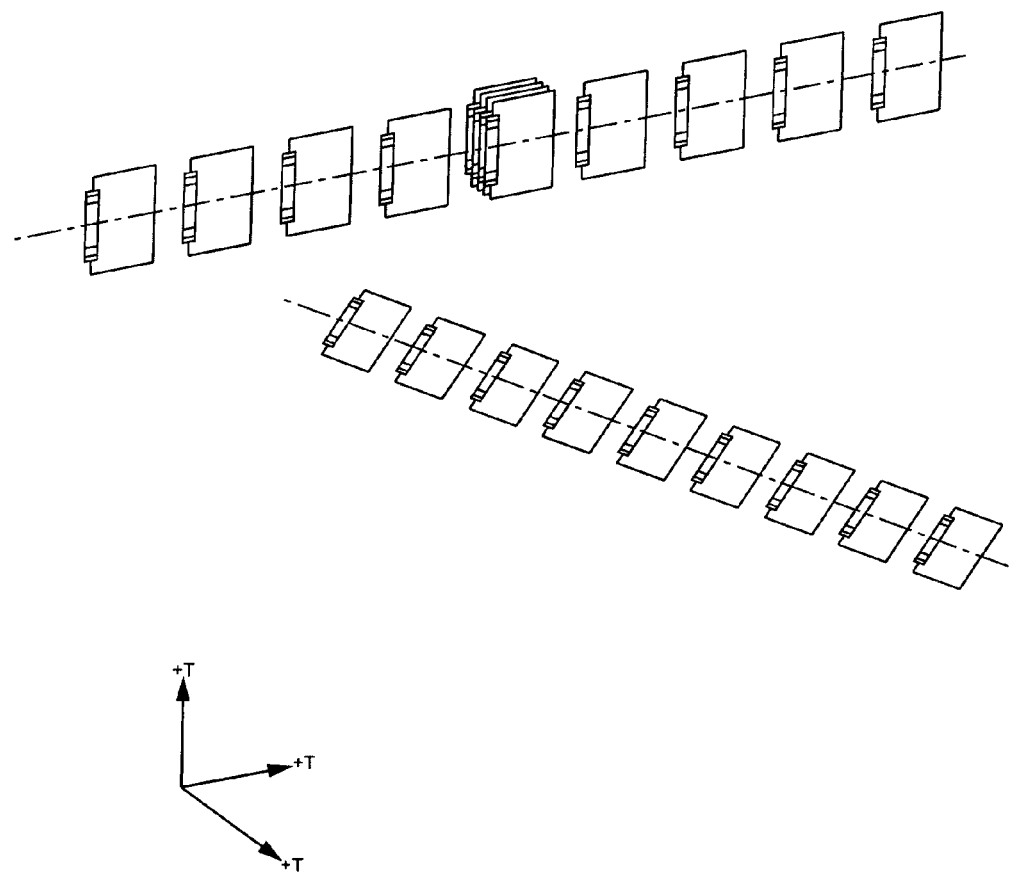
FIG. 51 depicts two non-parallel information element vectors.

FIG. 49 shows a typical game console controller. Just as with any game, the user/player can attribute specific commands to most buttons and knobs. Normally the game controller includes a left trigger 590, a right trigger 592, a left thumbstick 594, a left directional pad 596, a white button 598, a black button 599, a "Y" button 600, a "B" button 602, a "X" button 604, a "A" button 606, a right thumbstick 608, a "back" button 610 and a "start" button 612. Multiple extension slots 615 can be used for connecting additional memory or for connecting a microphone/headset device.

For example, the SMLOI commands could be allocated as follows: the left trigger 590 to move between information elements going back in time, the right trigger 592 to move between information elements going forward in time, a left thumbstick 594 to move on the absolute information element vector 230 and the relative information element vector 232 and to move the box 557 when in the previously described "radar screen" display format. A click on the left thumbstick 594 selects the visualized information element 150, the left directional pad 596 has basically the same functions as the left thumbstick 594, the white button 598 inserts a new blank information element 150 ready to be written while the black button 599 brings the user directly to the last information element inserted into the SMLOI. The "Y" button 600 accesses the "radar screen" display format, the "B" button 602 accesses sequentially the different modes in the SMLOI when an information element is selected, the "X" button 604 selects the communication box 495 and the "A" button 606 selects the toolbox 466. The right thumbstick 608 is used to move a "pan" view if no information element is selected and moves into the different areas/sub-areas if an information element is selected; a click on the right thumbstick 608 would select the pointed area part, the "back" button 610 would be utilized just as the back button on a classic web browser and the "start" button 612 would keep the same role as on a game console.

Multiple command interactions can also be described. For instance, a click and hold on the left thumbstick in addition to the right/left trigger would provide a zoom-in/zoom-out effect. Also, the white button 598 or the black button 599 could be used in conjunction with the right or left triggers 590, 592 to provide other specific commands; this could be fully customizable by the user.

One of the goals of adding a "game metaphor" is to improve the user experience and to bring him/her to a point where managing information is not a burden anymore but a funny intuitive interesting task. One other goal is to have a score that quantify the efficiency of the user information management.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium that includes computer-readable instructions operable to perform a method of displaying an on-screen graphical user interface, the method comprising:
   reading data for a plurality of user-selectable icons associated with attributes, and data for a plurality of content icons representing respective items of contents;
   generating image data for the on-screen graphical user-interface with a two-dimensional array which includes a first array comprising the plurality of user-selectable icons adapted to be arranged in a specific direction on a screen and which is also adapted to include a second array comprising the plurality of content icons in a direction intersecting the first array on the screen; and
   outputting the image data for the on-screen graphical user interface related to displaying the contents to a display device, wherein the generating displays the second array to intersect the first array.

2. A non-transitory computer-readable medium that includes computer-readable instructions operable to perform a method of displaying an on-screen graphical user interface of claim 1, wherein the second array intersects the first array at a position of one of the user-selectable icons.

3. A non-transitory computer-readable medium that includes computer-readable instructions operable to perform a method of displaying an on-screen graphical user interface of claim 1, wherein the second array comprising the plurality of content icons is a consequence of a selection of one of the user-selectable icons.

4. A non-transitory computer-readable medium that includes computer-readable instructions operable to perform a method of displaying an on-screen graphical user interface of claim 1, wherein the second array comprising the plurality of content icons is a consequence of a selection of one of the attributes.

5. A non-transitory computer-readable medium that includes computer-readable instructions operable to perform a method of displaying an on-screen graphical user interface of claim 1, wherein one user selectable icon from the first array of user-selectable icons have a picture attribute associated therewith, the picture attribute being automatically selected when the one user-selectable icon is selected.

6. A non-transitory computer-readable medium that includes computer-readable instructions operable to perform a method of displaying an on-screen graphical user interface of claim 1, wherein one user selectable icon from the first array of user-selectable icons have a music attribute associated therewith, the music attribute being automatically selected when the one user-selectable icon is selected.

7. A non-transitory computer-readable medium that includes computer-readable instructions operable to perform a method of displaying an on-screen graphical user interface of claim 1, wherein at least one of the user-selectable content icons is a thumbnail of an image file.

8. A non-transitory computer-readable medium that includes computer-readable instructions operable to perform a method of displaying an on-screen graphical user interface of claim 1, wherein at least some of the user-selectable graphical elements are documents.

9. A non-transitory computer-readable medium that includes computer-readable instructions operable to perform a method of displaying an on-screen graphical user interface of claim 1, wherein the user-selectable icons are adapted to move longitudinally on a display.

10. A non-transitory computer-readable medium that includes computer-readable instructions operable to perform a method of displaying an on-screen graphical user interface of claim 1, wherein a selection of a user-selectable icon from the array of user-selectable icons is adapted to be made with a game controller.

11. A non-transitory computer-readable medium that includes computer-readable instructions operable to provide a graphical user interface comprising a first array of user-selectable icons, at least some of the user-selectable icons being adapted to display a second array of user-selectable icons thereof, the second array of user-selectable icons being substantially orthogonally displayable about the first array of user-selectable icons.

12. A non-transitory computer-readable medium that includes computer-readable instructions operable to provide a graphical user interface of claim 11, wherein a selection of one user-selectable element from the array of user-selectable elements is adapted to display the second array of user-selectable elements.

13. A non-transitory computer-readable medium that includes computer-readable instructions operable to provide a graphical user interface of claim 11, wherein at least some of the user-selectable elements are documents.

14. A non-transitory computer-readable medium that includes computer-readable instructions operable to provide a graphical user interface of claim 13, wherein at least some of the documents are adapted to be selected and wherein a selection of a document displays a magnified view of the document.

15. A non-transitory computer-readable medium that includes computer-readable instructions operable to provide a graphical user interface of claim 11, wherein at least one user-selectable element from the first array of user-selectable elements has an attribute associated therewith, the attribute being automatically selected when the one user-selectable elements is selected.

16. A non-transitory computer-readable medium that includes computer-readable instructions operable to provide a graphical user interface of claim 11, wherein the second array is adapted to intersect the first array.

17. A non-transitory computer-readable medium that includes computer-readable instructions operable to provide a graphical user interface of claim 11, wherein the second array of user-selectable elements is adapted to move longitudinally on a display, the movement of the second array of user-selectable elements being made upon an instruction provided by a game controller.

18. A non-transitory computer-readable medium that includes computer-readable instructions operable to provide a graphical user interface of claim 11, wherein a selection of a user-selectable element from the first array of user-selectable elements is adapted to be made with a game controller.

19. A non-transitory computer-readable medium that includes computer-readable instructions operable to provide a graphical user interface of claim 11, wherein user actuation of a user-selectable element among the first array of user selectable elements is adapted to cause a second array of user selectable elements to be displayed, user selectable elements in the second array of user selectable elements having a common attribute.

20. A system capable of displaying contents, comprising:
a control which acquires an instruction for displaying of contents via a user's manipulation;
a storage which stores data for a plurality of attribute icons associated with respective types of content, and data for a plurality of content icons representing respective items of contents;
a display output module which outputs image data for an on-screen menu related to displaying of the contents to a display device and which displays the contents acquired from the storage in response to the users instruction acquired by the control;
a display controller which generates the image data for the on-screen menu with a two-dimensional array which includes a first array comprising the plurality of user-selectable icons arranged in a specific direction on a screen and which also includes a second array comprising the plurality of user-selectable icons in a direction intersecting the first array on the screen, wherein
the display controller displays the second array to intersect the first array at a position of one of the user-selectable icons selected by the user, and
if the contents are adapted to be chronologically ordered, represents the chronology by displaying the content icons in chronological order in the second array each time the control acquires an instruction to move an icon provided by a game controller.

* * * * *

UNITED STATES PATENT AND TRADEMARK OFFICE
CERTIFICATE OF CORRECTION

PATENT NO. : 8,151,185 B2  Page 1 of 1
APPLICATION NO. : 11/970860
DATED : April 3, 2012
INVENTOR(S) : Audet It is certified that error appears in the above-identified patent and that said Letters Patent is hereby corrected as shown below:

On the Title Page, Item (62) Related U.S. Application Data should read --- Division of application No. 10/265,443, filed on Oct. 7, 2002, Pat. No. 7,606,819, which claims priority on U.S. Provisional patent application serial 60/329,146, filed on October 15, 2001.

Signed and Sealed this
Twenty-fourth Day of September, 2013

Teresa Stanek Rea
*Deputy Director of the United States Patent and Trademark Office*